(12) United States Patent
Fukuda

(10) Patent No.: US 9,552,409 B2
(45) Date of Patent: Jan. 24, 2017

(54) GENRE GENERATION DEVICE, NON-TRANSITORY COMPUTER-READABLE RECORDING MEDIUM STORING GENRE GENERATION PROGRAM, AND GENRE GENERATION METHOD

(75) Inventor: Takashi Fukuda, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 364 days.

(21) Appl. No.: 14/234,690

(22) PCT Filed: Jul. 25, 2012

(86) PCT No.: PCT/JP2012/068895
§ 371 (c)(1),
(2), (4) Date: Jan. 24, 2014

(87) PCT Pub. No.: WO2013/015341
PCT Pub. Date: Jan. 31, 2013

(65) Prior Publication Data
US 2014/0181111 A1    Jun. 26, 2014

(30) Foreign Application Priority Data
Jul. 25, 2011 (JP) ................... 2011-161999

(51) Int. Cl.
*G06F 17/30* (2006.01)
*G06Q 30/02* (2012.01)

(52) U.S. Cl.
CPC ..... *G06F 17/30598* (2013.01); *G06F 17/3071* (2013.01); *G06F 17/30705* (2013.01); *G06Q 30/02* (2013.01)

(58) Field of Classification Search
CPC .............. G06F 17/30598; G06F 17/30705; G06F 17/3071; G06Q 30/02
See application file for complete search history.

(56) References Cited

U.S. PATENT DOCUMENTS

| | | | |
|---|---|---|---|
| 2003/0128236 A1* | 7/2003 | Chen ................ | G06F 17/30902 715/745 |
| 2004/0036716 A1* | 2/2004 | Jordahl ............ | G06F 17/30601 715/713 |
| 2004/0254917 A1* | 12/2004 | Brill .................. | G06F 17/30654 |
| 2006/0026190 A1* | 2/2006 | Fortnan ............ | G06F 17/30705 |
| 2006/0122994 A1* | 6/2006 | Kapur .............. | G06F 17/30675 |
| 2010/0114855 A1 | 5/2010 | Li et al. | |
| 2012/0109963 A1* | 5/2012 | Mizuguchi ........ | G06F 17/30943 707/737 |

FOREIGN PATENT DOCUMENTS

JP    2009-026258 A    2/2009

OTHER PUBLICATIONS

International Search Report for PCT/JP2012/068895, dated Sep. 18, 2012.

* cited by examiner

*Primary Examiner* — James E Richardson
(74) *Attorney, Agent, or Firm* — Sughrue Mion, PLLC

(57) ABSTRACT

A genre generation device (200) includes a calculating part (235) that calculates a co-occurrence level of a first keyword representing a first genre to be generated and a second keyword representing a second genre that is an attended genre in a search query in a genre hierarchy, and a generating part (265) that generates the first genre in a different layer from a layer where the second genre belongs when a difference between the co-occurrence level of the first keyword and the second keyword, and, a threshold for a level is smaller than a threshold for a disparity.

16 Claims, 34 Drawing Sheets

FIG.6

GENRE TABLE

| GENRE ID | GENRE NAME | CLASSIFICATION DATE AND TIME | NUMBER OF CLASSIFICATIONS | NUMBER OF SUCCESSFUL BIDS (NUMBER OF SALES) | AUCTION AVAILABILITY |
|---|---|---|---|---|---|
| J00001 | FASHION | 2011/06/20 19:55 | 20 | 120 | YES |
| J00002 | FOODS | 2011/06/20 18:55 | 21 | 130 | YES |
| ... | ... | ... | ... | ... | ... |
| J00011 | SHOES | 2011/06/20 18:56 | 120 | 120 | YES |
| J00012 | MEN'S FASHION | 2011/06/20 18:54 | 220 | 110 | YES |
| J00013 | LADIES' FASHION | 2011/06/20 18:55 | 90 | 130 | YES |
| ... | ... | ... | ... | ... | ... |
| J00021 | BEEF | 2011/06/20 17:55 | 131 | 120 | YES |
| J00022 | PORK | 2011/06/20 19:57 | 121 | 120 | YES |
| J00023 | OTHERS | 2011/06/20 19:56 | 221 | 245 | YES |
| ... | ... | ... | ... | ... | ... |
| J02111 | RIB ROAST | 2011/06/20 17:56 | 231 | 240 | YES |
| J02112 | SHORT RIB | 2011/06/20 17:50 | 239 | 249 | YES |
| J02113 | TONGUE | 2011/06/20 13:50 | 230 | 242 | YES |
| ... | ... | ... | ... | ... | ... |
| J21111 | FOR STEAK | 2011/06/20 17:56 | 230 | 241 | YES |
| ... | ... | ... | ... | ... | ... |

FIG.7

GENRE HIERARCHY TABLE

| GENRE ID | GENRE NAME | LOWER GENRE ID | LOWER GENRE NAME |
|---|---|---|---|
| J00000 | TOP | J00001 | FASHION |
| J00000 | TOP | J00002 | FOODS |
| J00001 | FASHION | J00011 | SHOES |
| J00001 | FASHION | J00012 | MEN'S FASHION |
| J00001 | FASHION | J00013 | LADIES' FASHION |
| ... | ... | ... | ... |
| J00002 | FOODS | J00021 | BEEF |
| J00002 | FOODS | J00022 | PORK |
| J00002 | FOODS | J00023 | OTHERS |
| ... | ... | ... | ... |
| J00021 | BEEF | J02111 | RIB ROAST |
| J00021 | BEEF | J02112 | SHORT RIB |
| J00021 | BEEF | J02113 | TONGUE |
| J02111 | RIB ROAST | J21111 | FOR STEAK |
| ... | ... | ... | ... |

FIG.8

TABLE OF PRODUCT OR THE LIKE

| ID OF PRODUCT OR THE LIKE | NAME OF PRODUCT OR THE LIKE | CLASSIFI-CATION GENRE ID | CLASSIFI-CATION GENRE NAME | AUCTION INFORMATION ||||| ADVERTISEMENT INFORMATION ||
| --- | --- | --- | --- | --- | --- | --- | --- | --- | --- |
| | | | | BID PRICE | BIDDER ID | SELLER ID | AUCTION DEADLINE | ADVERTISEMENT FILE NAME | ADVERTISEMENT PAGE URL |
| M001 | XA BEEF | J00211 | RIB ROAST | 3,000 | B001 | F101 | 2011/06/20 | M001.gif | ./public_dir/C001.html |
| M002 | XB BEEF | J00211 | RIB ROAST | 4,000 | B002 | F102 | 2011/05/20 | M002.gif | ./public_dir/C002.html |
| M003 | XC BEEF | J00211 | RIB ROAST | 3,500 | B003 | F103 | 2011/06/10 | M003.gif | ./public_dir/C003.html |
| M004 | XD BEEF | J00211 | RIB ROAST | 1,000 | B004 | F104 | 2011/02/10 | M004.gif | ./public_dir/C004.html |
| M005 | XE BEEF | J00211 | RIB ROAST | 1,100 | B004 | F104 | 2011/01/10 | M005.gif | ./public_dir/C005.html |
| M006 | XF BEEF | J00211 | RIB ROAST | 1,200 | B004 | F104 | 2011/01/29 | M006.gif | ./public_dir/C006.html |
| ... | ... | ... | ... | ... | ... | ... | ... | ... | ... |
| M010 | YA PORK | J00022 | PORK | 800 | B001 | F103 | 2011/06/11 | M010.gif | ./public_dir/C010.html |
| ... | ... | ... | ... | ... | ... | ... | ... | ... | ... |
| M100 | ZA SANDAL | J00011 | SHOES | 5,000 | B011 | F111 | 2011/06/12 | M100.gif | ./public_dir/C100.html |
| M101 | ZB SKIRT | J00012 | LADIES' FASHION | 9,000 | B012 | F111 | 2011/06/12 | M101.gif | ./public_dir/C101.html |
| M102 | ZC SUIT | J00013 | MEN'S FASHION | 70,000 | B013 | F111 | 2011/06/12 | M102.gif | ./public_dir/C102.html |
| M103 | ZD SUIT | J00013 | MEN'S FASHION | 30,000 | B013 | F111 | 2011/06/12 | M103.gif | ./public_dir/C103.html |
| ... | ... | ... | ... | ... | ... | ... | ... | ... | ... |

FIG.9

KEYWORD TABLE OF PRODUCT OR THE LIKE

| ID OF PRODUCT OR THE LIKE | NAME OF PRODUCT OR THE LIKE | KEYWORD |
|---|---|---|
| M001 | XA BEEF | FOR STEAK |
| M001 | XA BEEF | CHUCK |
| M001 | XA BEEF | BEEF |
| M001 | XA BEEF | HOMEGROWN |
| M002 | XB BEEF | FOR STEAK |
| M002 | XB BEEF | CHUCK |
| M002 | XB BEEF | HOMEGROWN |
| M002 | XB BEEF | BEEF |
| M003 | XC BEEF | RIB ROAST |
| M003 | XC BEEF | HOMEGROWN |
| M003 | XC BEEF | BEEF |
| M004 | XD BEEF | FOR STEAK |
| M004 | XD BEEF | CHUCK |
| M004 | XD BEEF | AUSSIE |
| M004 | XD BEEF | BEEF |
| M005 | XE BEEF | FOR STEAK |
| M005 | XE BEEF | CHUCK |
| M005 | XE BEEF | AUSSIE |
| M005 | XE BEEF | BEEF |
| M006 | XF BEEF | RIB ROAST |
| M006 | XF BEEF | AUSSIE |
| M006 | XF BEEF | BEEF |
| ... | ... | ... |
| M010 | YA PORK | RIB ROAST |
| M010 | YA PORK | AUSSIE |
| M010 | YA PORK | PORK |
| ... | ... | ... |
| M100 | ZA SANDAL | FASHION |
| M100 | ZA SANDAL | SHOES |
| M101 | ZB SKIRT | FASHION |
| M101 | ZB SKIRT | LADIES' FASHION |
| M102 | ZC SUIT | FASHION |
| M102 | ZC SUIT | MEN'S FASHION |
| M103 | ZD SUIT | MEN'S FASHION |
| ... | ... | ... |

FIG.11

NUMBER-OF-OBTAINMENT TABLE

| | | SECOND KEYWORD | | | | | | | | | |
|---|---|---|---|---|---|---|---|---|---|---|---|
| | | FOODS | BEEF | PORK | RIB ROAST | CHUCK | SHORT RIB | TONGUE | HOME-GROWN | AUSSIE | FOR STEAK | FOR ROAST BEEF |
| FIRST KEY-WORD | FOODS | | 30/200 | 30/210 | 40/220 | 31/211 | 31/211 | 31/211 | 30/100 | 32/120 | 31/122 | 42/132 |
| | BEEF | | | 190/8 | 29/140 | 31/240 | 31/240 | 31/240 | 29/280 | 31/290 | 29/230 | 28/230 |
| | PORK | | | | 29/330 | 31/320 | 31/320 | 31/320 | 28/330 | 27/350 | 21/290 | 31/390 |
| | RIB ROAST | | | | | 80/30 | | | 60/230 | 42/220 | 23/90 | 45/100 |
| | CHUCK | | | | | | 106/41 | 100/23 | 42/100 | 50/110 | 28/105 | 43/105 |
| | SHORT RIB | | | | | | | 100/42 | 41/100 | 108/121 | 35/105 | 47/120 |
| | TONGUE | | | | | | | | 41/10 | 108/120 | 34/106 | 48/12 |
| | HOME-GROWN | | | | | | | | | 108/120 | 34/105 | 47/120 |
| | AUSSIE | | | | | | | | | | 36/191 | 46/110 |
| | FOR STEAK | | | | | | | | | | | 88/100 |
| | FOR ROAST BEEF | | | | | | | | | | | |

NUMBER OF OBTAINMENTS OF OR QUERY / NUMBER OF OBTAINMENTS OF AND QUERY

FIG.12

SEQUENCE TABLE

| | | SECOND KEYWORD | | | | | | | | | |
|---|---|---|---|---|---|---|---|---|---|---|---|
| | | FOODS | BEEF | PORK | RIB ROAST | CHUCK | SHORT RIB | TONGUE | HOME-GROWN | AUSSIE | FOR STEAK | FOR ROAST BEEF |
| FIRST KEY-WORD | FOODS | | 190 | 190 | 190 | 200 | 200 | 200 | 90 | 100 | 100 | 102 |
| | BEEF | 10 | | 4 | 120 | 210 | 210 | 210 | 250 | 270 | 210 | 210 |
| | PORK | 20 | 4 | | 300 | 300 | 300 | 300 | 310 | 320 | 270 | 370 |
| | RIB ROAST | 30 | 20 | 30 | | 15 | 11 | 11 | 200 | 209 | 80 | 90 |
| | CHUCK | 11 | 30 | 20 | 15 | | 20 | 20 | 80 | 100 | 97 | 95 |
| | SHORT RIB | 11 | 30 | 20 | 11 | 21 | | 22 | 80 | 111 | 97 | 95 |
| | TONGUE | 11 | 30 | 20 | 12 | 22 | 20 | | 5 | 110 | 98 | 95 |
| | HOME-GROWN | 10 | 20 | 20 | 30 | 20 | 20 | 5 | | 59 | 11 | 12 |
| | AUSSIE | 20 | 20 | 30 | 11 | 10 | 10 | 10 | 61 | | 13 | 13 |
| | FOR STEAK | 22 | 20 | 20 | 10 | 8 | 8 | 8 | 94 | 97 | | 50 |
| | FOR ROAST BEEF | 30 | 20 | 20 | 10 | 10 | 10 | 10 | 108 | 97 | 50 | |

FIG.13

NUMBER-OF-SEARCH TABLE

| KEYWORD | NUMBER OF SEARCHES |
|---|---|
| FOODS | 300 |
| BEEF | 150 |
| PORK | 200 |
| RIB ROAST | 120 |
| CHUCK | 160 |
| SHORT RIB | 100 |
| TONGUE | 100 |
| HOMEGROWN | 340 |
| AUSSIE | 320 |
| FOR STEAK | 60 |
| FOR ROAST BEEF | 80 |

FIG.17

| | IMAGE | PRODUCT NAME | PRICE | SHOP NAME |
|---|---|---|---|---|
| PR01 | XA Beef | XA BEEF | ¥3,000 | STORE S001 |
| PR02 | XA Beef | XB BEEF | ¥4,000 | STORE S002 |
| PR03 | XC Beef | XC BEEF | ¥3,500 | STORE S003 |

SEARCH RESULT PAGE

TOP > FOODS > BEEF > SEACH RESULT OF "HOMEGROWN"

SEARCH QUERY: CHUCK    FURTHER REFINE

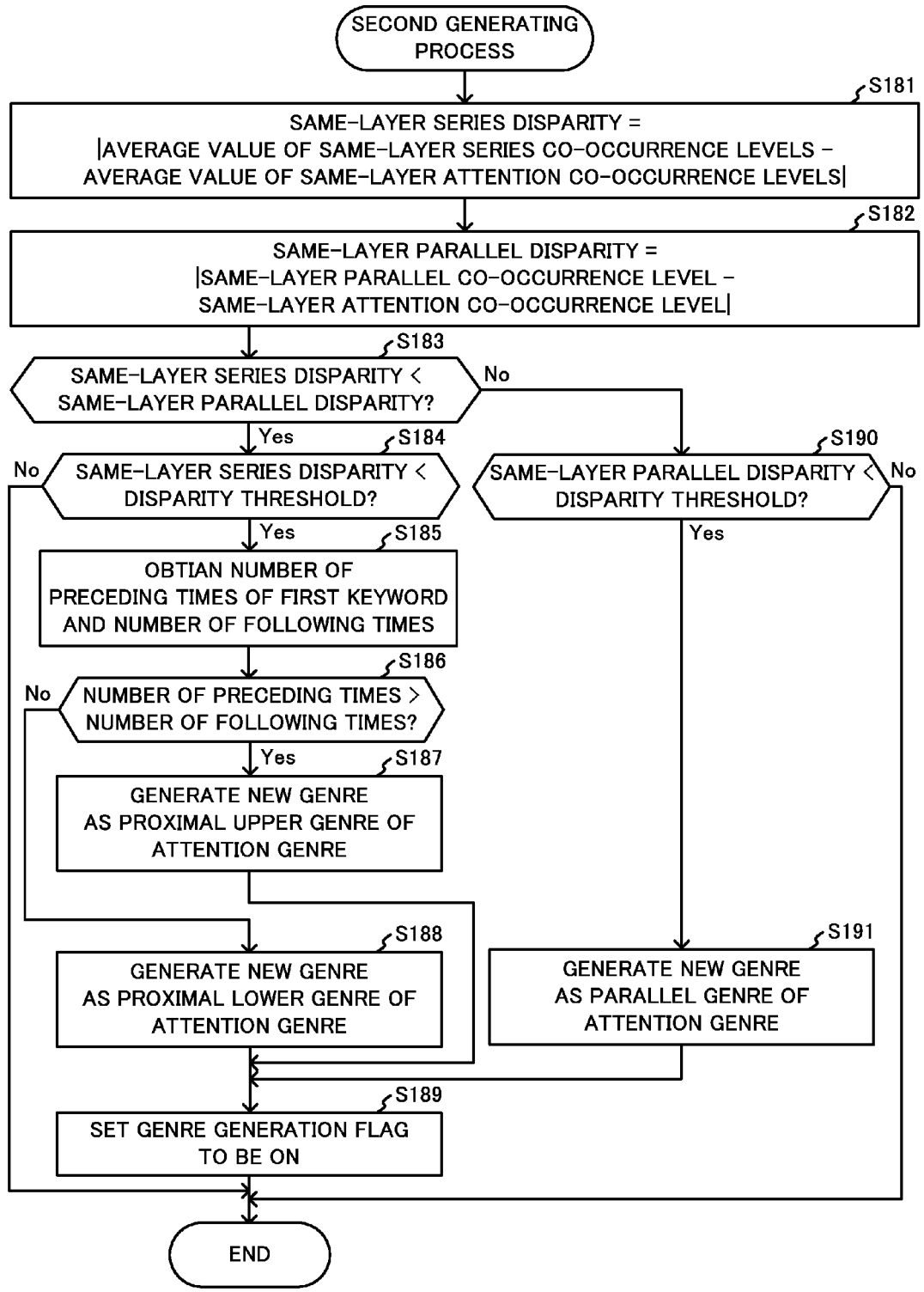

GENRE GENERATION DEVICE, NON-TRANSITORY COMPUTER-READABLE RECORDING MEDIUM STORING GENRE GENERATION PROGRAM, AND GENRE GENERATION METHOD

CROSS REFERENCE TO RELATED APPLICATIONS

This is a National Stage of International Application No. PCT/JP2012/068895, filed Jul. 25, 2012, claiming priority based on Japanese Patent Application No. 2011-161999, filed Jul. 25, 2011, the contents of all of which are incorporated herein by reference in their entirety.

TECHNICAL FIELD

The present invention relates to a genre generation device, a non-transitory computer-readable recording medium storing the genre generation program, and a genre generation method.

BACKGROUND ART

Conventionally, a recording device is known (see, for example, Patent Literature 1) which includes memory means for storing multiple folders and multiple pieces of folder attribute information representing the attribute of each of the multiple folders, and means for obtaining main data like music data and sub data representing the attribute of the song title or the like of music represented by the main data. This recording device generates a new folder when there is no folder attribute information representing the same attribute as the attribute represented by the obtained sub data, and records the main data in the newly generated folder.

CITATION LIST

Patent Literature

Patent Literature 1: Unexamined Japanese Patent Application Kokai Publication No. 2009-26258,

SUMMARY OF INVENTION

Technical Problem

According to the technology disclosed in Patent Literature 1, a new directly is generated regardless of the already-generated hierarchy of the directly. Hence, the genre of music is associated for each directly, and thus when the genres are in a hierarchy, it is difficult to generate a genre associated with the new directly in an appropriate layer in the hierarchy.

The present invention has been made in view of such a point, and it is an objective of the present invention to provide a genre generation device, a non-transitory computer-readable recording medium storing the genre generation program, and a genre generation method which are capable of generating a new genre in an appropriate layer in a hierarchy constructed by multiple genres.

Solution to Problem

To accomplish the above objective, a genre generation device according to a first aspect of the present invention comprises:

an obtaining part that obtains a search query for searching at least one product or at least one service;

a generating part that generates a genre where the at least one product or the at least one service is classified; and a calculating part that calculates a level of co-occurrence of a first keyword and a second keyword in the obtained search query, the first keyword representing a first genre that is a genre to be generated, and the second keyword representing a second genre that is an attended genre in a genre hierarchy constructed by a plurality of genres, wherein when a disparity between the calculated level of co-occurrence of the first keyword and the second keyword, and, a level threshold that is a threshold for a level is smaller than a disparity threshold that is a threshold for a disparity, the generating part generates, in the genre hierarchy, the first genre as a different-layer genre belonging to a different layer from a layer where the second genre represented by the second keyword belongs.

In the genre generation device of the first aspect, the calculating part further calculates a different-layer co-occurrence level of a specified keyword and a different-layer keyword in the obtained search query, the specified keyword representing a specified genre that is any of genres belonging to the genre hierarchy, and the different-layer keyword representing a different-layer genre belonging to a different layer from a layer where the specified genre belongs; and the generating part sets the calculated different-layer co-occurrence level as the level threshold.

In the genre generation device of the first aspect, the calculating part further calculates a same-layer co-occurrence level of the specified keyword representing the specified genre and a same-layer keyword in the obtained search query, the same-layer keyword representing a same-layer genre belonging to a same layer as the layer where the specified genre belongs;

the generating part:

(a) generates the first genre as a different-layer genre of the second genre represented by the second keyword in the genre hierarchy when a different-layer disparity that is a disparity between the co-occurrence level of the first keyword and the second keyword, and, the different-layer co-occurrence level is smaller than a same-layer disparity that is a disparity between the co-occurrence level of the first keyword and the second keyword, and, the same-layer co-occurrence level, and the different-layer disparity is smaller than the disparity threshold; and (b) generates the first genre as a same-layer genre of the second genre represented by the second keyword in the genre hierarchy when the different-layer disparity is equal to or greater than the same-layer disparity and the same-layer co-occurrence level is smaller than the disparity threshold.

The genre generation device of the first aspect may further comprises:

a re-classifying part that re-classifies, when the generating part generates the first genre, at least one product or at least one service classified in the second genre into the first genre or the second genre based on at least one keyword for explaining the at least one product or the at least one service classified in the second genre generated prior to the first genre or at least one name of the at least one product or the at least one service, the first keyword representing the first genre, and the second keyword representing the second genre.

In the genre generation device of the first aspect, the generating part generates the first genre in a same layer as the layer where the second genre belongs or a different layer from the layer where the second genre belongs when any of a number of classifications that is a number of at least one product or at least one service classified in the second genre, a number of sales of the at least one product or the at least one service classified in the second genre, a number of searches of at least one product or at least one service based on the second keyword, and a change level in the number of searches per a unit time exceeds respective predetermined thresholds.

In the genre generation device of the first aspect, the calculating part further calculates a number of obtainments of a preceding query that is a number of times at which a search query having the first keyword coupled with the second keyword without a same-layer operator in a manner preceding to the second keyword is obtained, and a number of obtainments of a following search query that is a number of times at which a search query having the first keyword coupled with the second keyword without the same-layer operator in a manner following to the second keyword is obtained; and when the first genre is to be generated in a different layer from the layer where the second genre belongs, the generating part:

(c) generates the first genre in an upper layer of the second genre when the number of obtainments of the preceding query is larger than the number of obtainments of the following query; and (d) generates the first genre in a lower layer of the second genre when the number of obtainments of the preceding query is smaller than the number of obtainments of the following query.

In the genre generation device of the first aspect, the calculating part further calculates a first search number that is a number of searches of at least one product or at least one service searched based on the first keyword and a second search number that is a number of searches of at least one product or at least one service based on the second keyword; and when generating the first genre and the second genre in different layers, the generating part:

(c) generates the first genre in an upper layer of the second genre when the first search number is larger than the second search number; and (d) generates the first genre in a lower layer of the second genre when the first search number is smaller than the second search number.

In the genre generation device of the first aspect, the calculating part further calculates a first search result number that is a number of at least one product or at least one service searched based on the first keyword, and a second search result number that is a number of the products or the services searched based on the second keyword; and when generating the first genre and the second genre in different layers, the generating part:

(c) generates the first genre in an upper layer of the second genre when the first search result number is larger than the second search result number; and (d) generates the first genre in a lower layer of the second genre when the first search result number is smaller than the second search result number.

In the genre generation device of the first aspect, the second genre belongs to a layer where a third genre and a fourth genre belong, the third genre and the fourth genre belonging to a same layer; and when a search query having the first keyword and the second keyword following to the first keyword coupled with each other by a NOT operator is obtained, the calculating part presumes that a search query having a coupled word and the first keyword further coupled with an AND operator is obtained, the coupled word having a third keyword representing the third genre and a fourth keyword representing the fourth genre coupled with an OR operator that is the same-layer operator.

The genre generation device of the first aspect may further comprise a deleting part that annexes the second genre to the third genre belonging to a same layer as the layer where the second genre belongs to delete the second genre when a new product or service is not classified in the second genre within a predetermined time period.

In the genre generation device of the first aspect, the obtaining part further obtains a search query including the first keyword, and a search query including the second keyword; and the calculating part presumes that a search query having the first keyword and the second keyword coupled with each other by the same-layer operator is obtained when the search query including the second keyword is obtained before a predetermined time elapses or before a predetermined number of web pages are browsed after the search query including the first keyword is obtained.

In the genre generation device of the first aspect, the obtaining part further obtains a search query including the second keyword and a refinement instruction for instructing, based on the products or the services searched based on the second keyword, a refinement of the products or the services searched based on the first keyword after the search query including the first keyword is obtained; and the calculating part presumes that a search query having the first keyword and the second keyword coupled with each other without the same-layer operator is obtained when the search query including the first keyword, and the search query including the second keyword and the refinement instruction are obtained.

In the genre generation device of the first aspect, the different-layer co-occurrence level includes a series co-occurrence level of a co-occurrence of the specified keyword and a series keyword in the obtained search query, the series keyword representing a series genre that is present on a path from a top of the genre hierarchy through the specified genre, and belongs to an upper or lower layer of the layer where the specified genre belongs;

the same-layer co-occurrence level includes a parallel co-occurrence level of a co-occurrence of the specified keyword and a parallel keyword in the obtained search query, the parallel keyword representing a parallel genre present at a proximal lower layer of a proximal upper genre of the specified genre;

the different-layer disparity includes a series disparity that is a disparity between the co-occurrence level of the first keyword and the second keyword, and, the series co-occurrence level;

the same-layer disparity includes a parallel disparity that is a difference between the co-occurrence level of the first keyword and the second keyword, and, the parallel co-occurrence level; and the generating part:

(a) generates the first genre represented by the first keyword as a series genre of the second genre when the series disparity is smaller than the parallel disparity and the series disparity is smaller than the disparity threshold; and (b) generates the first genre as a parallel genre of the second genre when the series disparity is equal to or larger than the parallel disparity and the parallel disparity is smaller than the disparity threshold.

In the genre generation device of the first aspect, the specified genre is the second genre.

To accomplish the above objective, a non-transitory computer-readable recording medium according to a second aspect of the present invention has stored therein a genre generation program that allows a computer to function as:

an obtaining part that obtains a search query for searching at least one product or at least one service;

a generating part that generates a genre where the at least one product or the at least one service is classified; and a calculating part that calculates a level of co-occurrence of a first keyword and a second keyword in the obtained search query, the first keyword representing a first genre that is a genre to be generated, and the second keyword representing a second genre that is an attended genre in a genre hierarchy constructed by a plurality of genres, wherein when a disparity between the calculated level of co-occurrence of the first keyword and the second keyword, and, a level threshold that is a threshold for a level is smaller than a disparity threshold that is a threshold for a disparity, the generating part generates, in the genre hierarchy, the first genre as a different-layer genre belonging to a different layer from a layer where the second genre represented by the second keyword belongs.

To accomplish the above objective, a genre generation method according to a third aspect executed by a genre generation device comprising an obtaining part, a generating part, and a calculating part, this genre generation method comprises:

an obtaining step in which the obtaining part obtains a search query for searching at least one product or at least one service;

a generating step in which the generating part generates a genre where the at least one product or the at least one service is classified; and a calculating step in which the calculating part calculates a level of co-occurrence of a first keyword and a second keyword in the obtained search query, the first keyword representing a first genre that is a genre to be generated, and the second keyword representing a second genre that is an attended genre in a genre hierarchy constructed by a plurality of genres, wherein when a disparity between the calculated level of co-occurrence of the first keyword and the second keyword, and, a level threshold that is a threshold for a level is smaller than a disparity threshold that is a threshold for a disparity, in the generating step, the generating part generates the first genre in the genre hierarchy as a different-layer genre belonging to a different layer from a layer where the second genre represented by the second keyword belongs.

Advantageous Effects of Invention

According to a genre generation device, a non-transitory computer-readable recording medium storing the genre generation program, and a genre generation method of the present invention, it becomes possible to generate a new genre in an appropriate layer in a hierarchy constructed by multiple genres.

BRIEF DESCRIPTION OF DRAWINGS

FIG. 6 is a diagram illustrating an example genre table stored by the genre generation device;

FIG. 7 is a diagram illustrating an example genre hierarchy table stored by the genre generation device;

FIG. 8 is a diagram illustrating an example table of a product or the like stored by the genre generation device;

FIG. 9 is a diagram illustrating an example keyword table of product or the like stored by the genre generation device;

FIG. 11 is a diagram illustrating an example number-of-obtainment table stored by the genre generation device;

FIG. 12 is a diagram illustrating an example sequence table stored by the genre generation device;

FIG. 13 is a diagram illustrating an example number-of-search table stored by the genre generation device;

FIG. 17 is a diagram illustrating an example search result page displayed by a terminal device;

FIG. 34 is a flowchart illustrating an example second generating process executed by the genre generation device of the 12th modified example.

DESCRIPTION OF EMBODIMENTS

Embodiments of the present invention will be explained with reference to the accompanying drawings.

Figure 1:
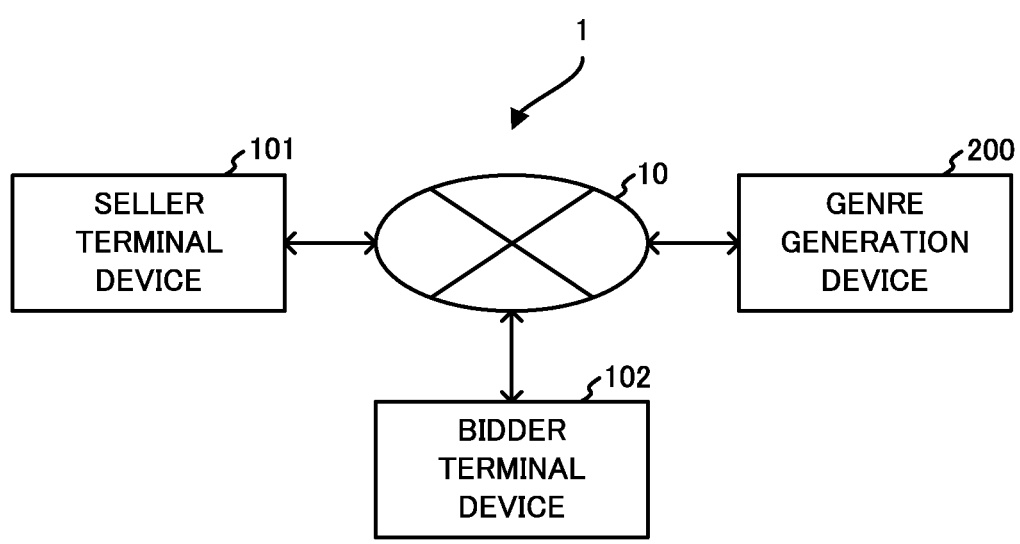
FIG. 1 is a system configuration diagram illustrating an example configuration of a genre generation system.

A genre generation device 200 according to an embodiment of the present invention constructs a genre generation system 1 illustrated in FIG. 1. In this embodiment, the explanation will be given of a case in which the genre generation system 1 carries out an auction for products or services (hereinafter, referred to as a product or the like) in an auction site, but the present invention is not limited to this case. The genre generation system 1 may sale or provide (hereinafter, referred to as sale or the like) a product or the like through, for example, an electronic store (that is, an on-line store) established over the Internet. The explanation will be given of a case in which the service provided in this embodiment includes a motion-picture distribution service through the Internet, but the present invention is not limited to this case.

In the genre generation system 1, products or the like placed on an auction are classified in multiple kinds (that is, genres), and the multiple genres are belonging to a genre hierarchy in a hierarchical structure.

As a specific example, the explanation will be below given of a genre hierarchy illustrated in FIG. 2.

Figure 2:
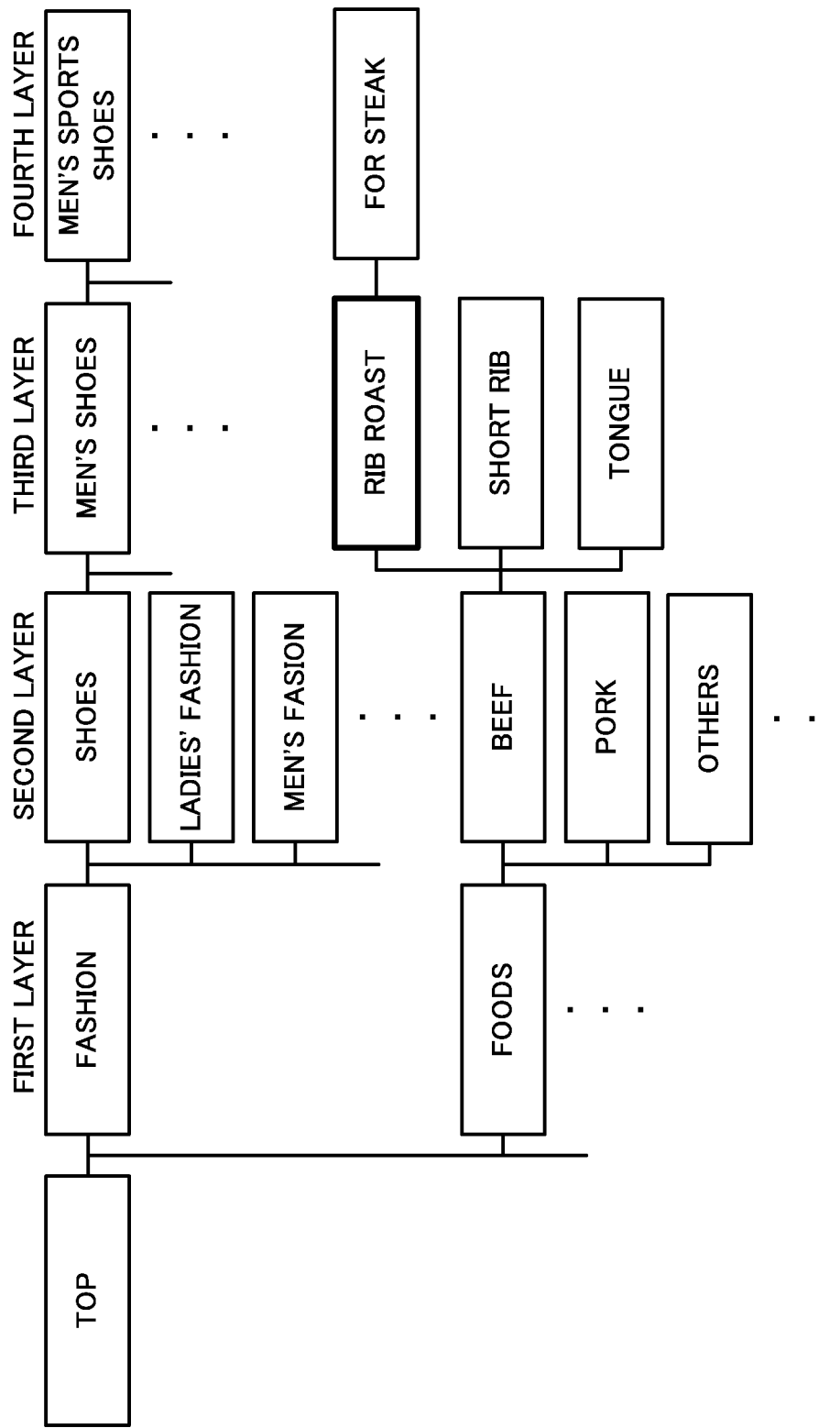
FIG. 2 is a diagram for explaining a genre hierarchy of a marketable product and the like auctioned through the genre generation system.

The genre hierarchy illustrated in FIG. 2 has a header genre that is "top". Moreover, products or the like are classified in "fashion", "foods" and other unillustrated genres all right below the "top". The genre "fashion" is a genre classifying a product like clothes, and the genre "foods" is a genre classifying foods.

The product classified in the genre "fashion" is classified in "shoes" classifying shoes, "ladies' fashion" classifying ladies' clothes, "men's fashion" classifying men's clothes, or other unillustrated genres. Moreover, the product classified in the genre "shoes" is classified in "men's shoes" classifying men's shoes, or other unillustrated genres, and the product classified in the genre "men's shoes" is classified in "men's sports shoes" classifying sports shoes, or other unillustrated genres.

The genre "fashion" belongs to a upper layer than the layer where the genre "shoes", the genre "ladies' fashion", and the genre "men's fashion" belong. Moreover, the genre "fashion" includes the genre "shoes", the genre "ladies' fashion", and the genre "men's fashion".

Likewise, the product or the like classified in the genre "foods" is classified in a genre "beef" classifying beef, a genre "pork" classifying pork, or a genre "others" classifying animal meat other than beef and pork. Moreover, the genre "foods" belongs to the upper layer than the layer where the genre "beef", the genre "pork", and the genre "others" belong, and includes those genres.

Furthermore, the product or the like classified in the genre "beef" is classified in a genre "rib roast" classifying a beef portion that is rib roast, a genre "short rib" classifying a beef portion that is short rib, a genre "tongue" classifying a beef portion that is tongue, and other unillustrated genres. That is, the genre "beef" belongs to the upper layer than the layer where the genre "rib roast", the genre "short rib", and the genre "tongue" belong, and includes those genres.

Still further, the product or the like classified in the genre "rib roast" is classified in "steaks" classifying beef mainly used for steak materials, and other unillustrated genres. That is, the genre "rib roast" belongs to the upper layer than the layer where the genre "steaks" belongs, and includes this genre.

Yet further, the genre "fashion" and the genre "foods" belong to a first layer right below the "top" that is the header genre. Moreover, the genre "shoes", the genre "ladies' fashion", the genre "men's fashion", the genre "beef", the genre "pork", and the genre "others" belong to a second layer right below the first layer. Furthermore, the genre "men's shoes", the genre "rib roast", the genre "short rib", and the genre "tongue" belong to a third layer that is a proximal layer to the second layer. The genre "men's sports shoes" and the genre "steaks" belong to a fourth layer that is a proximal layer to the second layer.

In genres belonging to the same layer as a given genre, a genre right below a genre right above those genres and different from those genres is called a parallel genre. That is, the parallel genre of the genre "fashion" is the genre "foods". Moreover, the parallel genres of the genre "shoes" are the genre "ladies' fashion" and the genre "men's fashion", but the genre "beef", the genre "pork", and the genre "others" are not the parallel genres.

In genres on a route reaching the lowermost genre through a given genre from the top genre, a genre that is not the top genre or that genre is called a series genre. More specifically, in a route from the genre "top" in FIG. 2 to the lowermost genre "steaks" through the genre "rib roast", there are genres "foods", "beef", and "steaks". Hence, the genres "foods", "beef", and "steaks" are the series genres of the genre "rib roast".

Next, an explanation will be given of a structure of the genre generation system 1 that carries out an auction for a product or the like classified in the above-explained genre. The genre generation system 1 includes, in addition to the genre generation device 200, a computer communication network 10 (hereinafter, simply referred to as a communication network 10), a seller terminal device 101 and a bidder terminal device 102 as illustrated in FIG. 1.

The communication network 10 is, for example, the Internet. The communication network 10 may be a LAN (Local Area Network) or a public line network.

The seller terminal device 101 and the bidder terminal device 102 are each, for example, a personal computer including a display like an LCD (Liquid Crystal Display), and input devices like a keyboard and a mouse.

Figure 3:
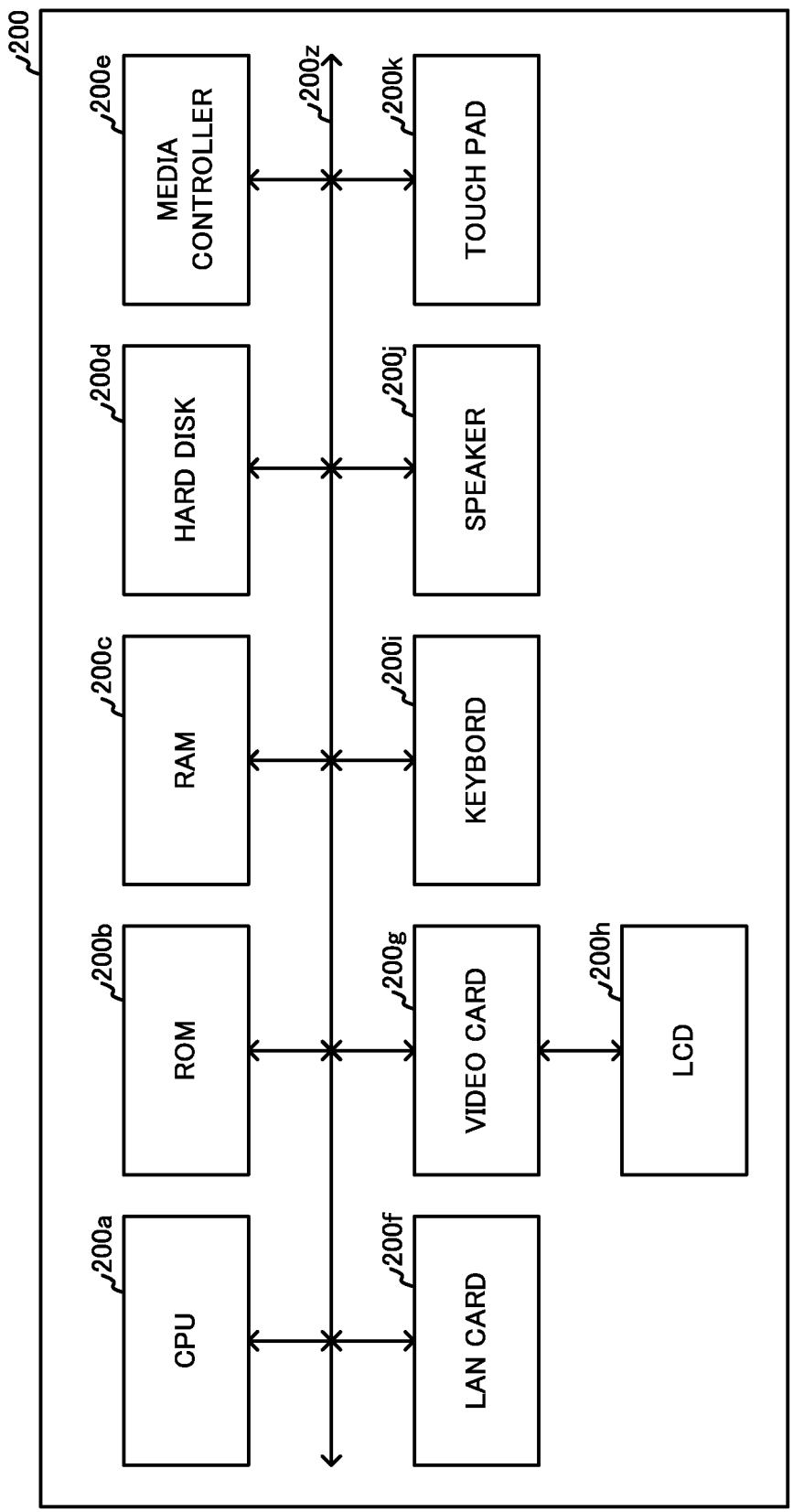
FIG. 3 is a hardware configuration diagram illustrating an example configuration of a genre generation device according to an embodiment of the present invention.

The genre generation device 200 is a server device illustrated in FIG. 3. This server device includes a CPU (Central Processing Unit) 200a, a ROM (Read Only Memory) 200b, a RAM (Random Access Memory) 200c, a hard disk 200d, a media controller 200e, a LAN card (Local Area Network) 200f, a video card 200g, an LCD (Liquid Crystal Display) 200h, a keyboard 200i, a speaker 200j, and a touch pad 200k all connected one another through a bus 200z.

The CPU 200*a* executes a software process in accordance with a program stored in the ROM 200*b* or the hard disk 200*d*, thereby controlling the whole genre generation device 200. The RAM 200*c* temporary stores data subjected to a process when the CPU 200*a* runs the program.

The hard disk 200*d* is an information memory that stores a table storing various data. The genre generation device 200 may include a flash memory instead of the hard disk 200*d*.

The media controller 200*e* reads various data and programs from a recording medium including a flash memory, a CD (Compact Disc), a DVD (Digital Versatile Disc), and a blu-ray disc (Blu-ray Disc) (registered trademark).

The LAN card 200*f* exchanges data between the seller terminal device 101 and the bidder terminal device 102 connected with each other through the communication network 10. The keyboard 200*i* and the touch pad 200*k* input signals or information in accordance with an operation given by a user. The LAN card 200*f* serves as an obtaining part and a presenting part.

The video card 200*g* draws (i.e., renders) an image based on digital signals output by the CPU 200*a*, and outputs image signals representing the drawn image. The LCD 200*h* displays an image in accordance with the image signals output by the video card 200*g*. The genre generation device 200 may include a PDP (Plasma Display Panel) or an EL (Electroluminescence) display instead of the LCD 200*h*. The speaker 200*j* outputs sounds based on signals output by the CPU 200*a*.

An explanation will be given below of the classification of a product or the like.

The seller terminal device 101 inputs information indicating the name of a product or the like (hereinafter, referred to as a name of product or the like) in accordance with an operation given to an input device by a seller of the product or the like. Moreover, the seller terminal device 101 inputs information identifying a genre (hereinafter, referred to as a classification genre) specified by the seller as the lowermost genre where the product or the like is classified in accordance with an operation given to the input device. Furthermore, the seller terminal device 101 inputs advertisement information for an advertisement of the product or the like, and information indicating the auction deadline of the product or the like. Subsequently, the seller terminal device 101 transmits the input information indicating the name of product or the like, information identifying the classification genre (hereinafter, referred to as a classification genre ID), advertisement information, and information indicating the auction deadline to the genre generation device 200.

The LAN card 200*f* of the genre generation device 200 illustrated in FIG. 3 receives the information indicating, for example, the name of product or the like from the seller terminal device 101. When the LAN card 200*f* illustrated in FIG. 2 receives the information indicating, for example, the name of product or the like, the CPU 200*a* executes a classifying process of the product or the like illustrated in FIG. 4. The classifying process of the product or the like illustrated in FIG. 4 is a process of classifying the product or the like indicated by the information received by the LAN card 200*f* into a genre identified by the classification genre ID.

Figure 5:
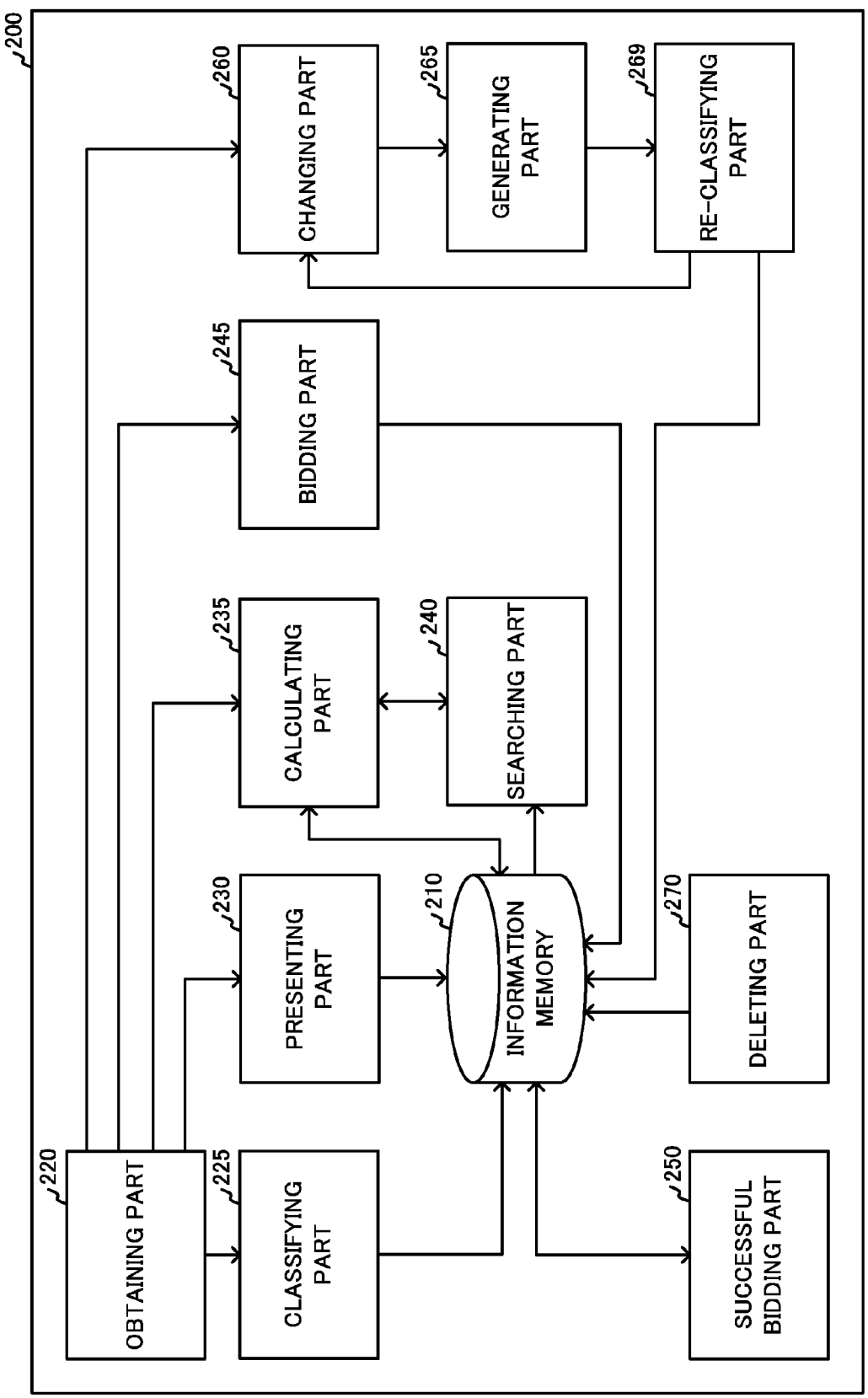
FIG. 5 is a functional block diagram illustrating an example function of the genre generation device.

Hence, the CPU 200*a* serves as a classifying part 225 illustrated in FIG. 5. Moreover, the CPU 200*a* also serves as an information memory 210 in cooperation with the hard disk 200*d*. Furthermore, the CPU 200*a* serves as an obtaining part 220 in cooperation with the LAN card 200*f*.

Figure 4:
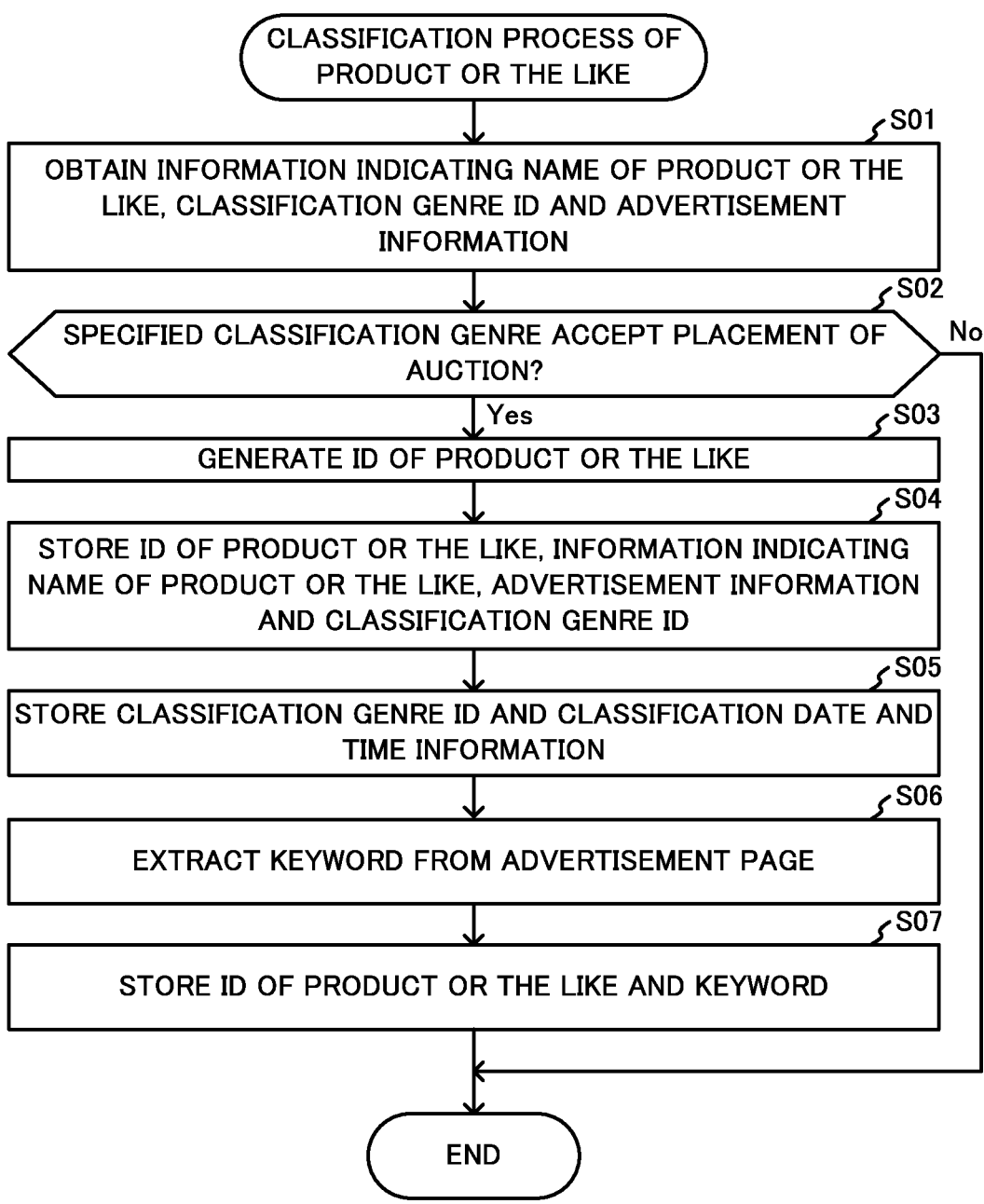
FIG. 4 is a flowchart illustrating an example classifying process of a product or the like executed by the genre generation device.

Before the classifying process of the product or the like in FIG. 4 is explained, an explanation will be given of data utilized for execution of the process.

The information memory 210 in FIG. 5 stores a genre table illustrated in FIG. 6. The genre table stores information having a genre ID, a genre name, a classified date and time, a number of classifications, a number of sales, and an auction availability flag associated with one another. The genre ID is the information identifying a genre as illustrated in FIG. 2. The genre name associated with the genre ID is information indicating the name of the genre identified by the genre ID. The classification date and time associated with the genre ID is information indicating a date and time at which the product or the like was classified into the genre identified by the genre ID at last. The number of classifications associated with the genre ID is the number of products or the like classified into the genre identified by the genre ID. Information indicating the number of sales associated with the genre ID is information indicating the number of products or the like classified into the genre identified by the genre ID and knocked down (that is, sold). The auction availability flag associated with the genre ID is a flag indicating whether or not the product or the like classified into the genre identified by the genre ID is available to an auction.

Moreover, the information memory 210 stores a genre hierarchy table illustrated in FIG. 7. The genre hierarchy table stores the genre ID stored in the genre table in FIG. 6, the genre name information, a lower genre ID, and information indicating the name of the lower genre in association with one another. The lower genre ID associated with the genre ID is the genre ID of a genre (hereinafter, referred to as a lower genre) belonging to the immediate lower layer of the genre identified by the former genre ID. The information indicating the name of the lower genre associated with the genre ID is information indicating the name of the lower genre identified by the lower genre ID.

Furthermore, the information memory 210 stores a table of product or the like illustrated in FIG. 8. The table of product or the like stores information identifying a product or the like (hereinafter, referred to as an ID of product or the like), information indicating the name of the product or the like, a classification genre ID that identifies the classification genre of the product or the like, information indicating the name of the classification genre (hereinafter, referred to as a classification genre name), auction information on an auction of the product or the like, and advertisement information advertising the product or the like in association with one another.

The auction information is information having information indicating the maximum bid price of the product or the like, information identifying a bidder that made a bid for the product or the like at the bid price (hereinafter, referred to as a bidder ID), information identifying the seller who sells the product or the like (hereinafter, referred to as a seller ID), and information indicating the auction deadline in association with one another.

The advertisement information is information having information indicating the name of an image file representing the advertisement of the product or the like (hereinafter, referred to as an advertisement file name), and information indicating the URL of the advertisement page (hereinafter, referred to as an advertisement page URL) in association with each other.

Moreover, the information memory 210 stores a keyword table of product or the like illustrated in FIG. 9. The keyword table of product or the like stores the ID of product or the like, the information indicating the name of the product or the like, and information indicating a keyword for explaining the product or the like in association with one another.

The information indicating a keyword associated with the ID of product or the like in the keyword table of product or the like in FIG. 9 may be information indicating a keyword extracted from the advertisement file of the product or the like identified by the ID of product or the like. In particular, such information may be a letter string (which is extracted from the detail of the advertisement contents) represented by an advertisement image stored in the advertisement file. The information is not limited to those examples, and the information indicating a keyword associated with the ID of product or the like may be information indicating a keyword selected by the seller of the product identified by the ID of product or the like.

Next, an explanation for the classifying process of a product or the like executing using the above-explained data will be restarted.

When the execution of the classifying process of the product or the like in FIG. 4 starts, the obtaining part 220 in FIG. 5 obtains, from the LAN card 200*f* in FIG. 3, information indicating the name of the product or the like, the classification genre ID, and the advertisement information received from the seller terminal device 101 (step S01).

Subsequently, the classifying part 225 in FIG. 5 refers to the auction availability flag associated with the genre ID that is the same as the classification genre ID obtained through the step S01 from the genre table in FIG. 6. Next, the classifying part 225 determines whether or not the specified classification genre can be placed on an auction based on the referred auction availability flag (step S02). At this time, when determining that the specified classification genre is not available for an auction (step S02: NO), the classifying part 225 terminates the execution of the classification process of the product or the like.

Conversely, when determining that the specified classification genre is available for an auction (step S02: YES), the classifying part 225 generates the ID of product or the like for the product or the like to be placed on an auction (step S03). Next, the classifying part 225 stores, in the table of product or the like in FIG. 8, information having the ID of product or the like generated in the step S03, the information indicating the name of product or the like obtained in the step S01, the classification genre ID, the information indicating the classification genre name, and the advertisement information associated with one another (step S04).

Next, the classifying part 225 obtains a system date and time managed by an OS (Operating System), and sets the obtained system date and time as classification date and time when the product or the like was classified into the classification genre at last. Subsequently, the classifying part 225 stores, in the genre table in FIG. 6, information having the classification genre ID and information indicating the classification date and time in association with each other (step S05).

Subsequently, the classifying part 225 extracts a keyword from the advertisement page present in the URL represented by the advertisement information obtained in the step S01 (step S06).

The classifying part 225 may obtain in the step S06 a word that is used more than a predetermined number for a keyword extraction in the advertisement page as a keyword. Moreover, it is fine for the classifying part 225 to obtain a word used more than the predetermined number for a keyword extraction in the advertisement page as a keyword but not obtain a word used less than the predetermined number as a keyword. Information indicating the predetermined number for a keyword extraction is stored in the information memory 210.

Thereafter, the classifying part 225 stores, in the keyword table of product or the like in FIG. 9, one or more extracted keywords and the ID of product or the like generated in the step S03 in association with each other (step S07), and terminates the execution of the classifying process of the product or the like.

Next, an explanation will be given of a search query used for a searching of a product or the like to be bid.

The bidder terminal device 102 in FIG. 1 allows the user who attempts to make a bid for a product or the like placed on an auction to operate the input device, inputs various information like a search query, and transmits the input information to the genre generation device 200. Moreover, the bidder terminal device 102 receives information transmitted from the genre generation device 200, and displays the received information on the display.

In this embodiment, an explanation will be given of a case in which the kind of search query to be input is one of the following four kinds. The first kind is a search query including a keyword for explaining the product or the like. The second kind is a search query including a keyword and a refinement instruction. The third kind is a search query including multiple keywords and an operator for a Boolean search coupling those multiple keywords. The fourth kind is a search query including multiple keywords (that is, includes the multiple keywords but does not include an operator). The kinds of the search query to be input are not limited to the above-explained four kinds.

The kinds of search query will be explained below.

The search query including one keyword is a query for instructing the genre generation device 200 to reply a result of a search of the product or the like explained with such a keyword in the products or the like placed on an auction.

The search query including one keyword and a refinement instruction is a query for instructing, based on the product or the like further explained with such a keyword, a refinement of the products or the like (that is, a search result) searched based on a previously transmitted search query.

An explanation will be given of a case in which the operator for a Boolean search includes an AND operator, an OR operator, and a subtraction operator, but the present invention is not limited to this case. The search query including multiple keywords and a Boolean search operation coupling the multiple keywords includes queries expressed by, for example, the following formulae (1) to (3).

$$\text{First keyword AND second keyword} \quad (1)$$

$$\text{First keyword OR second keyword} \quad (2)$$

$$\text{First keyword-second keyword} \quad (3)$$

The search query expressed by the formula (1) is a query for instructing a reply of a result of a search of the product or the like explained with the first keyword and also explained with the second keyword. That is, the search query expressed by the formula (1) is a query for instructing a reply of a result of a refinement of the product or the like explained with the second keyword from the products or the like explained with the first keyword, or, a result of a refinement of the product or the like explained with the first keyword from the products or the like explained with the second keyword.

The search query expressed by the formula (2) is a query for instructing a reply of a result of a search of the product or the like explained with the first keyword or the second keyword. That is, the search query expressed by the formula (2) is a query for instructing a reply of both searches of the product or the like explained with the first keyword and the product or the like explained with the second keyword.

The search query expressed by the formula (3) is a query for instructing a reply of a search result of the product or the like explained with the first keyword but not explained with the second keyword. That is, the search query expressed by the formula (3) is a query for instructing a reply of a result obtained by subtracting the product or the like explained with the second keyword from the search result of the products or the like explained with the first keyword.

When the user attempts to specify the search query having the first keyword and the second keyword coupled with each other by the OR operator, the user often determines that a first genre represented by the first keyword and a second genre represented by the second keyword belong to the same layer in the genre hierarchy. This is because the user tends to make a successful bid for both product or the like explained with the first keyword and product or the like explained with the second keyword.

As a specific example, the user who specifies a query "beef OR pork" often considers that the genre "beef" where the product explained with the keyword "beef" is classified and the genre "pork" where the product explained with the keyword "pork" is classified belong to the same layer where meat products are classified. Hence, the OR operator that couples the first keyword with the second keyword is referred to as a same-layer operator representing that the first genre and the second genre belong to the same layer.

In contrast, when the user attempts to specify the search query having the first keyword and the second keyword coupled with each other by the AND operator, the user often determines that the first genre represented by the first keyword and the second genre represented by the second keyword belong to different layers in the genre hierarchy. This is because the user attempts to make a successful bid for the product or the like explained with the second keyword and further refined from the products or the like explained with the first keyword, or the product or the like explained with the first keyword and further refined from the products or the like explained with the second keyword.

As a specific example, the user who specifies a query "beef AND rib roast" tends to make a successful bid for the product or the like explained with the second keyword "rib roast" and further refined from the products or the like explained with the first keyword "beef". That is, the user often considers that the genre "beef" where the product explained with the keyword "beef" is classified and the genre "rib roast" where the product explained with the keyword "rib roast" is classified belong to different layers. Hence, the AND operator that couples the first keyword and the second keyword is referred to as a different-layer operator representing that the first genre and the second genre belong to different layers.

Next, an explanation will be given of a bidding for a product or the like.

Figure 10:
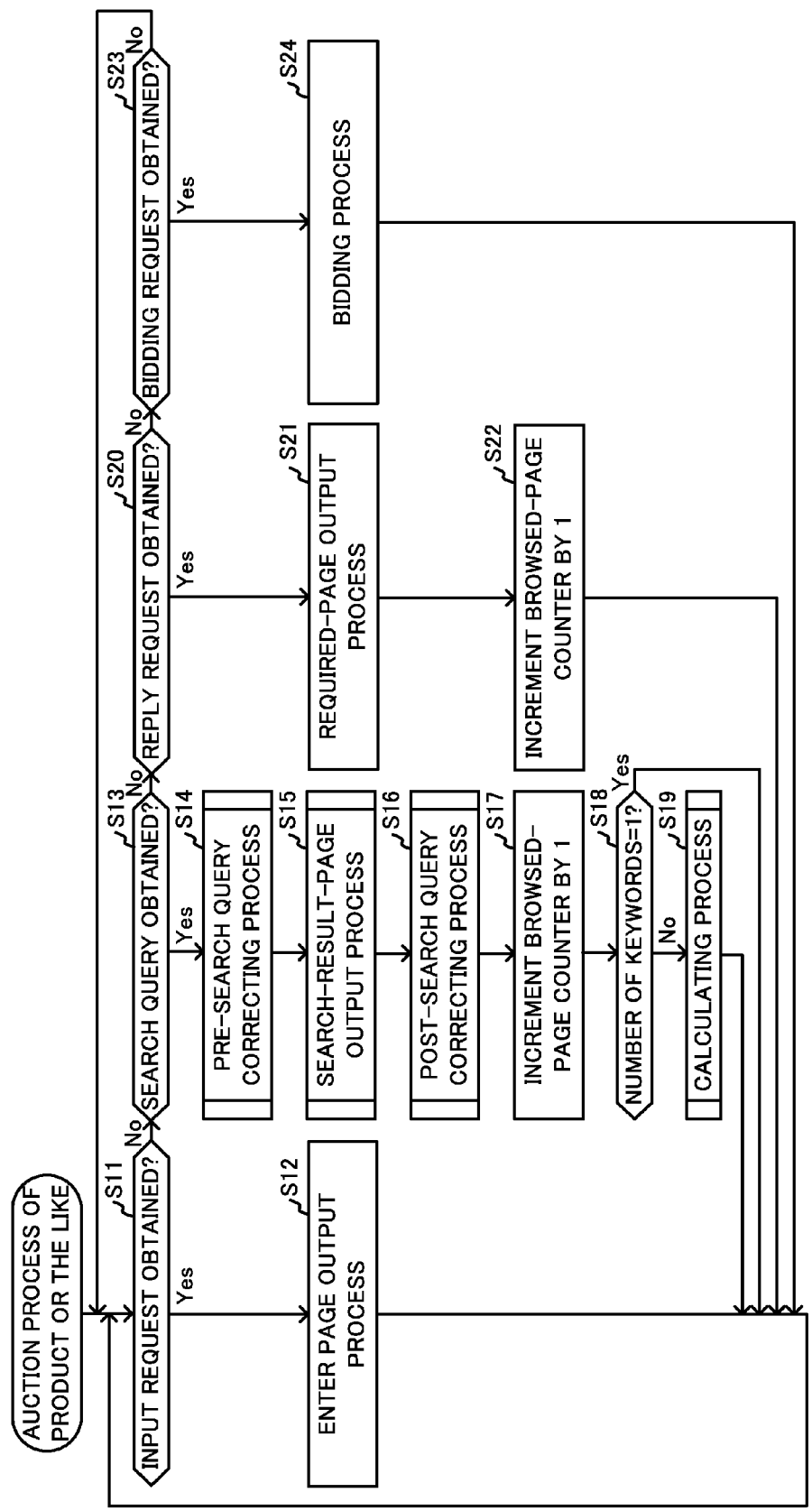
FIG. 10 is a flowchart illustrating an example auction process of product or the like executed by the genre generation device.

The CPU 200a of the genre generation device 200 illustrated in FIG. 3 executes an auction process of product or the like illustrated in FIG. 10 when the LAN card 200f receives information like a search query from the bidder terminal device 102. The auction process of product or the like is a process for carrying out an auction for a product or the like searched by the search query.

Upon execution of the auction process of product or the like, the CPU 200a also serves as a calculating part 235, a searching part 240, and a bidding part 245 all illustrated in FIG. 5. Moreover, the CPU 200a also serves as a presenting part 230 together with the LAN card 200f.

Before the auction process of product or the like in FIG. 10 is explained, an explanation will be given of data used for the execution of such a process.

The information memory 210 stores a number-of-obtainment table illustrated in FIG. 11. The number-of-obtainment table stores information indicating a word specified as the first keyword, information indicating a word specified as the second keyword, information indicating the number of obtainments of the different-layer query, and information indicating the number of obtainments of the same-layer query in association with one another.

The number of obtainments of the different-layer query is the number of obtained search queries (hereinafter, referred to as a different-layer query) including the first keyword and the second keyword coupled with each other by the different-layer operator. Moreover, the number of obtainments of the same-layer query is the number of obtained search queries (hereinafter, referred to as a same-layer query) including the first keyword and the second keyword coupled with each other by the same-layer operator.

Since the AND operator is referred to as the different-layer operator, the different-layer query is also referred to as an AND query, and the number of obtainments of the different-layer query is also referred to as the number of obtainments of the AND query.

Moreover, since the OR operator is referred to as the same-layer operator, the same-layer query is referred to as an OR query, and the number of obtainments of the same-layer query is also referred to as the number of obtainments of the OR query.

The information memory 210 also stores a sequence table illustrated in FIG. 12. The sequence table stores information representing a word specified as the first keyword, information representing a word specified as the second keyword, information on the number of preceding times of the first keyword, and information on the number of following times of the first keyword in association with one another.

The number of preceding times of the first keyword is a number of cases in which the first keyword is specified prior to the second keyword (namely, the first keyword precedes the second keyword in the search query) when the AND operator is specified as the operator that couples the first keyword with the second keyword. The number of following times of the first keyword is a number of cases in which the first keyword is specified following to the second keyword (namely, the first keyword follows the second keyword in the search query).

An explanation will be given of a specific example case in which the first keyword is "rib roast" and the second keyword is "homegrown". The sequence table in FIG. 12 stores information indicating that the number of cases (that is, also referred to as a number of obtainments of preceding query) in which the search query "rib roast AND homegrown" having the first keyword preceding the second keyword is specified is "200" times. Moreover, the sequence table in FIG. 12 stores information indicating that the number of cases (that is, also referred to as a number of obtainments of following query) in which the search query "homegrown AND rib roast" is specified is "30" times.

Furthermore, the information memory 210 stores a number-of-search table illustrated in FIG. 13. The number of search table stores information representing a keyword used for a search of a product or the like, and information indicating the number of searches of the product or the like with the keyword (hereinafter, referred to as a number of searches) in association with each other.

Next, an explanation will be given of an example case in which the genre generation device 200 obtains twice a search query including one keyword within a predetermined time for the auction process of product or the like using the above-explained data.

When the LAN card 200f of the genre generation device 200 illustrated in FIG. 3 receives an input request for requesting a reply of an enter page from the bidder terminal device 102, the CPU 200a starts executing the auction process of product or the like illustrated in FIG. 10. The enter page is a page utilized for inputting a search query.

Figure 14:
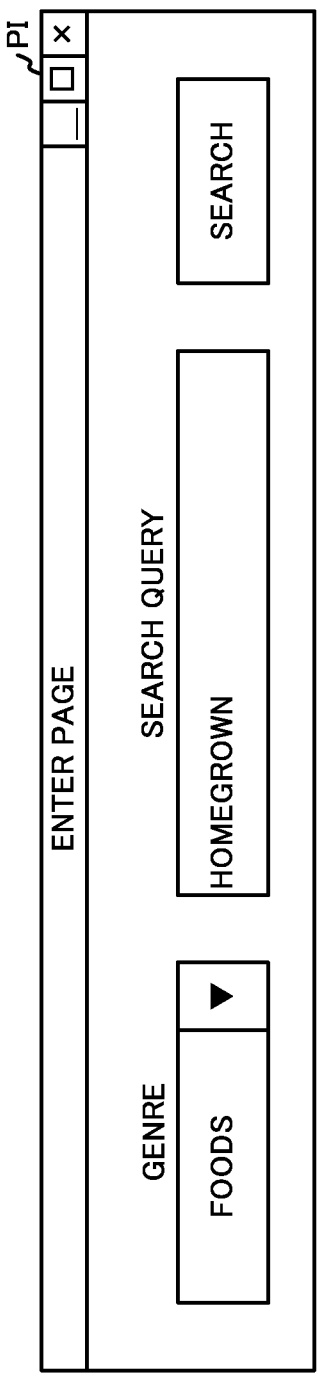
FIG. 14 is a diagram illustrating an example enter page displayed by a bidder terminal device.

When the execution of the auction process of product or the like in FIG. 10 starts, the obtaining part 220 in FIG. 5 obtains information received from the bidder terminal device 102 through the LAN card 200f in FIG. 3. Next, when the obtaining part 220 determines that an input request has been received from the bidder terminal device 102 (step S11: YES), the presenting part 230 in FIG. 5 obtains information representing an enter page P1 illustrated in FIG. 14 from the information memory 210. Next, the presenting part 230 outputs the obtained information representing the enter page P1 to the LAN card 200f in FIG. 3 (step S12 in FIG. 10). Subsequently, the LAN card 200f replies the output information to the bidder terminal device 102.

When receiving the information representing the enter page P1, the bidder terminal device 102 displays the enter page P1 represented by the received information on the display. Next, the bidder terminal device 102 is operated by the user who views the enter page P1. The bidder terminal device 102 inputs, in accordance with the given operation, the search query "homegrown" specified by the user and the genre ID "J00002" of the genre "foods" specified as a genre where the product or the like to be searched with that query belongs. Subsequently, the bidder terminal device 102 transmits the input search query "homegrown" and the genre ID "J00002" to the genre generation device 200. The input search query and genre ID are not limited to those examples.

After the step S12 in FIG. 10, the LAN card 200f of the genre generation device 200 in FIG. 3 receives the search query "homegrown" and the genre ID "J00002" from the bidder terminal device 102. Next, the obtaining part 220 in FIG. 5 obtains those search query "homegrown" and genre ID "J00002" from the LAN card 200f. Subsequently, when the obtaining part 220 determines that what is obtained from the bidder terminal device 102 is not an input request (step S11: NO in FIG. 10) but a search query (step S13: YES), a pre-search query correcting process illustrated in FIG. 15 is executed (step S14).

Figure 15:
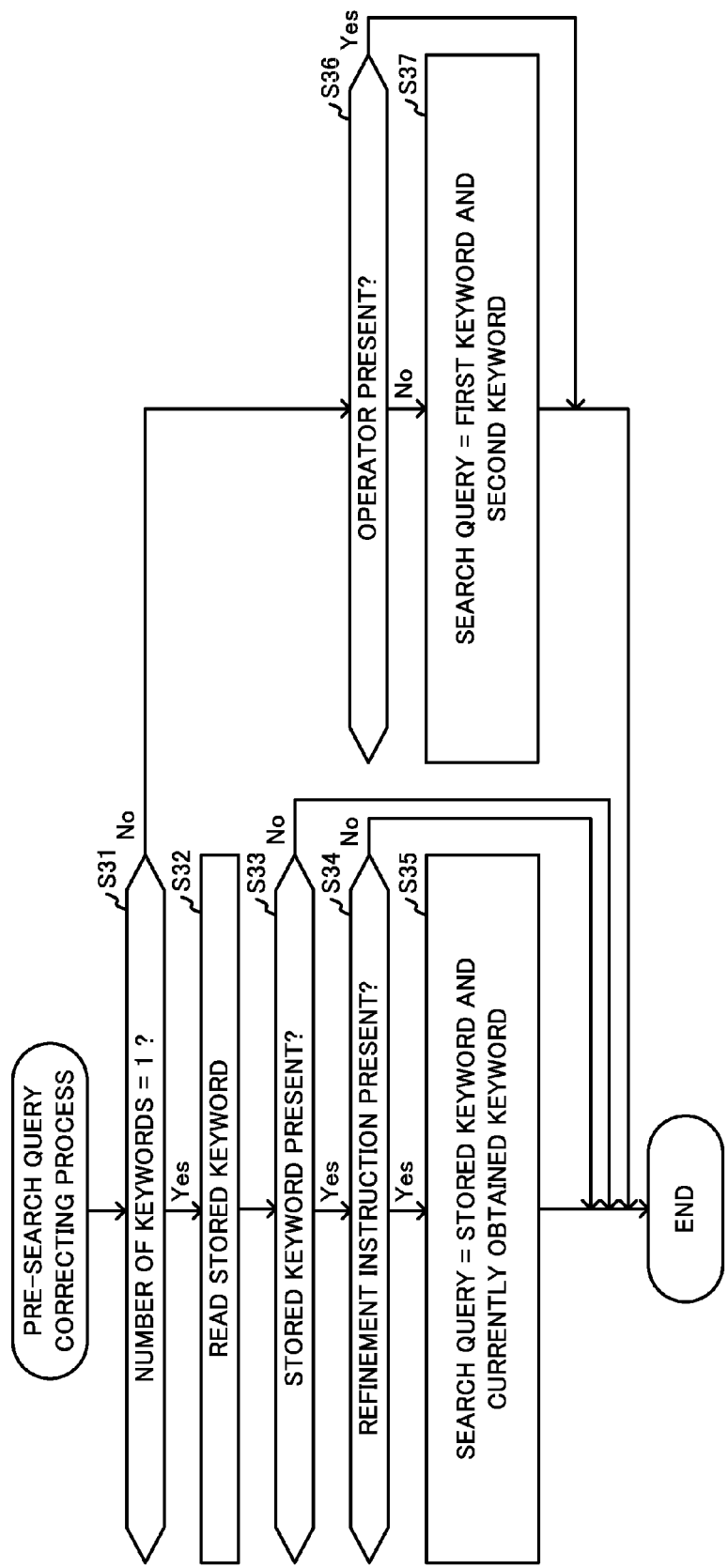
FIG. 15 is a flowchart illustrating an example pre-search query correcting process executed by the genre generation device.

When the pre-search query correcting process in FIG. 15 starts, the calculating part 235 in FIG. 5 determines that the keyword in the search query is one which is "homegrown" (step S31: YES). Next, the calculating part 235 reads the information representing the keyword (hereinafter, referred to as a stored keyword) stored in the information memory 210 in the step S77 in FIG. 18 to be discussed later (step S32). At this time, since the process in the step S77 in FIG. 18 has not been executed yet, the calculating part 235 determines that no information representing the stored keyword is stored in the information memory 210 (step S33: NO), and terminates the execution of the pre-search query correcting process.

Figure 16:
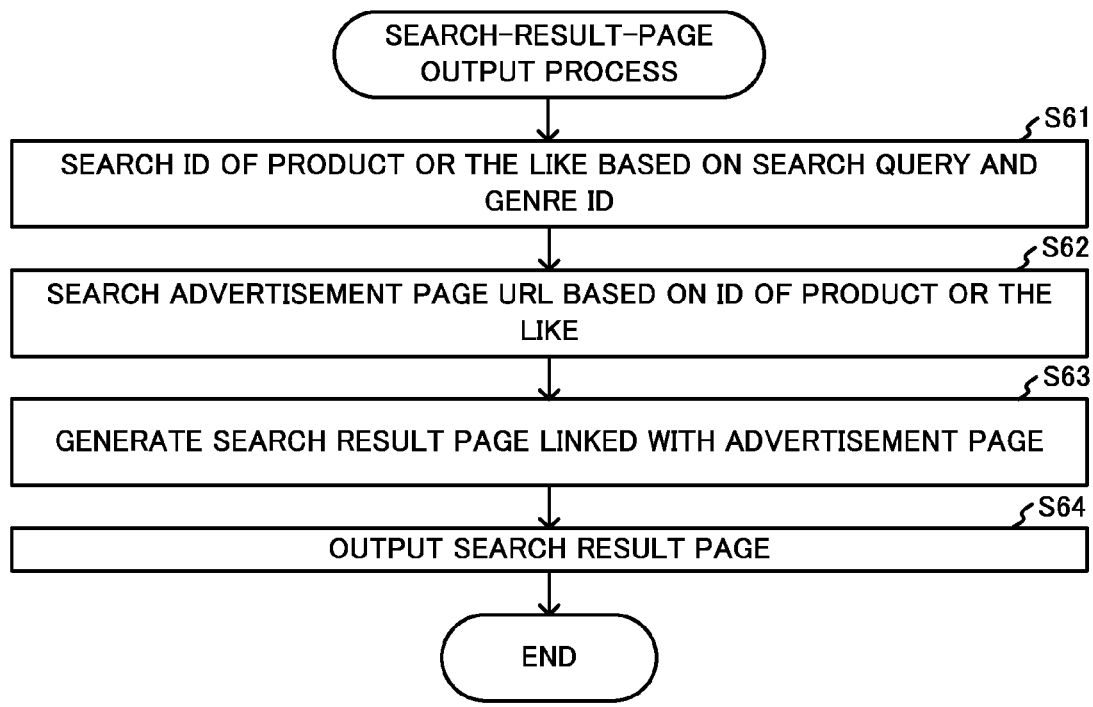
FIG. 16 is a flowchart illustrating an example search-result-page output process executed by the genre generation device.

After the step S14 in FIG. 10, a search-result-page output process illustrated in FIG. 16 is executed (step S15).

When the search-result-page output process in FIG. 16 starts, the searching part 240 in FIG. 5 searches in the lower genre IDs from "J00021" to "J00023" associated with the obtained genre ID "J00002" from the genre hierarchy table in FIG. 7. Moreover, the searching part 240 searches in the lower genre IDs from "J00211" to "J00213" associated with the same genre ID as the lower genre ID "J00021". Furthermore, the searching part 240 searches in the lower genre ID "J02111" associated with the same genre ID as the lower genre ID "J00211".

Next, the searching part 240 obtains the system date and time from the OS. Subsequently, the searching part 240 searches, from the table of product or the like in FIG. 8, in product IDs "M001" to "M006" and "M010" associated with the same classification genre ID as any of the obtained genre ID "J00002", the lower genre IDs from "J00021" to "J00023", from "J00211" to "J00213", and "J02111" and information indicating the auction deadline later than the system date and time.

Thereafter, the searching part 240 searches in the IDs of product or the like from "M001" to "M003" associated with the information indicating the same keyword as the obtained search query "homegrown" among the obtained product IDs from "M001" to "M006" and "M010" from the keyword table of product or the like in FIG. 9 (step S61 in FIG. 16).

Next, the searching part 240 searches information indicating the advertisement file name advertising the product or the like identified by the ID based on the IDs of the product or the like from "M001" to "M003" searched in the step S61, information indicating the advertisement page URL, and information indicating the name of the product or the like, respectively, from the table of product or the like in FIG. 8 (step S62). Through this process, the searching part 240 obtains information indicating the name of product or the like that is "XA beef", information indicating "XB beef", information indicating "XC beef", and the like.

Next, the presenting part 230 in FIG. 5 generates a search result page PC1 illustrated in FIG. 17 (step S63). The search result page PC1 has advertisement images PR01 to PR03 posted thereon and represented by the electric files of the advertisement file name represented by the information obtained in the step S62 in FIG. 16. Moreover, the posted advertisement images are linked with an advertisement page for advertising the product or the like advertised by the advertisement images. Subsequently, the presenting part 230 outputs information on the generated search result page PC1 to the LAN card 200f in FIG. 3 (step S64). The LAN card 200f replies the output information to the bidder terminal device 102. Subsequently, the presenting part 230 terminates the execution of the search-result-page output process.

Figure 18:
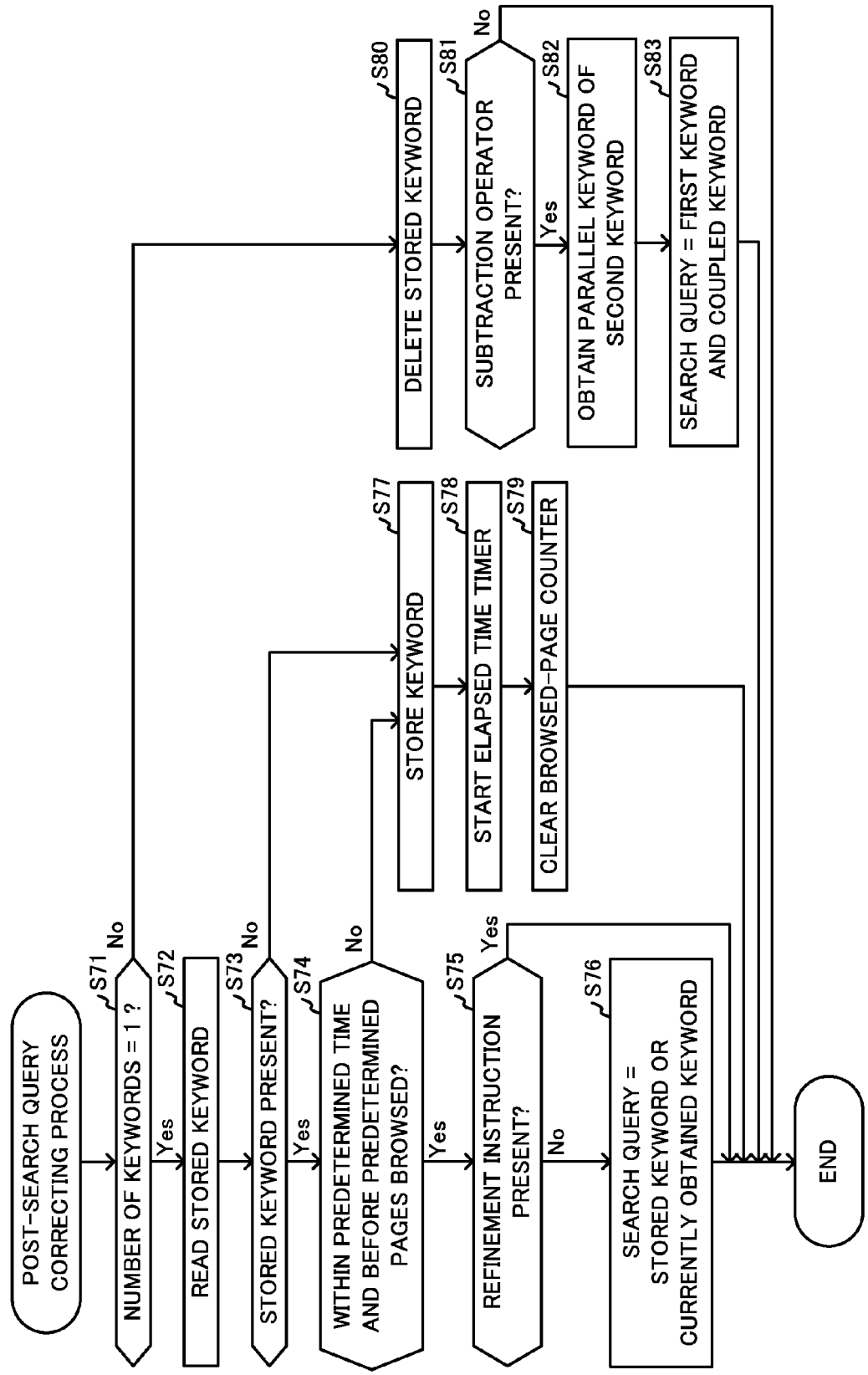
FIG. 18 is a flowchart illustrating an example post-search query correcting process executed by the genre generation device.

When the execution of the step S15 in FIG. 10 completes, the calculating part 235 executes a post-search query correcting process illustrated in FIG. 18 (step S16).

When the post-search query correcting process in FIG. 18 starts, the calculating part 235 executes the similar processes as those of the steps S31 and S32 in FIG. 15 (steps S71 and S72). Subsequently, the calculating part 235 determines that no stored keyword is stored in the information memory 210 (step S73: NO). Thereafter, the calculating part 235 stores information indicating the keyword "homegrown" contained in the currently obtained search query as information indicating a stored keyword in the information memory 210 (step S77).

Next, the calculating part 235 clears a software timer (hereinafter, referred to as an elapsed time timer) that clocks an elapsed time from the date and time (hereinafter, referred to as query specified date and time) at which the search query containing the stored keyword "homegrown" was specified, and starts over such a software timer (step S78).

Moreover, the calculating part 235 clears a browsed-page counter for calculating the number of web pages browsed by the user of the bidder terminal device 102 after the query specified date and time by letting the value of the browsed-page counter to be "0" (step S79), and terminates the execution of the post-search query correcting process.

After the step S16 in FIG. 10, the calculating part 235 increases the value of the browsed-page counter cleared in the step S79 in FIG. 18 by "1" (step S17). This is because the user of the bidder terminal device 102 browses the search result page PC1.

Next, when the calculating part 235 determines that the keyword contained in the search query is one that is "home-grown" (step S18: YES), the above-explained processes from the step S11 are repeated.

The user of the bidder terminal device 102 views the search result page PC1 in FIG. 17, and decides, as a product that is a bidding target, the product "XA beef" from the products or the like advertised by the respective advertisement images PR01 to PR03 posted on the search result page PC1.

Next, the input device of the bidder terminal device 102 is operated by the user, and inputs signals for selecting the advertisement image PR01 for advertising the product "XA beef" that is a bidding target. Subsequently, the bidder terminal device 102 transmits a reply request for a reply of the linked advertisement page to the genre generation device 200. The reply request includes information on the URL of the advertisement page "./public_dir/C001.html" linked to the advertisement image PR01 selected by the input signals.

The obtaining part 220 in FIG. 5 obtains information received from the bidder terminal device 102 through the LAN card 200f, and determines that the obtained information is not an input request (step S11 in FIG. 10: NO). Next, the obtaining part 220 determines that the obtained information is not a search query (step S13: NO), but is a reply request (step S20: YES). Subsequently, the obtaining part 220 executes a requested page output process for outputting the advertisement page to which a reply is requested by the reply request (step S21).

In this requested page output process, the obtaining part 220 in FIG. 5 extracts information indicating the URL of the advertisement page "./public_dir/C001.html" from the reply request. Subsequently, the searching part 240 searches information indicating a bid price "3000" associated with the information indicating the advertisement page URL from the table of product or the like in FIG. 8. Thereafter, the searching part 240 reads an advertisement page PA illustrated in FIG. 19 and present in the advertisement page URL from the information memory 210. The advertisement page PA has an image PD of the product or the like subjected to the advertisement and an advertisement text TA of the product or the like both posted thereon.

Next, the presenting part 230 in FIG. 5 posts the information indicating the searched bid price "3000" on the read advertisement page PA, and outputs information on this advertisement page PA as information on a requested page to the LAN card 200f. Subsequently, the calculating part 235 increases the value of the browsed-page counter by "1" (step S22 in FIG. 10). Thereafter, the LAN card 200f replies the information on the advertisement page to the bidder terminal device 102.

Figure 19:
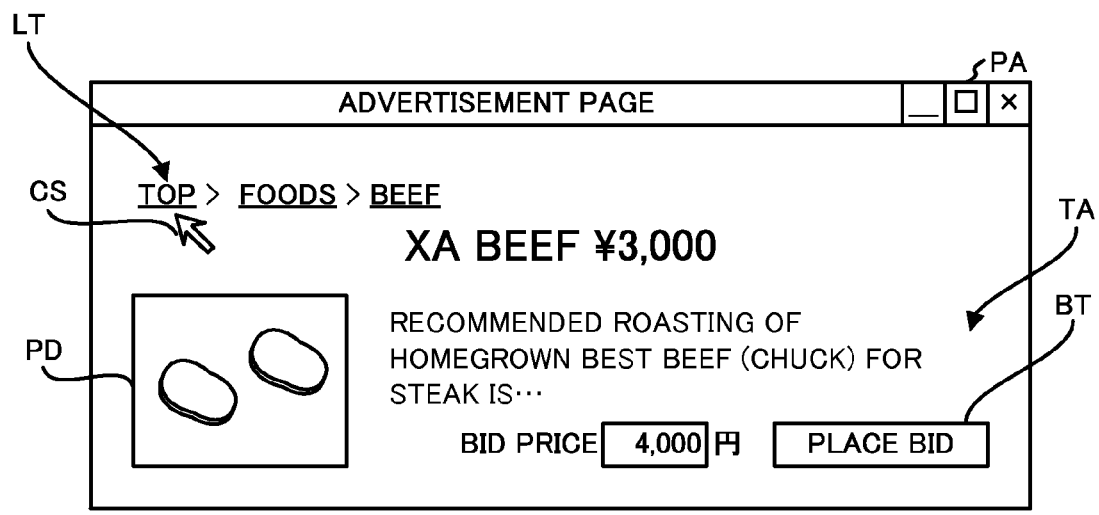
FIG. 19 is a diagram illustrating an example advertisement page displayed by the terminal device.

The bidder terminal device 102 displays the advertisement page PA in FIG. 19 represented by the information received from the genre generation device 200. When the user of the bidder terminal device 102 views the advertisement page PA, and makes sure that the user has an intention to place a bid on the product "XA beef" advertised by the advertisement page PA, the user operates the input device of the bidder terminal device 102. This causes the bidder terminal device 102 to transmit a bidding request for requesting the genre generation device 200 to accept a bidding on the product or the like on which the user has an intention to place a bid to the genre generation device. The bidding request includes the ID of product or the like "M001" on which the user has an intention to place a bid, information indicating a bid price "4000" specified by the user, and a bidder ID "B101" of the user.

When the process in the step S22 in FIG. 10 completes, the obtaining part 220 in FIG. 5 obtains from the LAN card 200f the received information from the bidder terminal device 102. Next, the obtaining part 220 determines that the obtained information is not an input request (step S11: NO in FIG. 10), a search query (step S13: NO), a reply request (step S20: NO), but is a bidding request (step S23: YES). Next, the bidding part 245 in FIG. 5 executes a bidding process in accordance with the bidding request (step S24). This bidding process is to store information including the ID of product or the like "M001", the bidder ID "B101", and the bid price "4000" in association with one another in the table of product or the like in FIG. 8. When it is determined in the step S23 that the obtained information is not a bidding request (step S23: NO), the above-explained processes are repeated from the step S11.

A letter string "top" LT linked with an enter page is described on the advertisement page PA in FIG. 19. Hence, the user of the bidder terminal device 102 who views the advertisement page PA operates the input device of the bidder terminal device 102 to superimpose a cursor CS displayed in the display on the letter string "top" LT, and clicks this letter string. This is to search again a new product or the like. Subsequently, the bidder terminal device 102 transmits an input request to the genre generation device 200, and displays the enter page replied from the genre generation device 200. Next, the bidder terminal device 102 is operated by the user to enter a search query "Aussie" specified by the user, and transmits this search query to the genre generation device 200.

Subsequently, the obtaining part 220 in FIG. 5 obtains the information received from the bidder terminal device 102 through the LAN card 200f in FIG. 3. Next, the obtaining part 220 determines that the obtained information is not an input request (step S11 in FIG. 10: NO), but is a search query (step S13: YES), the pre-search query correcting process is executed again (step S14).

When the pre-search query correcting process in FIG. 15 starts, the calculating part 235 in FIG. 5 executes the processes in the step S31 and the step S32, and determines that information indicating the stored keyword "home-grown" is already stored in the information memory 210 (step S33: YES). Subsequently, the calculating part 235 determines that no refinement instruction is contained in the search query currently obtained (step S34: NO), and terminates the pre-search query correcting process.

After the step S14 in FIG. 10, the search-result output process is executed again (step S15). Through this process, a search result page posting thereon the products "XD beef", "XE beef", "XF beef", and "YA pork" searched from the keyword table of product or the like in FIG. 9 based on the search query "Aussie" is transmitted to the bidder terminal device 102.

Subsequently, the calculating part 235 executes again the post-search query correcting process illustrated in FIG. 18 (step S16). When the post-search query correcting process in FIG. 18 starts, the calculating part 235 executes the processes from the step S71 to the step S73. Next, the calculating part 235 refers to the timer value of the elapsed time timer started in the step S78 and the value of the browsed-page counter cleared in the step S79. Thereafter, the calculating part 235 determines whether or not it is within a predetermined time from the query specified date and time and it is before the user browses the web page by the predetermined number of pages (step S74).

More specifically, when the timer value of the elapsed time timer is smaller than a timer value threshold, the calculating part 235 determines that it is within the predetermined time from the query specified date and time. Moreover, the calculating part 235 determines that it is before the user browses the web page by the predetermined number of pages when the value of the browsed-page counter is smaller than a browsed-page counter threshold. Information indicating the timer value threshold and information indicating the browsed-page counter threshold are stored in the information memory 210.

The calculating part 235 determines in the step S74 that it is within the predetermined time from the query specified date and time and it is before the user browses the web page by the predetermined number of pages (step S74: YES). Next, the calculating part 235 determines that no refinement instruction is contained in the search query "Aussie" (step S74: NO). Subsequently, the calculating part 235 generates a search query "homegrown OR Aussie" having the stored keyword "homegrown" and the keyword "Aussie" currently obtained (hereinafter, referred to as a currently obtained keyword) coupled together by the OR operator. Thereafter, the calculating part 235 corrects the currently obtained search query "Aussie" to the generated search query "homegrown OR Aussie" (step S76), and terminates the execution of the post-search query correcting process.

The explanation will be given of an example case in which the user specifies the search query "Aussie" within the predetermined time after the search query "homegrown" is specified and before browsing the web page by the predetermined number of pages from the date and time at which such a search query is specified, and the following two actions hardly differ from each other for the user. The first action is to select a product or the like to place a bid among products or the like searched by the search query "homegrown", and to select a product or the like to place a bid among products or the like searched by the search query "Aussie". Moreover, the second action is to select a product or the like to place a bid among products or the like searched by the search query "homegrown OR Aussie". That is, when the user is fluent with the way of using the OR operator, it is presumed that such a user does not specify the search query "Aussie" after specifying the search query "homegrown" but specifies the search query "homegrown OR Aussie".

When determining in the step S74 that the predetermined time has elapsed from the query specified date and time or the user has browsed the web page by equal to or greater than the predetermined number of pages from the query specified date and time (step S74: NO), the calculating part 235 terminates the execution of the post-search query correcting process after executing the processes from the step S77 to the step S79. That is, in the step S77, the calculating part 235 overwrites the information indicating the keyword stored in the information memory 210 with information indicating the currently obtained keyword. Next, in the steps S78 and S79, the calculating part 235 once clears the elapsed time timer and restarts such a timer and clears the browsed-page counter.

When the predetermined time has elapsed from the date and time at which the previous search query was specified or when the user specifies a search query after browsing the web page by equal to or greater than the predetermined number of pages, even if the user is fluent with the way of using the OR operator, the user hardly specifies a search query obtained by coupling the previous search query with the currently obtained keyword using the OR operator. In this case, the user often has no intention to refine the products or the like searched based on the previous search query and based on the currently obtained keyword.

After the step S16 in FIG. 10, the calculating part 235 increases the value of the browsed counter by "1" (step S17), and determines that the number of keywords contained in the corrected search query "homegrown OR Aussie" is "2" but is not the value "1" (step S18: NO). Subsequently, the calculating part 235 executes a calculation process illustrated in FIG. 20 (step S19), and repeats the above-explained processes from the step S11.

Figure 20:
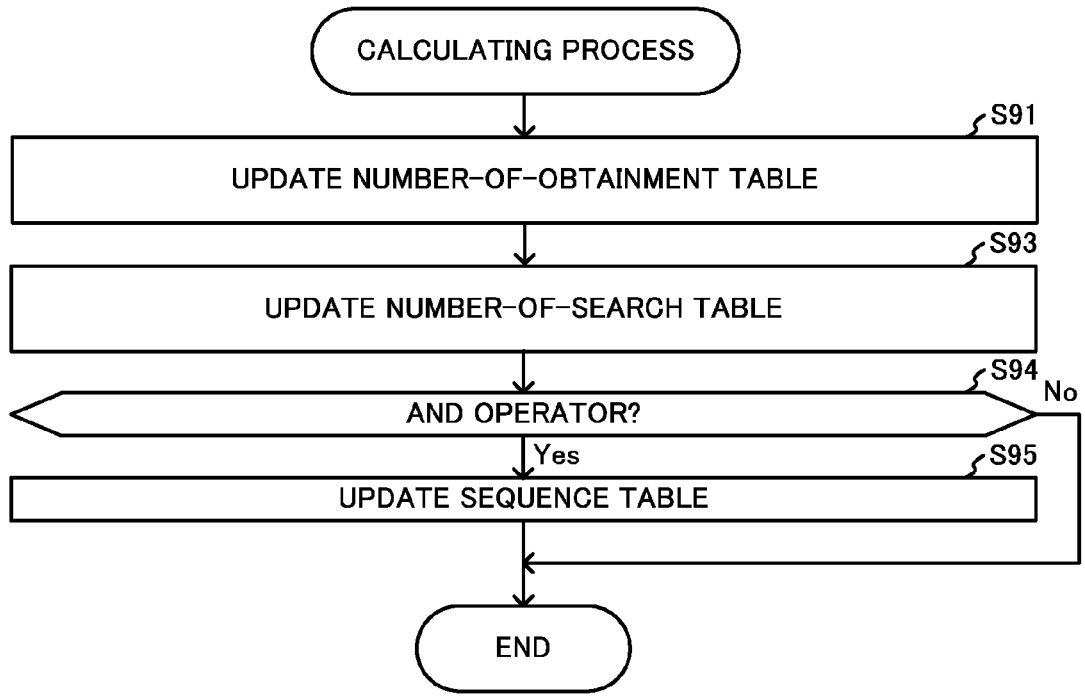
FIG. 20 is a flowchart illustrating an example calculating process executed by the genre generation device.

When the calculation process in FIG. 20 starts, the calculating part 235 updates the number-of-obtainment table in FIG. 11 based on the corrected search query "homegrown OR Aussie" (step S91). More specifically, the calculating part 235 updates the information indicating the same-layer query obtainment number (that is, OR query obtainment number) "108" that is the number of obtained same-layer queries including the keywords "homegrown" and "Aussie" with information indicating the number of obtainments "109".

Next, the calculating part 235 updates, in the number-of-search table in FIG. 13, the information indicating the number of searches "340" associated with the information indicating the keyword "homegrown" contained in the search query with information indicating the number of searches "341". Moreover, the calculating part 235 updates information indicating the number of searches "320" associated with the information indicating the keyword "Aussie" contained in the search query with information indicating the number of searches "321" (step S93 in FIG. 20).

Subsequently, the calculating part 235 determines that the operator contained in the search query "homegrown OR Aussie" is the OR operator (step S94: NO), and terminates the execution of the calculation process.

Next, an explanation will be given of, with respect to the auction process of product or the like explained above, an example case in which the genre generation device 200 obtains a search query including a refinement instruction.

When the bidder terminal device 102 transmits the search query "homegrown" to the genre generation device 200, the genre generation device 200 replies the search result page PC1 illustrated in FIG. 17. The user of the bidder terminal device 102 gives an operation of narrowing down the products or the like posted on the search result page PC1 to products explained with a keyword "chuck" to the input device of the bidder terminal device 102. Next, the bidder terminal device 102 transmits a search query including the keyword "chuck" specified by the user and the refinement instruction to the genre generation device 200.

The obtaining part 220 of the genre generation device 200 in FIG. 5 obtains information received through the LAN card 200f, and determines that the obtained information is not an input request "step S11 in FIG. 10: NO), but is a search query "step S13: YES). Next, the pre-search query correcting process in FIG. 15 is executed again (step S14).

When the pre-search query correcting process in FIG. 15 starts, the calculating part 235 in FIG. 5 executes the processes from the step S31 to the step S33. Next, the calculating part 235 determines that the keyword "homegrown" contained in the previously obtained search query is already stored in the information memory 210 (step S33: YES). Subsequently, the calculating part 235 determines whether or not the currently obtained search query includes a refinement instruction (step S34). At this time, the calculating part 235 determines that the search query includes the refinement instruction (step S34: YES), and determines that the currently obtained search query can be regarded as a query having the stored keyword "homegrown" and the currently obtained keyword "chuck" coupled with the AND operator. Next, the calculating part 235 corrects the currently obtained search query as "homegrown AND chuck" (step S35). This is because the genre generation device attempts to perform a searching in accordance with the refinement instruction. Subsequently, the calculating part 235 sets the stored keyword "homegrown" as the first keyword, and the keyword currently obtained (referred to as a currently obtained keyword) "chuck" as the second keyword, and terminates the execution of the search query correcting process.

Figure 21:
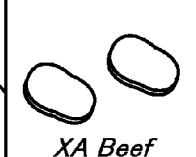
FIG. 21 is a diagram illustrating an example search result page displayed by the terminal device.

After the step S14 in FIG. 10, the search result output process is executed (step S15). In the process in the step S15, the products or the like "XA beef", "XB beef", and "XC beef" searched based on the first keyword (that is, the stored keyword) "homegrown" are narrowed down to the products or the like "XA beef" and "XB beef" corresponding to the second keyword (that is, the currently obtained keyword) "chuck" in the keyword table of product or the like in FIG. 9. Next, a search result page PC2 illustrated in FIG. 21 and posting thereon the narrowed products or the like is replied to the bidder terminal device 102.

Subsequently, the calculating part 235 executes again the post-search query correcting process illustrated in FIG. 18 (step S16). When the post-search query correcting process in FIG. 18 starts, the calculating part 235 determines that the keywords contained in the search query corrected through the pre-search query correcting process are two that are "homegrown" and "chuck", and is not one (step S71: NO). Next, the calculating part 235 deletes the stored keyword stored in the step S77 (step S80). This is because a correction using the stored keyword becomes unnecessary. Subsequently, the calculating part 235 determines that the search query includes no subtraction operator (step S81: NO), and terminates the execution of the post-search query correcting process.

After the step S16 in FIG. 10, the calculating part 235 increases the value of the browsed counter by "1" (step S17). Next, the calculating part determines that the keywords contained in the search query are "two" that are "homegrown" and "chuck", and are larger than "1" (step S18: NO). Subsequently, the calculating part 235 executes the calculation process in FIG. 20 (step S19), and repeats the processes from the step S11.

When the calculation process in FIG. 20 starts, the calculating part 235 updates, in the number-of-obtainment table in FIG. 11, information indicating the different-layer query obtainment number (that is, an AND query obtainment number) "100" that is the number of obtainments of the different-layer query coupling the keyword "homegrown" with the keyword "chuck" with information indicating the number of obtainments "101" (step S91).

Subsequently, after executing the process in the step S93, the calculating part 235 determines that the operator contained in the search query "homegrown AND chuck" is the AND operator (step S94: YES).

Next, the calculating part 235 updates, in the sequence table in FIG. 12, information indicating the number of preceding times "20" of the keyword "homegrown" associated with the information indicating the keyword "homegrown" and the information indicating the keyword "chuck" with information indicating the number of preceding times "21" (step S95). Thereafter, the calculating part 235 terminates the execution of the calculation process.

Next, with respect to the auction process of product or the like already explained, an explanation will be given of an example case in which the genre generation device 200 obtains a search query including the first keyword and the second keyword but does not include an operator.

When the bidder terminal device 102 transmits a search query "homegrown chuck" to the genre generation device 200, the obtaining part 220 of the genre generation device 200 obtains information received through the LAN card 200f. Next, the obtaining part 220 determines that the obtained information is not an input request (step S11 in FIG. 10: NO), but is a search query (step S13: YES). Subsequently, after the pre-search query correcting process in FIG. 15 is executed again (step S14) and the processes from the step S15 to the step S19 are executed, the processes from the step S11 are repeated.

In the step S14 in FIG. 10, when the pre-search query correcting process in FIG. 15 starts, the calculating part 235 in FIG. 5 determines that the keywords contained in the search query are "two" that are the first keyword "homegrown" and the second keyword "chuck", and are not "one" (step S31: NO). Next, the calculating part 235 determines that the search query includes no operator (step S36: NO). Subsequently, the calculating part 235 corrects the currently obtained query to a search query "homegrown AND chuck" having the first keyword and the second keyword coupled with each other by the AND operator that is a predetermined operator (step S37), and terminates the pre-search query correcting process. Information indicating the predetermined operator is stored in the information memory 210. Moreover, the predetermined operator is not limited to the AND operator, but may be the OR operator or the subtraction operator.

When, for example, a search query like "homegrown AND chuck" that is a query having the first keyword and the second keyword coupled by the AND operator is obtained, the calculating part 235 determines that the search query includes an operator (step S36: YES). Moreover, when, for example, a search query "homegrown OR chuck" that is a query having the first keyword and the second keyword coupled by the OR operator is obtained, the calculating part 235 determines that the search query includes an operator (step S36: YES). When determining that the search query includes an operator, the calculating part 235 thereafter does not execute the process in the step S37, but terminates the execution of the pre-search query correcting process.

Next, with respect to the auction process of product or the like already explained, an explanation will be given of an example case in which the genre generation device 200 obtains a search query having the first keyword and the second keyword coupled by the subtraction operator.

The bidder terminal device 102 transmits a search query "fashion—men's fashion" and a genre ID "J00001" identifying the genre "fashion" to the genre generation device 200. The obtaining part 220 of the genre generation device 200 obtains information received from the bidder terminal device 102 through the LAN card 200f. Subsequently, the obtaining part 220 determines that the obtained information is not an input request (step S11 in FIG. 10: NO), but is a search query (step S13: YES). Next, the calculating part 235 in FIG. 5 executes again the pre-search query correcting process (step S14), but does not correct the search query.

Thereafter, the search result page output process in FIG. 16 is executed (step S15). When the search result page output process starts, the searching part 240 in FIG. 5 searches the lower genre IDs from "J00011" to "J00013" associated with the obtained genre ID "J00001" from the genre hierarchy table in FIG. 7. Next, the searching part 240 obtains the system date and time from the OS. Subsequently, the searching part 240 searches, from the table of product or the like in FIG. 8, the product IDs from "M100" to "M103" associated with the same classification genre ID as the obtained genre ID "J00001" and any of the lower genre IDs from "J00011" to "J00013", and, information indicating the auction deadline later than the system date and time.

Subsequently, the searching part 240 searches the IDs of products or the like from "M100" to "M102" associated with information indicating the same keyword as "fashion" contained in the obtained search query among the obtained product IDs from "M100" to "M103" in the keyword table of product or the like in FIG. 9. Next, the searching part 240 searches the ID of product or the like "M102" based on the keyword "men's fashion", and eliminates the searched ID of product or the like "M102" from the IDs of product or the like from "M100" to "M102" searched based on the keyword "fashion" (step S61 in FIG. 16).

Next, the searching part 240 executes the processes from the step S62 to the step S64. Hence, information representing a search result page having posted thereon pieces of information on a product "ZA sandal" identified by the ID of product or the like "M100" and a product "ZB skirt" identified by the ID of product or the like "M101" is replied to the bidder terminal device 102.

After the execution of the step S15 in FIG. 10, the calculating part 235 executes the post-search query correcting process in FIG. 18 (step S16).

When the post-search query correcting process in FIG. 18 starts, the calculating part 235 executes the processes in the steps S71 and S80, and determines that the obtained search query includes the subtract operator (step S81: YES). Next, the calculating part 235 obtains a keyword (hereinafter, referred to as a parallel keyword) indicating a parallel genre belonging to the same layer as the layer where the genre represented by the second keyword "men's fashion" belongs (step S82).

More specifically, the calculating part 235 searches the genre ID "J00012" associated with information indicating the same genre name as the second keyword "men's fashion" from the genre table in FIG. 6. Next, the calculating part 235 searches the genre ID "J00001" associated with the same lower genre ID as the searched genre ID "J00012" from the genre hierarchy table in FIG. 7. Furthermore, the calculating part 235 searches lower genre IDs from "J00011" to "J00013" associated with the searched genre ID "J00001". Subsequently, the calculating part 235 obtains information indicating genre names associated with respective genre IDs same as the lower genre IDs from "J00011" to "J00013" from the genre table in FIG. 6. Next, the calculating part 235 obtains keywords "shoes", "ladies' fashion", and "men's fashion" represented by the obtained information. Thereafter, the calculating part 235 takes "shoes" and "ladies' fashion" other than the second keyword "men's fashion" among the obtained words "shoes", "ladies' fashion" and "men's fashion" as parallel keywords.

Next, the calculating part 235 generates a coupled keyword "shoes OR ladies' fashion" having the parallel keywords "shoes" and "ladies' fashion" coupled with each other by the OR operator. Subsequently, the calculating part 235 corrects the search query "fashion—men's fashion" to a query "fashion AND (shoes OR ladies' fashion)" (step S83), and terminates the execution of the post-search query correcting process. Note that the query "fashion AND (shoes OR ladies' fashion)" is a query having the first keyword "fashion" and the coupled keyword "shoes OR ladies' fashion" coupled with each other by the AND operator.

After the step S16 in FIG. 10, the calculating part 235 executes the processes in the step S17 and the step S18. Subsequently, the calculating part 235 has search query "fashion AND (shoes OR ladies' fashion)" regarded as a different-layer query "fashion AND shoes" and a different-layer query "fashion AND ladies' fashion" and a same-layer query "shoes OR ladies' fashion", and executes the calculation process (step S19). Subsequently, the above-explained processes are repeated from the step S11.

The user who specifies the search query "fashion—men's fashion" often recognizes that the genre "fashion" and the genre "men's fashion" belong to different layers. Moreover, when the search result of products or the like based on the search query "fashion—men's fashion" and the search result of products or the like based on the search query "fashion AND (shoes OR ladies' fashion)" are equal, the user often recognizes that the genre "fashion" and the genre "shoes" belong to different layers, the genre "fashion" and the genre "ladies' fashion" belong to different layers, and the genre "shoes" and the genre "ladies' fashion" belong to the same layer.

Next, an explanation will be given of a successful bidding of a product or the like placed on an auction.

The CPU 200a of the genre generation device 200 in FIG. 3 executes an unillustrated successful bidding process at a certain time cycle. Hence, the CPU 200a serves as a successful bidding part 250 illustrated in FIG. 5.

When the successful bidding process starts, the successful bidding part 250 obtains a system date and time from the OS. Next, the successful bidding part 250 obtains ID of product or the like associated with the times up to the predetermined time before the obtained date and time (that is, products having the auction period ended before the predetermined time to the current time), information indicating the name of product or the like, a classification genre ID, information indicating the bid price, a bidder ID, and a seller ID in the table of product or the like in FIG. 8.

Next, the successful bidding part 250 notifies the bidder identified by the bidder ID of the ID of product or the like, such as the successfully bidden product or the like, the information indicating the name of product or the like, the information indicating the bid price, the seller ID and the like through, for example, an electronic mail. Moreover, the successful bidding part 250 notifies the successful bidder identified by the successful bidder ID of the ID of product or the like successfully bidden, the information indicating the name of product or the like, the information indicating the bid price, the bidder ID and the like through, for example, likewise an electronic mail. Subsequently, the successful bidding part 250 updates the information indicating the number of sales associated with the same genre ID as the classification genre ID of the successfully bidden product or the like with information indicating the number of sales increased by a value "1" in the genre table in FIG. 6.

Next, an explanation will be given of a generation of a genre.

Figure 22:
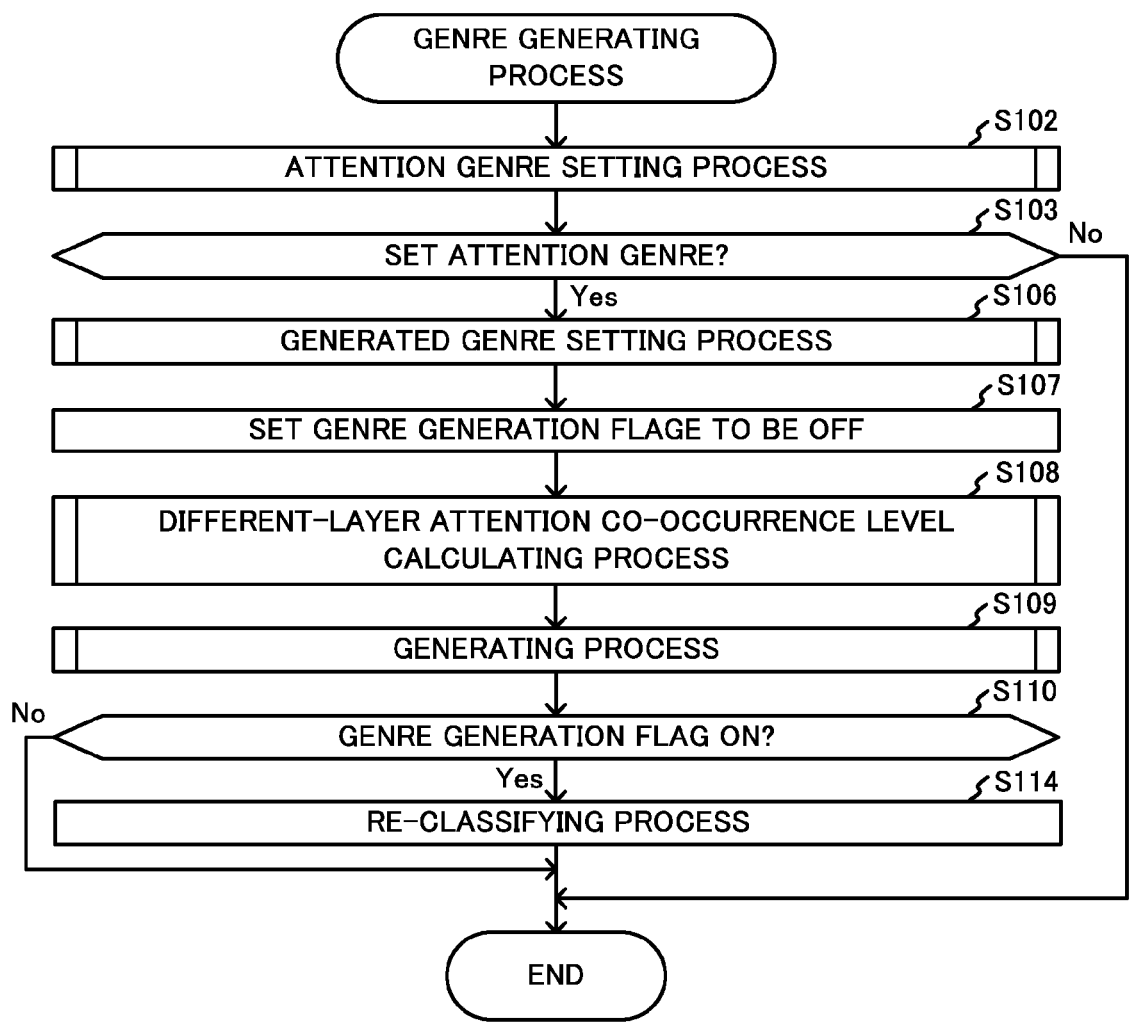
FIG. 22 is a flowchart illustrating an example genre generating process executed by the genre generation device of an embodiment.

The CPU 200*a* of the genre generation device 200 in FIG. 3 executes a genre generating process in FIG. 22 at a predetermined time cycle, thus serving as a changing part 260, a generating part 265, and a re-classifying part 269.

Figure 23:
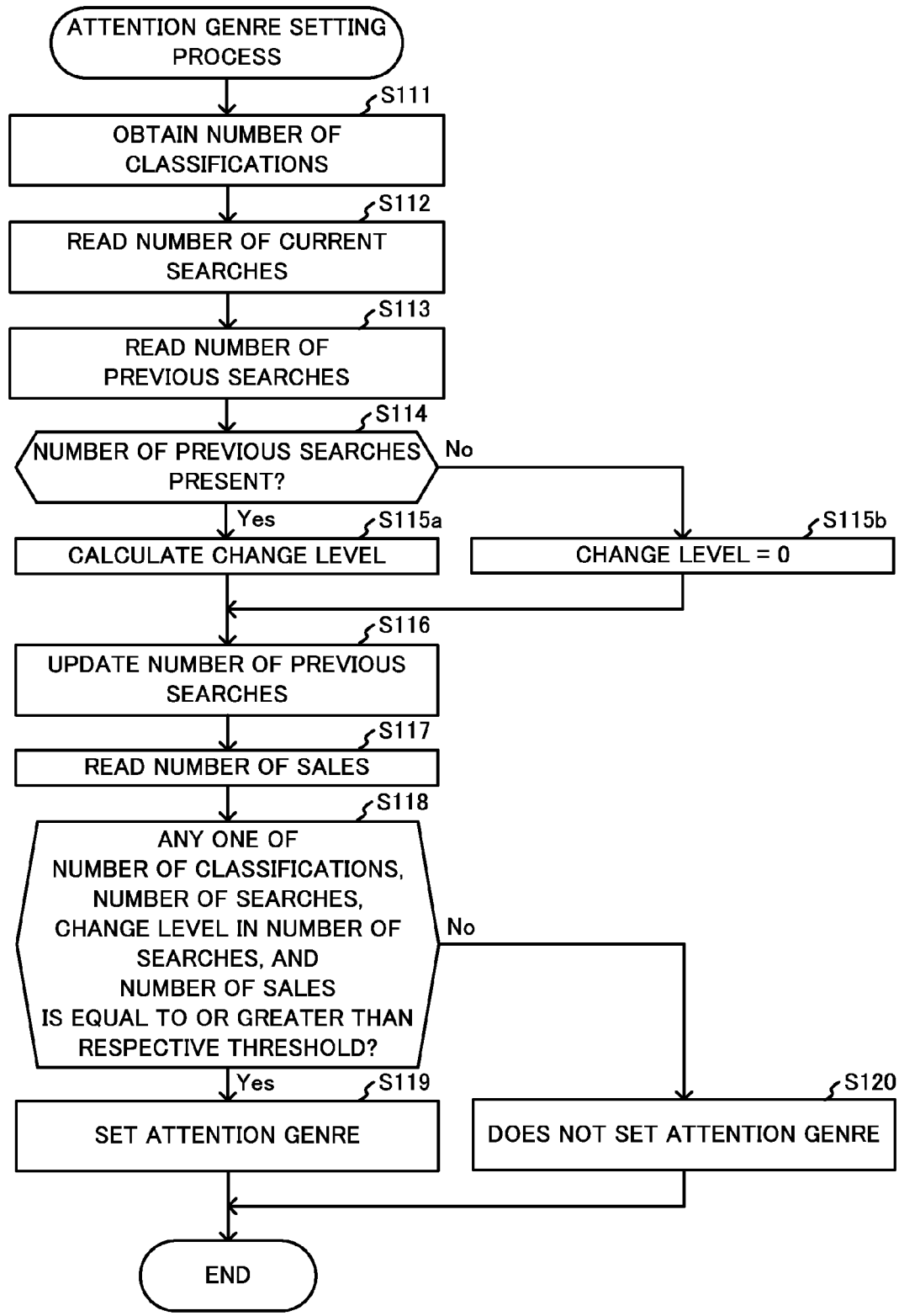
FIG. 23 is a flowchart illustrating an example attention genre setting process executed by the genre generation device.

When the genre generating process in FIG. 22 starts, the generating part 265 in FIG. 5 executes an attention genre setting process illustrated in FIG. 23 (step S102).

When the attention genre setting process in FIG. 23 starts, the generating part 265 obtains multiple pieces of information indicating a genre name and information indicating the number of products or the like (that is, the number of classifications) classified in that genre name from the genre table in FIG. 6 (step S111).

Next, the generating part 265 reads multiple pieces of information indicating a keyword, and information indicating the number of searches of the keyword (hereinafter, referred to as a current search number) from the number-of-search table in FIG. 13 (step S112). Moreover, the generating part 265 reads, from the information memory 210, information indicating the keyword stored previously through the process in step S116 to be discussed later, and information indicating the number of searches of that keyword (hereinafter, referred to as a previous search number) (step S113).

Subsequently, the generating part 265 determines whether or not the information indicating the previous search number was readable in the step S113 (step S114). When determining that the information indicating the previous search number was readable (step S114: YES), the generating part 265 subtracts the previous search number indicated by the information associated with each information indicating the same keyword from the current search number. Hence, the generating part 265 calculates a change level in the number of searches (step S115*a*). Conversely, when determining that the information indicating the previous search number was unreadable (step S114: NO), the generating part 265 sets the change level of the number of searches to be a value "zero" (step S115*b*).

After the step S115*a*, the generating part 265 updates the information indicating the previous search number already stored in the information memory 210 with information indicating current search number. Moreover, after the step S115*b*, the generating part 265 newly stores, as information indicating the previous search number, the information indicating the current search number in the information memory 210 (step S116).

Next, the generating part 265 obtains multiple pieces of information indicating a genre name and information indicating the number of sales from the genre table in FIG. 6 (step S117).

Subsequently, the generating part 265 determines whether or not any one of the number of classifications obtained in the step S111, the current search number obtained in the step S112, the change level in the number of searches calculated in the step S115*a* or the step S115*b*, and the number of sales obtained in the step S117 is equal to or greater than a threshold (step S118).

At this time, when determining that any one of the number of classifications, the current search number, the change level in the number of searches, and the number of sales is equal to or greater than the threshold (step S118: YES), the generating part 265 sets a genre corresponding to the number determined as being equal to or greater than the threshold to be an attention genre (step S119), and terminates the execution of the attention genre setting process.

More specifically, when determining that any of the numbers of classifications obtained in the step S111 is equal to or greater than a threshold for a number of classifications, the generating part 265 specifies information indicating the genre name associated with the information indicating the number of classifications determined as being equal to or greater than the threshold. Next, the generating part 265 sets the genre of the genre name indicated by the specified information to be an attention genre.

Likewise, when determining that any of the current search numbers obtained in the step S112 is equal to or greater than a threshold for a number of searches, the generating part 265 specifies information indicating the keyword associated with the information indicating the current search number determined as being equal to or greater than the threshold. Next, the generating part 265 sets the genre represented by the keyword indicated by the specified information to be an attention genre.

Moreover, when determining that any of change levels in the number of searches calculated in the step S115*a* or in the step S115*b* is equal to or greater than a threshold for a change level, the generating part 265 specifies information indicating the number of searches used for calculating the change level determined as being equal to or greater than the threshold. Next, the generating part 265 specifies information indicating the keyword associated with the information indicating the number of searches that is the specified number of searches, and sets the genre represented by the keyword indicated by the specified information to be an attention genre.

Furthermore, when determining that any of numbers of sales obtained in the step S117 is equal to or greater than a threshold for a number of sales, the generating part 265 specifies information indicating the genre name associated with the information indicating the number of sales determined as being equal to or greater than the threshold. Next, the generating part 265 sets the genre of the genre name indicated by the specified information to be an attention genre.

When determining in the step S118 that all of the number of classifications, the current search number, the change level in the number of searches, and the number of sales are smaller than the respective thresholds (step S118: NO), the generating part 265 terminates the execution of the attention genre setting process without setting an attention genre (step S120).

After the step S102 in FIG. 22, the generating part 265 determines whether or not an attention genre is set through the process in the step S102 (step S103). At this time, when determining that no attention genre is set (step S103: NO), the generating part 265 terminates the execution of the genre generating process.

An explanation will be given below of an example case in which a set attention genre is "rib roast".

When determining in the step S103 that an attention genre is set (step S103: YES), the generating part 265 executes a generated-genre setting process illustrated in FIG. 24 (step S106).

Figure 24:
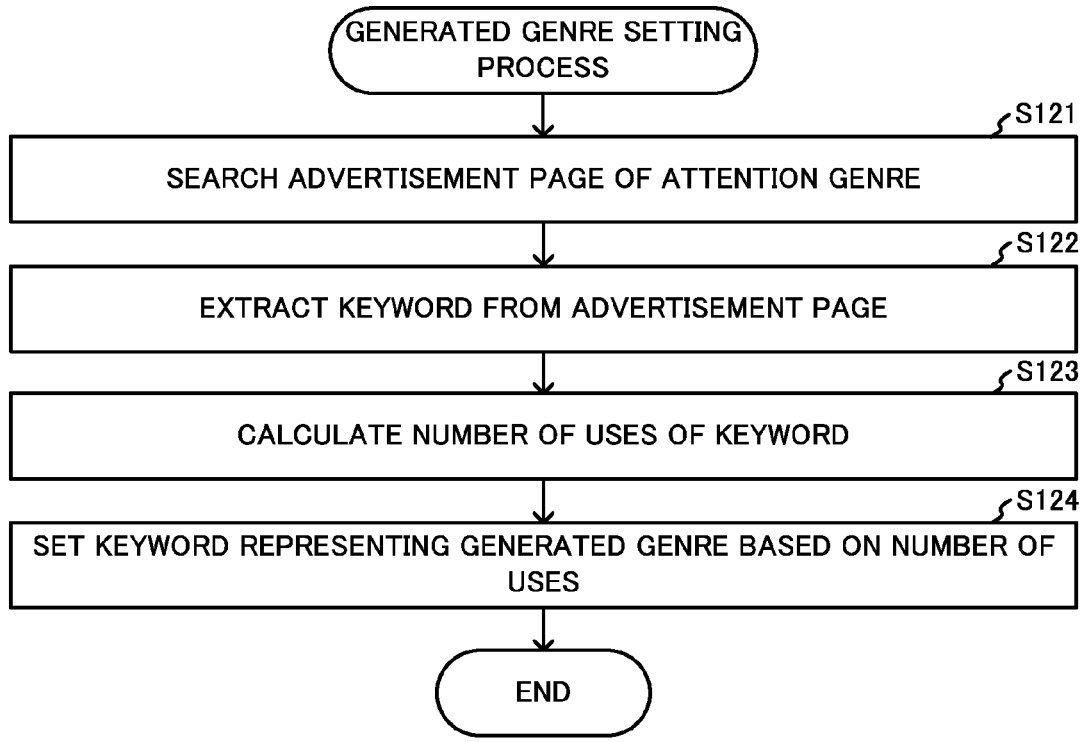
FIG. 24 is a flowchart illustrating an example generated-genre setting process executed by the genre generation device.

When the generated-genre setting process in FIG. 24 starts, the generating part 265 searches multiple pieces of information indicating an advertisement page URL associated with the genre ID "J02111" of the set attention genre "rib roast" in the table of product or the like in FIG. 8. Next, the generating part 265 obtains multiple advertisement pages in the URLs indicated by the multiple pieces of searched information (step S121).

Next, the generating part 265 extracts a keyword from the obtained multiple advertisement pages (step S122), and calculates the number of uses of the extracted keyword in the advertisement pages (step S123).

Subsequently, the generating part 265 obtains information indicating the genre name stored in the genre table in FIG. 6 in order to specify the keyword representing a genre structuring the hierarchical structure illustrated in FIG. 2. Next, the generating part 265 specifies a different keyword from the keyword indicated by the obtained information among the extracted keywords in the step S122.

Next, the generating part 265 selects a keyword based on the number of uses of the keyword from the specified keywords, and sets the selected keyword as a keyword representing a genre to be generated (hereinafter, referred to as a generated genre) (step S124). Thereafter, the execution of the generated-genre setting process is terminated.

An explanation will be given below of an example case in which the keyword "for roast beef" is set as a keyword representing a generated genre.

After the execution of the step S106 in FIG. 22, the generating part 265 sets a genre generation flag to be "OFF" that will be ON after the generated genre "for roast beef" is generated (step S107).

Next, the calculating part 235 executes a different-layer attention co-occurrence level calculating process for calculating a barometer indicating the level of the use of (co-occurrence of) multiple keywords coupled with each other by a different-layer operator in a search query.

Figure 25:
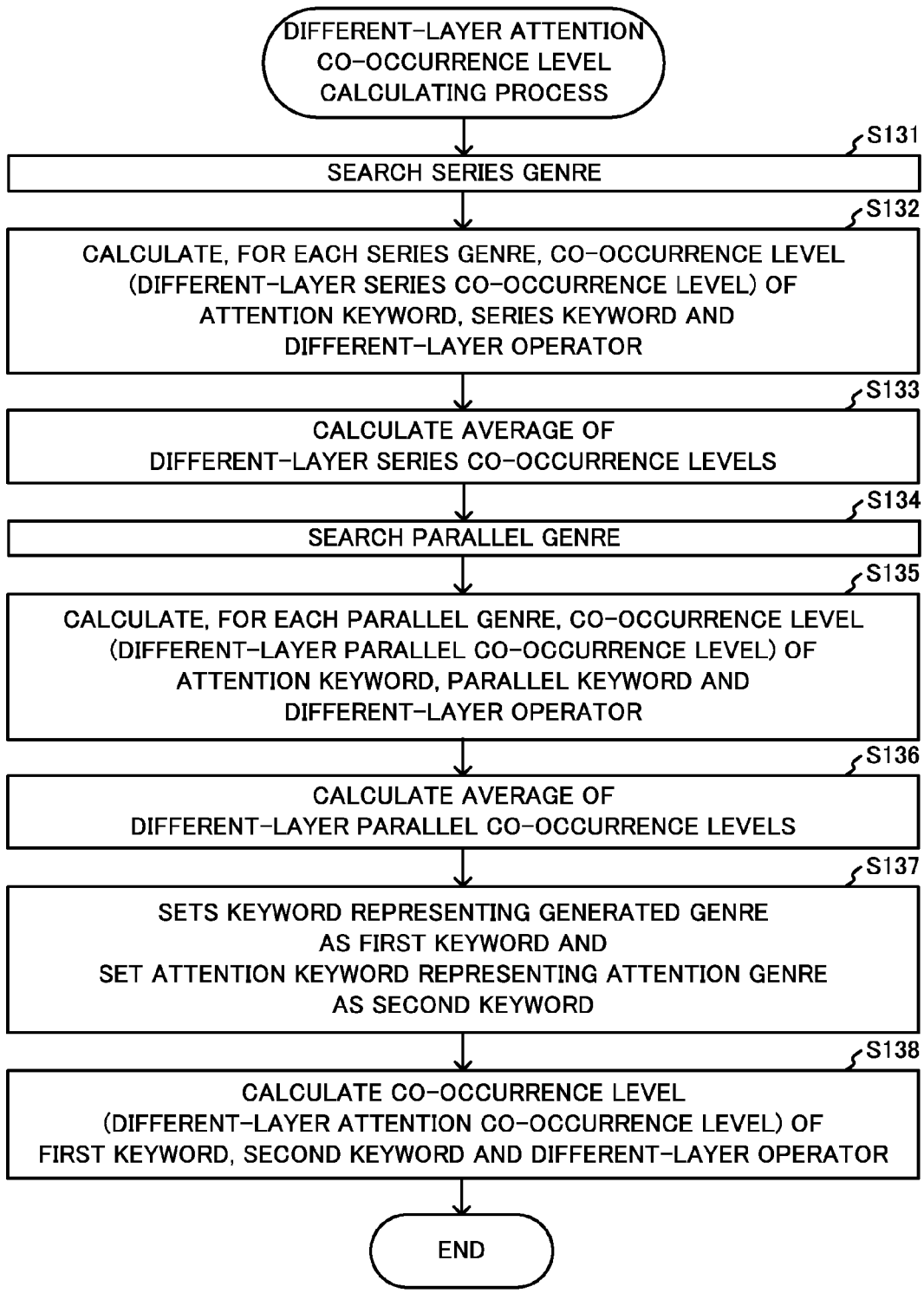
FIG. 25 is a flowchart illustrating an example different-layer attention co-occurrence level calculating process executed by the genre generation device.

When the different-layer attention co-occurrence level calculating process in FIG. 25 starts, the calculating part 235 searches a series genre of the attention genre "for roast beef" (step S131).

More specifically, there are genres "foods" "beef" and "for steak" in the path from the genre "top" to the lowermost genre "for steak" through the attention genre "rib roast". Hence, the genres "foods", "beef", and "for steak" are the series genres of the attention genre "rib roast".

In this example, the calculating part 235 searches the genre ID "J00021" of the genre "beef" associated with the same lower genre ID as the genre ID "J02111" of the attention genre "rib roast" from the genre hierarchy table in FIG. 7 in order to trace the path from the attention genre "rib roast" to the genre "top". Next, the calculating part 235 specifies the searched genre "beef" as the proximal upper hierarchy genre of the attention genre "rib roast", and sets the genre "beef" as the series genre.

Next, the calculating part 235 searches the genre ID "J00002" of the genre "foods" associated with the genre ID "J00021" of the genre "beef", and sets the genre "foods" as the series genre. Moreover, the calculating part 235 searches the genre ID "J00000" of the genre "top" associated with the genre ID "J00002" of the genre "foods", and determines as reaching one end of the path.

Subsequently, the calculating part 235 searches the genre ID "J21111" of the genre "for steak" associated with the genre ID "J02111" of the attention genre "rib roast" to trace the path from the attention genre "rib roast" to the lowermost genre. Next, the calculating part 235 sets the searched genre "for steak" as the series genre. Subsequently, the calculating part 235 determines as reaching another end of the path since no lower genre ID associated with the genre ID "J02111" of the genre "for steak" is stored in the genre hierarchy table in FIG. 7.

In this manner, the calculating part 235 specifies the series genres "foods", "beef" and "for steak" present on the path from the top genre to the lowermost genre through the attention genre "rib roast".

After the step S131 in FIG. 25, the calculating part 235 specifies, for each searched series genre, a series keyword that is a keyword representing the series genre. Next, the calculating part 235 calculates a barometer (hereinafter, referred to as a different-layer series co-occurrence level) indicating how frequently an attention keyword and a series keyword are coupled with each other by a different layer operator in a search query for co-occurrence with respect to each searched series genre (step S132).

First, an explanation will be given of a calculating method of a different-layer series co-occurrence level for the series keyword "foods" indicating the series genre "foods" and the attention keyword "rib roast" indicating the attention genre.

The calculating part 235 searches a number of searches "300" associated with the series keyword "foods" and a number of searches "120" associated with the attention keyword "rib roast" in the number-of-search table in FIG. 13. Next, the calculating part 235 searches a number of obtainments of a different-layer query (that is, a number of obtainments of the AND query) "220" associated with the series keyword "foods" and the attention keyword "rib roast" from the number-of-obtainment table in FIG. 11. The number of obtainments of the different-layer query associated with the series keyword "foods" and the attention keyword "rib roast" is the number that the series keyword "foods" and the attention keyword "rib roast" are coupled with each other by a different-layer query and co-occurring in the search query.

Subsequently, the calculating part 235 calculates a different-layer series co-occurrence level "0.52" through the following formula (4).

[Formula 1]

$$\text{Different-layer series co-occurrence level} = \frac{\text{number of obtainments of different-layer query}}{\text{number of searches of series keyword} + \text{number of searches of attention keyword}} \quad (4)$$

The same is true of a calculating method of a different-layer series co-occurrence level for the series keyword "beef" indicating the series genre "beef" and the attention keyword "rib roast" indicating the attention genre. That is, the calculating part 235 calculates the different-layer series co-occurrence level "0.52" using the number of searches of the series keyword "beef" that is "150", the number of searches of the attention keyword "rib roast" that is "120", and the number of obtainments of the different-layer query "140" including the series keyword "beef" and the attention keyword "rib roast" to the above-explained formula (4).

Moreover, the calculating part 235 calculates a different-layer series co-occurrence level "0.50" using the number of searches of the series keyword "for steak" that is "60", the number of searches of the attention keyword "rib roast" that is "120", and the number of obtainments of the different-layer query "90" including the series keyword "for steak" and the attention keyword "rib roast" to the above-explained formula (4).

After the step S132 in FIG. 25, the calculating part 235 calculates an arithmetic average "0.51" for the three different-layer series co-occurrence levels "0.52", "0.52", and "0.50" calculated for the three series keywords "foods", "beef" and "for steak" (step S133).

Next, the calculating part 235 searches a parallel genre of the attention genre "for roast beef", and specifies that the genres "short rib" and "tongue" in FIG. 2 are the parallel genres of the attention genre "rib roast" (step S134).

In this example, the calculating part 235 searches the genre ID of the proximal upper genre "beef" of the attention genre "rib roast" in the genre hierarchy table in FIG. 7. Next, the calculating part 235 searches the lower genre IDs "J02111", "J02112" and "J02113" associated with the genre ID of "beef". Subsequently, the calculating part 235 specifies, among the searched genre IDs, the genre "short rib" identified by the different genre ID "J02112" from the genre ID "J02111" of the attention genre "rib roast" and the genre "tongue" identified by the different genre ID "J02113" from that of the attention genre as a parallel genre.

After the step S134, the calculating part 235 specifies, for each searched parallel genre, a parallel keyword that is a keyword representing a parallel genre. Next, the calculating part 235 calculates, for each searched parallel genre, a barometer (hereinafter, referred to as a different-layer parallel co-occurrence level) indicating how frequently the attention keyword and the parallel keyword are coupled with each other by a different-layer operator and co-occurring in the search query (step S135).

First, an explanation will be given of a calculating method of the different-layer parallel co-occurrence level for the series keyword "short rib" indicating the parallel genre "short rib" and the attention keyword "rib roast" indicating the attention genre.

The calculating part 235 searches the number of searches "100" associated with the parallel keyword "short rib" and the number of searches "120" associated with the attention keyword "rib roast" in the number-of-search table in FIG. 13. Next, the calculating part 235 searches the number of obtainments of the different-layer query "22" associated with the series keyword "short rib" and the attention keyword "rib roast" in the number-of-obtainment table in FIG. 11.

Thereafter, the calculating part 235 calculates a different-layer parallel co-occurrence level "0.10" using the following formula (5).

[Formula 2]

$$\text{Different-layer parallel co-occurrence level} = \frac{\text{number of obtainments of different-layer query}}{\text{number of searches of parallel keyword} + \text{number of searches of attention keyword}} \quad (5)$$

The same is true of a calculating method of a different-layer series co-occurrence level for the parallel keyword "tongue" indicating the parallel genre "tongue" and the attention keyword "rib roast" indicating the attention genre. That is, the calculating part 235 calculates the different-layer parallel co-occurrence level "0.10" using the number of searches "100" of the parallel keyword "tongue", the number of searches "120" of the attention keyword "rib roast" and the number of obtainments of the different-layer query "23" including the parallel keyword "tongue" and the attention keyword "rib roast" to the above-explained formula (5).

After the step S135, the calculating part 235 calculates an arithmetic average "0.10" of the two different-layer parallel co-occurrence levels "0.10" and "0.10" calculated for the two parallel keywords "short rib" and "tongue" (step S136).

After the step S136, the calculating part 235 sets the keyword "for roast beef" indicating the generated genre set in the step S124 in FIG. 24 to be the first keyword, and sets the attention keyword "rib roast" indicating the attention genre to be the second keyword (step S137).

Next, the calculating part 235 calculates a barometer (hereinafter, referred to as a different-layer attention co-occurrence level) indicating how frequently the first keyword and the second keyword representing the attention genre are coupled with each other by a different-layer operator and co-occurring in the search query (step S138).

More specifically, the calculating part 235 searches the number of searches "80" associated with the first keyword "for roast beef" and the number of searches "120" associated with the second keyword "rib roast" in the number-of-search table in FIG. 13. Next, the calculating part 235 searches the number of obtainments of the different-layer query that is "100" associated with the first keyword "for roast beef" and the second keyword "rib roast" in the number-of-obtainment table in FIG. 11.

Subsequently, the calculating part 235 calculates a different-layer attention co-occurrence level "0.50" using the following formula (6).

[Formula 3]

$$\text{Different-layer attention co-occurrence level} = \frac{\text{number of obtainments of different-layer query}}{\text{number of searches of first keyword} + \text{number of searches of second keyword}} \quad (6)$$

Thereafter, the calculating part 235 terminates the execution of the different-layer attention co-occurrence level calculating process.

Figure 26:
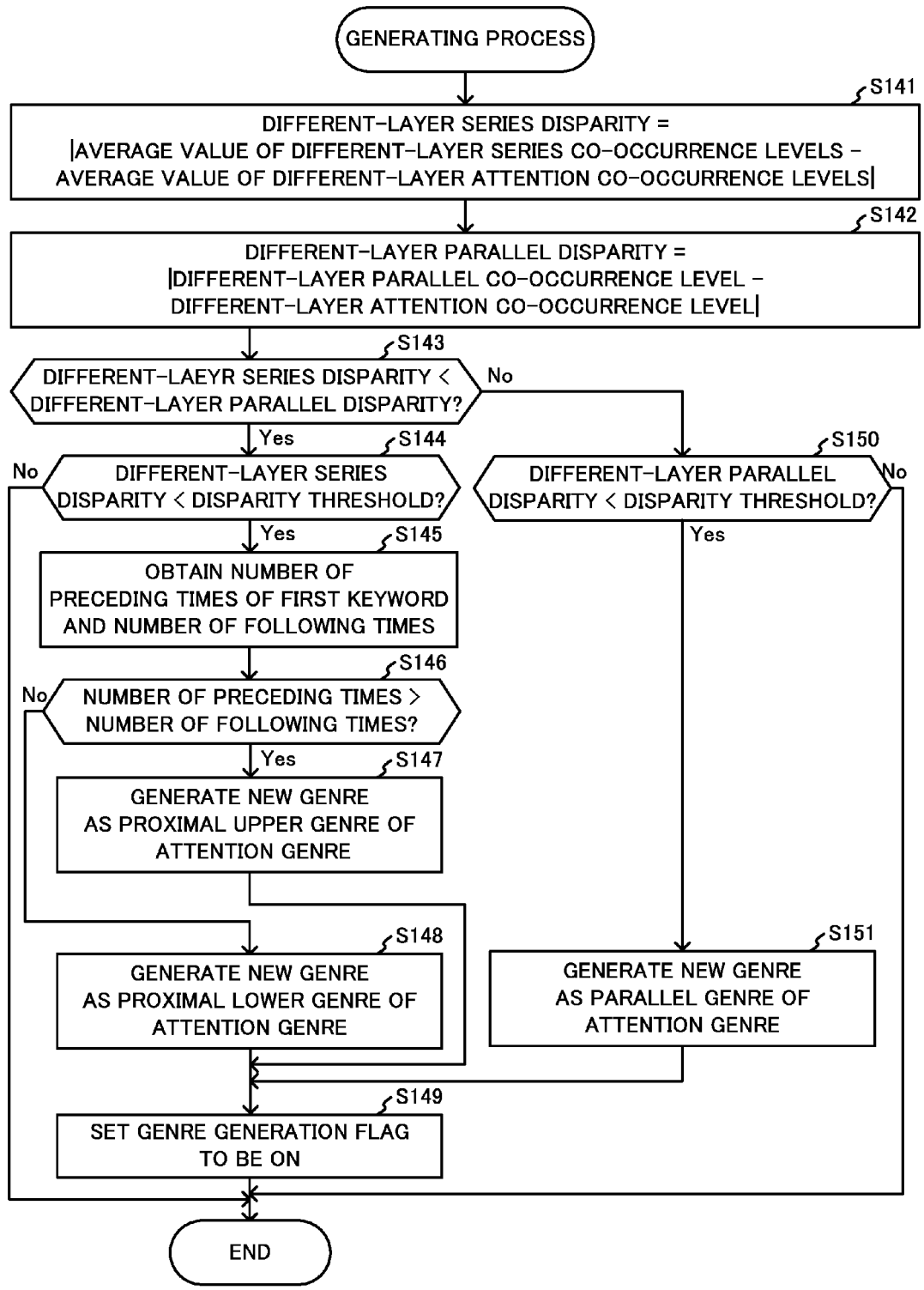
FIG. 26 is a flowchart illustrating an example generating process executed by the genre generation device of the embodiment.

After the execution of the step S108 in FIG. 22, a generating process illustrated in FIG. 26 is executed.

When the generating process starts, the calculating part 235 calculates a different-layer series disparity "0.01" using the average value of the different-layer series co-occurrence level "0.51" calculated in the step S133 in FIG. 25 and the different-layer attention co-occurrence level "0.50" calculated in the step S138 to the following formula (7) (step S141).

Different-layer series disparity=|average value of different-layer series co-occurrence level−average value of different-layer attention co-occurrence level| (7)

Next, the calculating part 235 calculates a different-layer parallel disparity "0.40" using the average value of the different-layer parallel co-occurrence level "0.10" calculated in the step S136 in FIG. 25 and the different-layer attention co-occurrence level "0.50" calculated in the step S138 to the following formula (8).

Different-layer parallel disparity=|average value of different-layer parallel co-occurrence level−average value of different-layer attention co-occurrence level| (8)

Subsequently, the generating part 265 determines that the different-layer series disparity "0.01" is smaller than the different-layer parallel disparity "0.40" (step S143: YES). That is, it is determined that the co-occurrence level of the first keyword representing the generated genre with the second keyword representing the attention genre is closer to the co-occurrence level of the second keyword representing the attention genre with the keyword representing the series genre of the attention genre than the co-occurrence level of the second keyword representing the attention genre with the keyword representing the parallel genre of the attention genre.

Next, the generating part 265 determines that the different-layer series disparity "0.01" is smaller than a preset threshold (hereinafter, referred to as a disparity threshold) that is "0.10" (step S144). The disparity threshold is not limited to "0.10", and those skilled in the art can set an appropriate value through a test.

Subsequently, the generating part 265 obtains, from the sequence table in FIG. 12, the number of preceding times "10" that the first keyword "for roast beef" is used in the search query preceding to the second keyword "rib roast", and the number of following times thereof used following to the second keyword that is "90" (step S145).

Figure 27:
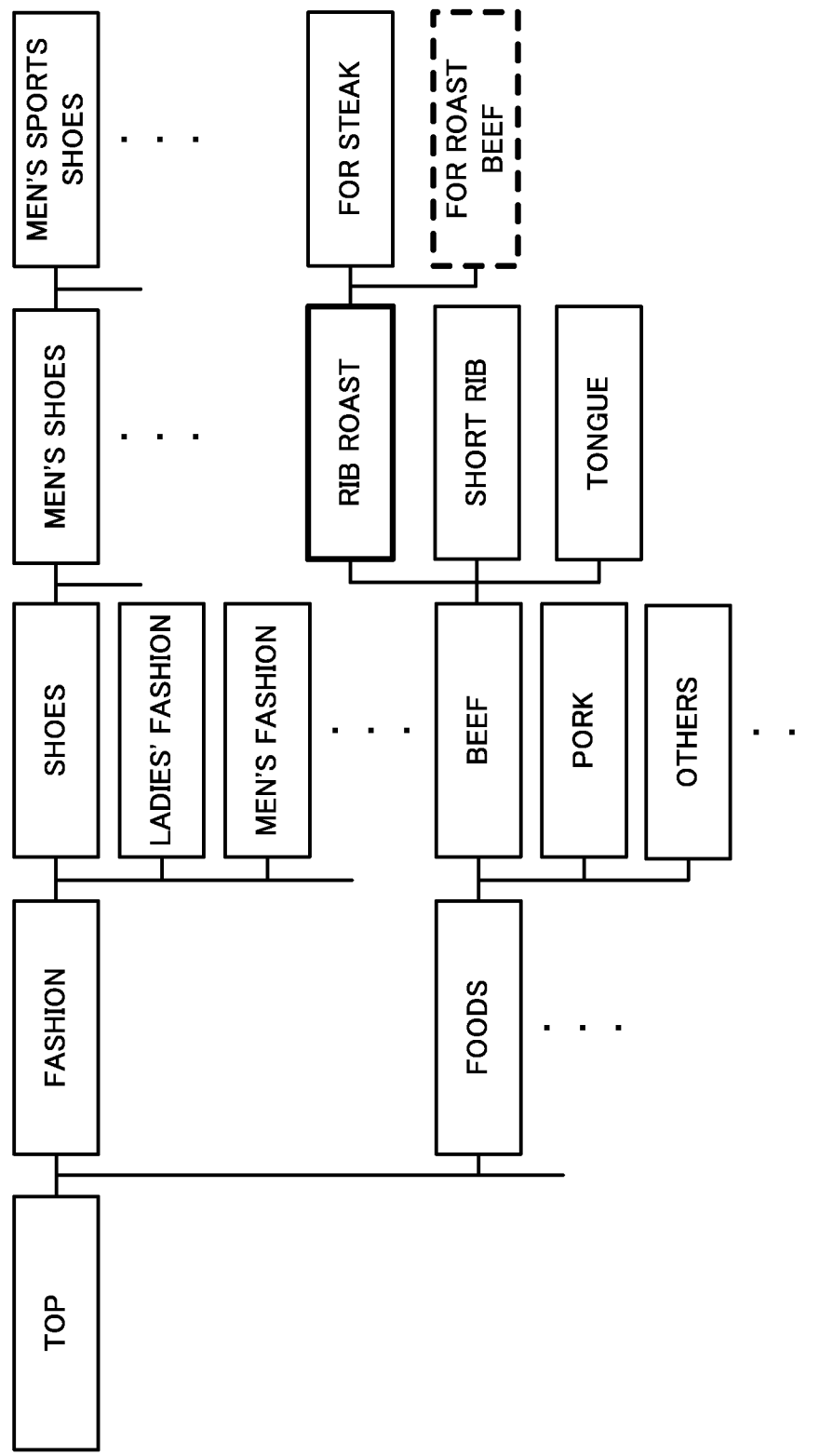
FIG. 27 is a diagram illustrating a first example genre generated through an execution of the genre generating process.

The generating part 265 determines that the number of preceding times "10" that the first keyword "for roast beef" indicating a new genre precedes the keyword "rib roast" indicating the attention genre is smaller than the number of following times "90" (step S146: NO). Subsequently, the generating part 265 generates a new genre "for roast beef" as the proximal lower genre of the attention genre "rib roast" as illustrated in FIG. 27 (step S148).

That is, after generating the genre ID of the genre "for roast beef", the generating part 265 stores information indicating the generated genre ID and information indicating the genre name of that genre in the genre table in FIG. 6. Next, the generating part 265 searches the genre ID of the already-generated genre "rib roast" from the genre table. Subsequently, the generating part 265 sets the genre ID of the genre "for roast beef" to be a lower genre ID, and stores, in the genre hierarchy table in FIG. 7, information associating the genre ID of the searched genre "rib roast" with the genre ID of the genre "for roast beef".

After the step S148, the generating part 265 sets the genre generation flag to be "ON" (step S149), and terminates the execution of the generating process.

After executing the step S109 in FIG. 22, the generating part 265 determines that the genre generation flag is "ON" (step S110: YES).

Next, the re-classifying part 269 in FIG. 5 executes a re-classifying process of re-classifying the product or the like classified in the attention genre "rib roast" into any of the already-present genre "rib roast" and the newly generated genre "for roast beef" (step S114).

More specifically, the re-classifying part 269 searches, from the table of product or the like in FIG. 8, an ID of product or the like associated with information indicating the same classification genre name as the information indicating the attention genre "rib roast". Next, the re-classifying part 269 searches information indicating the name of a product or the like associated with the searched ID of product or the like and information indicating a keyword from the keyword table of product or the like in FIG. 9. Subsequently, the re-classifying part 269 re-classifies the product or the like into any of the already-present genre "rib roast" and the newly generated genre "for roast beef" based on at least one of the information indicating the name of product or the like identified by that ID of product or the like and the information indicating the keyword.

More specifically, the re-classifying part 269 may classify the product or the like into a genre represented by a keyword fully matching or partially matching the name of product or the like. Alternatively, when both of the information indicating "rib roast" and the information indicating "for roast beef" are associated with the ID of product or the like, the re-classifying part 269 may classify the product into the genre "for roast beef" belonging to the lower layer of the genre "rib roast" and contained in the genre "rib roast".

Subsequently, the re-classifying part 269 updates, in the table of product or the like in FIG. 8, the classification genre ID associated with the ID of product or the like having undergone re-classification and the information indicating the classification genre name with the genre ID of the genre where the product or the like identified by that ID of product or the like and the information indicating the genre name.

Thereafter, the re-classifying part 269 terminates the execution of the genre generating process.

Figure 28:
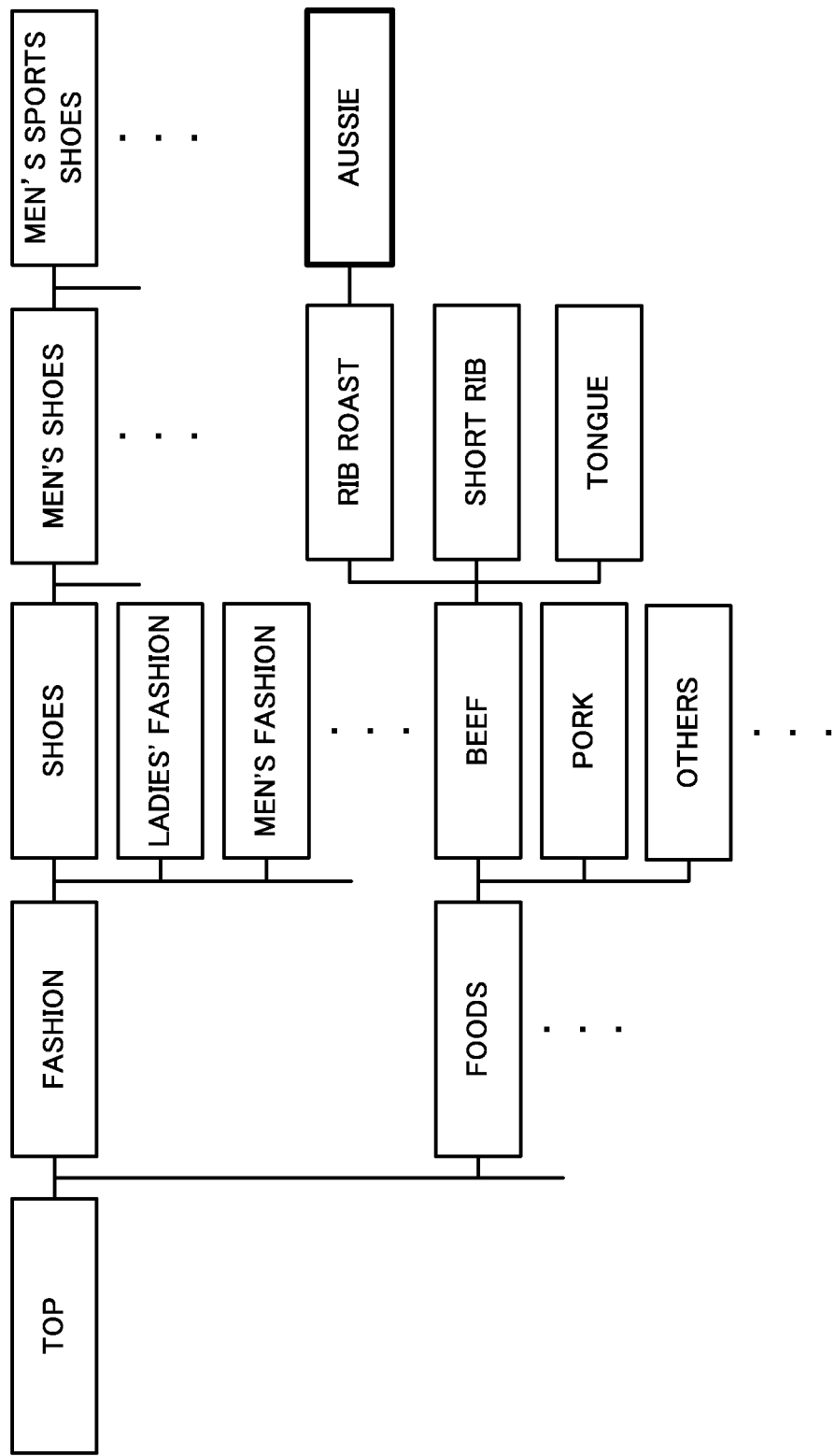
FIG. 28 is a diagram illustrating a genre hierarchy before the genre generating process is executed.

Next, as illustrated in FIG. 28, an explanation will be given of an example genre hierarchy in which a genre "Aussie" is generated in the proximal lower layer of the genre "rib roast", but the genre "for steak" is not generated. In this case, the genre table in FIG. 6 stores, for example, the genre ID of the genre "Aussie" and the genre name thereof, but does not store, for example, the genre ID of the genre "for steak" and the genre name thereof. Moreover, the genre hierarchy table in FIG. 7 stores the genre ID of the genre "Aussie" as a lower genre ID associated with the genre ID of the genre "rib roast".

In this case, an explanation will be again given of the genre generating process in FIG. 22 with an example case in which the attention genre is set to be "Aussie" and the keyword "for steak" is set as a keyword representing the generated genre.

When the execution of the genre generating process starts, the process in the step S102 is executed, and the attention genre "Aussie" is set. Next, the processes in the step S103 and the step S106 are sequentially executed, and the keyword "for steak" is set as a keyword representing the generated genre.

Subsequently, after the process in the step S107 is executed, the different-layer attention co-occurrence level calculating process in FIG. 25 is executed (step S107).

After the execution of the different-layer attention co-occurrence level calculating process starts, the processes from the step S131 to the step S136 are executed, and thus the average value "0.51" of the different-layer series co-occurrence level and the average value "0.10" of the different-layer series co-occurrence level are calculated.

Next, in the step S137, the keyword "for steak" indicating the generated genre is set as a first keyword, and the keyword "Aussie" indicating the attention genre is set as a second keyword.

Subsequently, in the step S138, the calculating part 235 searches, from the number-of-search table in FIG. 13, the number of searches "60" associated with the first keyword "for steak" and the number of searches "320" associated with the second keyword "Aussie". Next, the calculating part 235 searches, from the number-of-obtainment table in FIG. 11, the number of obtainments of the different-layer query "190" associated with the first keyword "for steak" and the second keyword "Aussie".

Next, the calculating part 235 calculates the different-layer attention co-occurrence level "0.50" using the above-explained formula (6) and terminates the different-layer attention co-occurrence level calculating process.

After the execution of the step S108 in FIG. 22, the generating process in FIG. 26 is executed (step S109).

When the execution of the generating process starts, the calculating part 235 calculates a different-layer series disparity "0.01" that is an absolute value of a value obtained by subtracting the different-layer attention co-occurrence level "0.50" from the average value "0.51" of the different-layer series co-occurrence level (step S141).

Next, the calculating part 235 calculates a different-layer parallel disparity "0.40" that is an absolute value of a value obtained by subtracting the different-layer attention co-occurrence level "0.50" from the average value "0.10" of the different-layer parallel co-occurrence level (step S142).

Subsequently, the calculating part 235 determines that the different-layer series disparity "0.01" is smaller than the different-layer parallel disparity "0.40" (step S143: YES), and determines that the different-layer series disparity "0.01" is smaller than the disparity threshold "0.10" (step S144: YES).

Next, the generating part 265 obtains, from the sequence table in FIG. 12, the number of preceding times "97" that the first keyword "for steak" is used in the search query preceding to the second keyword "Aussie", and the number of following times "13" used following to the second keyword (step S145).

Figure 29:
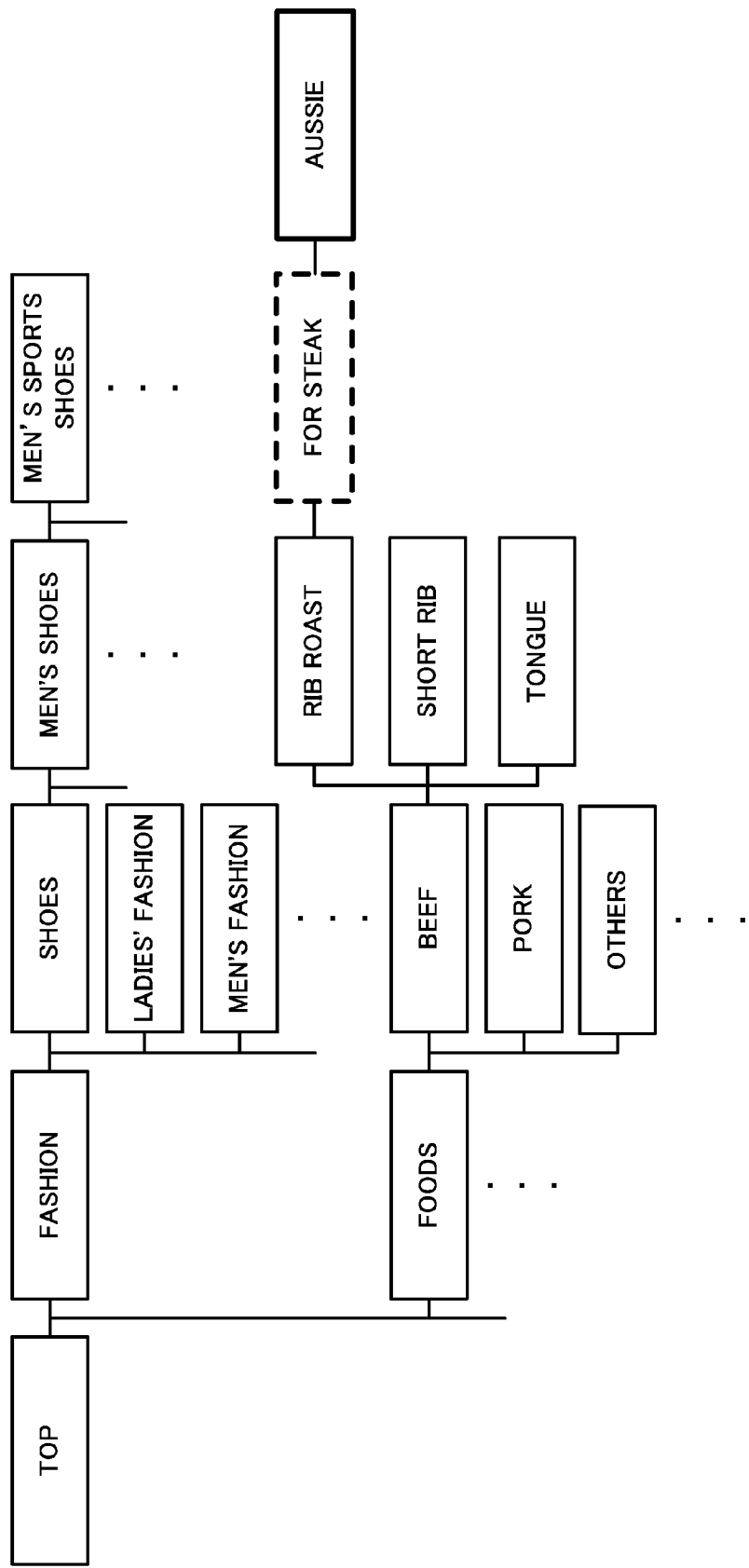
FIG. 29 is a diagram illustrating a second example genre generated through an execution of the genre generating process.

Subsequently, the generating part 265 determines that the number of preceding times "97" of the first keyword "for steak" indicating the new genre relative to the keyword "Aussie" indicating the attention genre is larger than the number of following times "13" (step S146). Next, the generating part 265 generates the new genre "for steak" as the proximal upper series genre of the attention genre "Aussie" as illustrated in FIG. 29 (step S147).

That is, the generating part 265 generates the genre ID of the genre "for steak", and stores information indicating the generated genre ID and information indicating the genre name of the genre "Aussie" in the genre table in FIG. 6. Moreover, the generating part 265 searches, from the genre hierarchy table in FIG. 7, the genre ID of the genre (that is, the upper genre of the attention genre) "rib roast" associated with the lower genre ID that is the same as the genre ID of the attention genre "Aussie". Subsequently, the generating part 265 sets the genre ID of the genre "for steak" as a lower genre, and stores, in the genre hierarchy table, the genre ID of the genre "rib roast" and the genre ID of the genre "for steak" in association with each other. Moreover, in the genre hierarchy table, the genre ID of the genre "rib roast" associated with the lower genre ID that is the same as the genre ID of the genre "Aussie" is updated with the genre ID of the genre "for steak".

After the step S147, the generating part 265 sets the genre generation flag to be "ON" (step S149), and terminates the execution of the generating process.

After the execution of the step S109 in FIG. 22, the generating part 265 determines that the genre generation flag is "ON" (step S110: YES). Next, the re-classifying part 269 in FIG. 5 executes the re-classifying process of re-classifying the product or the like classified in the attention genre "Aussie" into any of the already-present genre "Aussie" and the newly generated genre "for steak" (step S114). Subsequently, the re-classifying part 269 terminates the execution of the genre generating process.

Next, an explanation will be again given of the genre generating process in FIG. 22 with an example case in which in the genre hierarchy in FIG. 2, the attention genre "rib roast" is set, and the keyword "chuck" is set as a keyword representing the generated genre.

When the execution of the genre generating process starts, the process in the step S102 is executed, and thus the attention genre "rib roast" is set. Next, the processes in the step S103 and the step S106 are sequentially executed, and thus the keyword "chuck" is set as a keyword representing the generated genre.

Subsequently, after the process in the step S107 is executed, the different-layer attention co-occurrence level calculating process in FIG. 25 is executed (step S107).

After the execution of the different-layer attention co-occurrence level calculating process is executed, the processes from the step S131 to the step S136 are executed, and thus the average value "0.51" of the different-layer series co-occurrence level and the average value "0.10" of the different-layer series co-occurrence level are calculated.

Next, in the step S137, the keyword "chuck" indicating the generated genre is set as a first keyword, and the keyword "rib roast" indicating the attention genre is set as a second keyword.

Subsequently, in the step S138, the calculating part 235 searches, from the number-of-obtainment table in FIG. 13, the number of searches "160" associated with the first keyword "chuck" and the number of searches "120" associated with the second keyword "rib roast". Next, the calculating part 235 searches the number of obtainments of the different-layer query "30" associated with the first keyword "chuck" and the second keyword "rib roast" from the number of obtainment table in FIG. 11.

Next, the calculating part 235 calculates the different-layer attention co-occurrence level "0.11" using the above-explained formula (6), and terminates the execution of the different-layer attention co-occurrence level calculating process.

After the execution of the step S108 in FIG. 22, the generating process in FIG. 26 is executed (step S109).

When the execution of the generating process starts, the calculating part 235 calculates a different-layer series disparity "0.40" that is an absolute value of a value obtained by subtracting the different-layer attention co-occurrence level "0.11" from the average value "0.51" of the different-layer series co-occurrence level (step S141).

Next, the calculating part 235 calculates a different-layer parallel disparity "0.01" that is an absolute value of a value obtained by subtracting the different-layer attention co-occurrence level "0.11" from the average value "0.10" of the different-layer parallel co-occurrence level (step S142).

Subsequently, the calculating part 235 determines that the different-layer series disparity "0.40" is larger than the different-layer parallel disparity "0.01" (step S143: NO), and determines that the different-layer parallel disparity "0.01" is smaller than the disparity threshold "0.10" (step S150: YES).

Figure 30:
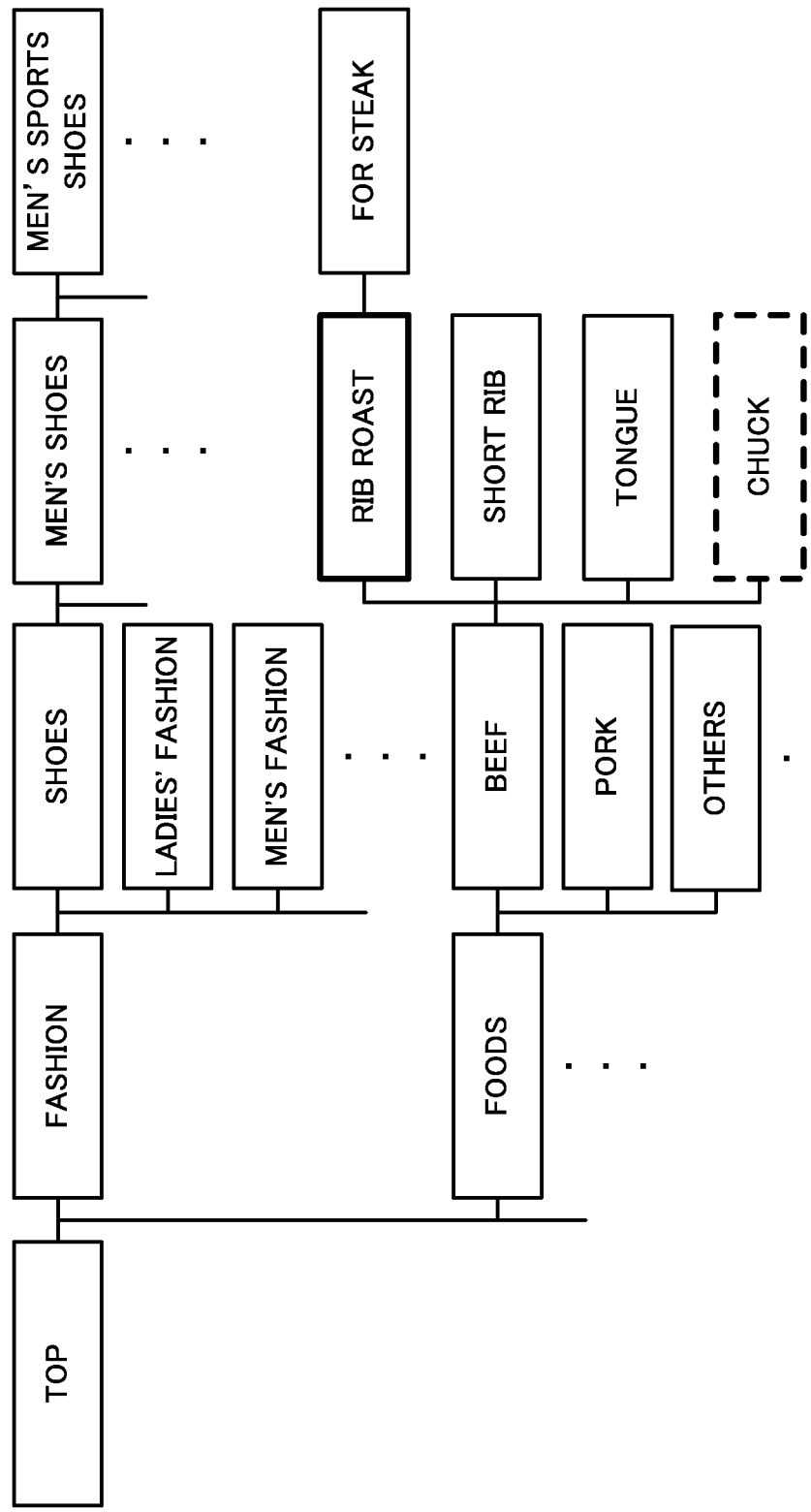
FIG. 30 is a diagram illustrating a third example genre generated through an execution of the genre generating process.

Next, as illustrated in FIG. 30, the generating part 265 generates the new genre "chuck" as the parallel genre of the attention genre "rib roast" (step S151).

That is, after generating the genre ID of the genre "chuck", the generating part 265 stores, in the genre table in FIG. 6, information indicating the generated genre ID and information indicating the genre name of that genre. Next, the generating part 265 searches the genre ID of the already-generated genre "rib roast" from the genre table. Subsequently, the generating part 265 searches the genre ID of the genre "beef" associated with the same lower genre as the genre ID of the searched genre "rib roast" (that is, the genre ID of the proximal upper genre than the genre "rib roast") from the genre hierarchy table in FIG. 7. Thereafter, the generating part 265 sets the genre ID of the genre "chuck" as a lower genre ID, and stores in the genre hierarchy table in FIG. 7 information associating the genre ID of the genre "beef" with the genre ID of the genre "chuck".

After the step S147, the generating part 265 sets the genre generation flag to be "ON" (step S149), and terminates the execution of the generating process.

After the execution of the step S109 in FIG. 22, the generating part 265 determines that the genre generation flag is "ON" (step S110: YES). Next, the re-classifying part 269 in FIG. 5 executes the re-classifying process of re-classifying the product or the like classified in the attention genre "rib roast" into any of the already-present genre "rib roast" and the newly generated genre "chuck" (step S114). Subsequently, the re-classifying part 269 terminates the execution of the genre generating process.

When the calculating part 235 determines in the step S144 in FIG. 26 that the different-layer series disparity is equal to or greater than the disparity threshold (step S144: NO) and determines in the step S150 that the different-layer parallel disparity is equal to or greater than the disparity threshold (step S150: NO), the generating part 265 does not generate a genre. This is because it is undeterminable whether the generated genre is to be generated as the series genre of the attention genre or the parallel genre thereof.

Hence, the generating part 265 does not set the genre generation flag to be "ON", and terminates the generating process. Accordingly, the generating part 265 determines in the step S110 in FIG. 22 that the genre generation flag is "OFF" (step S110: NO), and terminates the execution of the genre generating process without executing the re-classifying process.

Next, an explanation will be given of a deletion of a genre.

Figure 31:
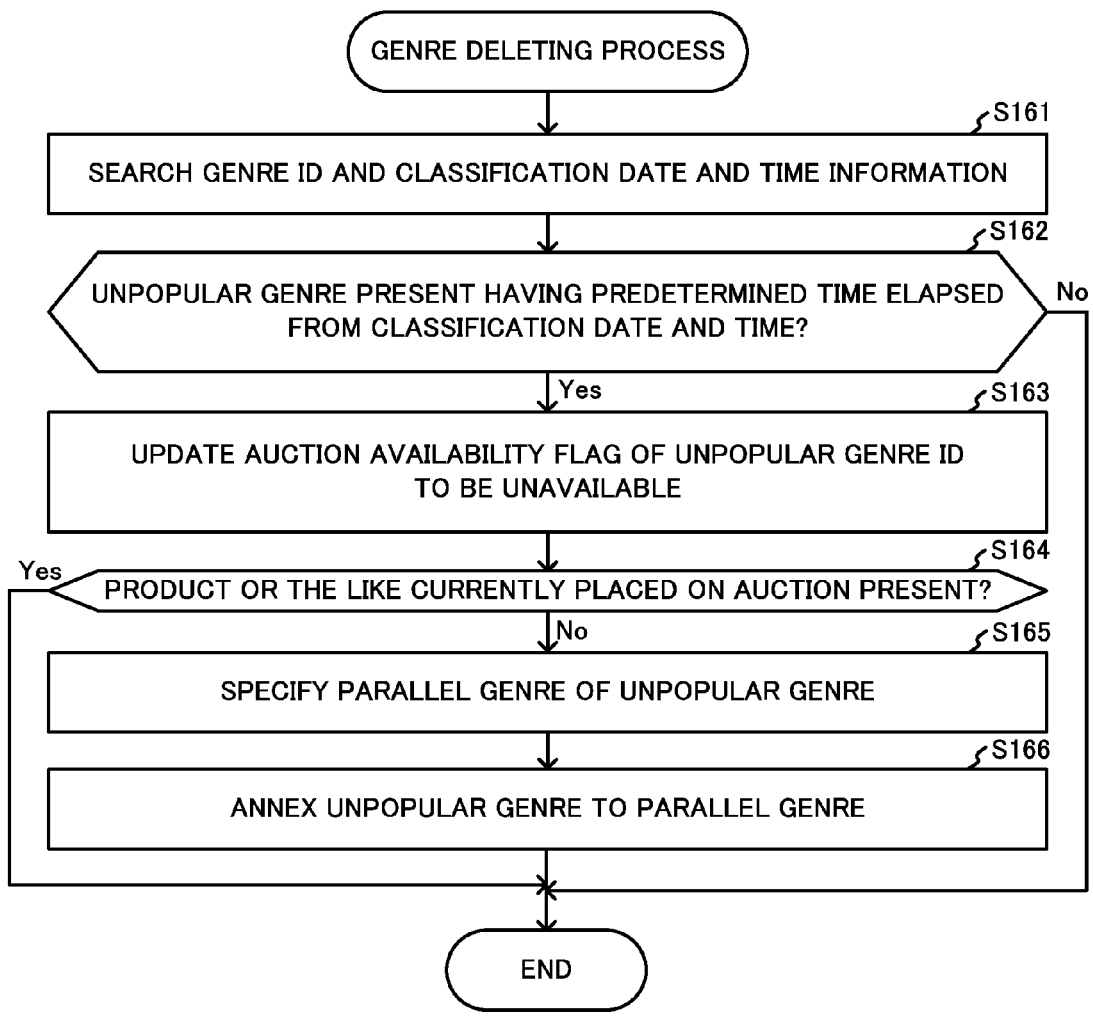
FIG. 31 is a flowchart illustrating an example genre deleting process executed by the genre generation device.

The CPU 200a of the genre generation device 200 illustrated in FIG. 3 executes a genre deleting process in FIG. 31 at a predetermined time cycle, thereby further serving as a deleting part 270 illustrated in FIG. 5.

When the execution of the genre deleting process in FIG. 31 starts, the deleting part 270 in FIG. 5 searches multiple pieces of information indicating a genre ID and classification date and time (hereinafter, referred to as classification date and time information) from the genre table in FIG. 6 (step S161). Next, the deleting part 270 obtains a system date and time from the OS. Subsequently, the deleting part 270 calculates an elapsed time from the classification date and time indicated by the searched information to the system date and time. Next, the deleting part 270 specifies a genre ID associated with the classification date and time information having the calculated elapsed time exceeding a threshold for an elapsed time, and determines the genre identified by the specified genre ID as an unpopular genre. Subsequently, the deleting part 270 determines whether or not there is a genre determined as an unpopular genre (step S162), and when determining that there is no unpopular genre (step S162: NO), the deleting part terminates the execution of the genre deleting process.

Conversely, when determining that there is an unpopular genre (step S162: YES), the deleting part 270 updates, in the genre table in FIG. 6, the auction availability flag associated with the genre ID of the unpopular genre with a flag indicating that an auction is unavailable (step S163). This is because not to classify products or the like made available to an auction into that genre any more.

Thereafter, the deleting part 270 determines whether or not there is a product currently placed on an auction in the unpopular genre (step S164). More specifically, first, the deleting part 270 obtains a system date and time from the OS. Next, when an ID of product or the like associated with information indicating an auction deadline later than the system date and time, and the genre ID indicating the unpopular genre is stored in the table of product or the like in FIG. 8, the deleting part 270 determines that there is a product currently placed on an auction in the unpopular genre.

When determining in the step S164 that there is a product currently placed on an auction in the unpopular genre (step S164: YES), the deleting part 270 terminates the execution of the genre deleting process. This is because not to delete the genre until the auction period of the product or the like in the unpopular genre ends. Conversely, when determining that there is no product currently placed on an auction in the unpopular genre (step S164: NO), the deleting part 270 specifies the parallel genre of the unpopular genre.

Subsequently, the deleting part 270 annexes one of the specified parallel genres to the unpopular genre to delete the unpopular genre (step S166), and terminates the execution of the genre deleting process. More specifically, the deleting part 270 deletes the genre ID of the unpopular genre, information indicating the genre name, information indicating the classification date and time, information indicating the number of classifications, information indicating the number of successful bids, and information indicating the auction availability all stored in the genre table in FIG. 6. Moreover, the deleting part 270 updates information indicating the genre name of the same-layer genre annexed to the unpopular genre with information indicating the genre name having a letter string "etc.," added to the genre name of the same-layer genre.

An explanation will be given of an example case in which the genre name of the unpopular genre is "chuck" and the parallel genre of the unpopular genre is "rib roast". In this case, the deleting part 270 sets the genre name of the genre (hereinafter, referred to as an annexed genre) having the unpopular genre and the parallel genre annexed to each other to be "rib roast, etc.,".

However, the present invention is not limited to this case, and the deleting part 270 may sets the genre name of the annexed genre to be a name having the genre name of the parallel genre and the genre name of the unpopular genre joined together. That is, when the genre name of the unpopular genre is "chuck" and the genre name of the parallel genre is "rib roast", the deleting part 270 may set the genre name of the annexed genre to be "rib roast and chuck".

Moreover, the deleting part 270 may set the genre name of the annexed genre to be a name represented by a common letter string to the genre name of the parallel genre and the genre name of the unpopular genre. That is, when the genre name of the unpopular genre is "chuck (roast)" and the genre name of the parallel genre is "rib roast", the deleting part 270 may set the genre name of the annexed genre to be "roast".

Furthermore, the deleting part 270 may set the genre name of the annexed genre to be a name indicating the broader concept of the genre name of the parallel genre and the genre name of the unpopular genre. That is, when the genre name of the unpopular genre is "chuck (roast)" and the genre name of the parallel genre is "rib roast", the deleting part 270 may set the genre name of the annexed genre to be "roast".

When the co-occurrence level of the first keyword representing the generated genre and the second keyword representing the attention genre is close to the different-layer parallel co-occurrence level rather than the different-layer series co-occurrence level, the genre generation device 200 generates a generated genre as the parallel genre of the attention genre. Moreover, when the co-occurrence level of the first keyword representing the generated genre and the second keyword representing the attention genre is close to the different-layer series co-occurrence level rather than the different-layer parallel co-occurrence level, the genre generation device 200 generates a generated genre as the series genre of the attention genre. Hence, the genre generation device 200 is capable of generating a new genre in an appropriate layer of the hierarchy structured by multiple genres.

The layer where the generated genre is to be generated is determined based on the search query, and the generated genre is generated in the determined layer. Accordingly, unlike a case in which, for example, in order to determine the layer where the generated genre is to be generated, a web page for advertising a product or the like classified in the genre or a web page for selling such a product is used, as long as the search query is obtained, the generated genre into which the product or the like is classified can be generated in an appropriate layer even before the product or the like is, for example, advertised or sold.

In general, users often specify at first a keyword representing an upper genre, and then specify a keyword representing a lower genre contained in the upper genre. Hence, according to the above-explained structure, when the number of preceding times of the first keyword is smaller than the number of following times, the generated genre represented by the first keyword is generated in a lower layer than the attention genre represented by the second keyword, and when the number of preceding times is larger than the number of following times, the generated genre is generated in an upper layer than the attention genre. Accordingly, the generated genre can be generated in a further appropriate layer that is a layer where the generated genre is to be generated.

A search query having a first keyword and a second keyword following to the first keyword and coupled with each other by a NOT operator is a query for instructing a searching of a product or a service excluding a product or the like classified in a second genre from products or the like classified in a first genre. Hence, in general, a user who specifies such a query often thinks that the first genre represented by the first keyword includes the second genre represented by the second keyword and belongs to the upper layer than the layer where the second genre belongs. Hence, according to the above-explained structure, when a search query having the first keyword and the second keyword following to the first keyword and coupled with each other by a NOT operator is obtained, it is presumed that a search query including a coupling word having a third keyword representing a third genre and a fourth keyword representing a fourth genre coupled with each other by an OR operator, and, the first keyword further coupled with each other by an AND operator is obtained. Accordingly, the first genre can be generated in an appropriate layer with reference to layers where the third genre and the fourth genre belong.

Moreover, according to this structure, when it is determined that a new product or service is not classified within a predetermined time period with respect to the second genre, the second genre and the third genre belonging to the same layer as the layer where the second layer belongs are annexed. Accordingly, genres belonging to the genre hierarchy can be maintained in a condition used for a classification of a product or a service. Moreover, a genre not used anymore for a classification of a product or a service is annexed to another genre, facilitating a user to search a product or a service based on the genre hierarchy.

Furthermore, according to this structure, when it is determined that at least one of the number of classifications, the number of searches, the change level, and the number of sales exceeds the respective predetermined thresholds, the first genre is generated in the same layer as the layer where the second genre belongs or a different layer. Accordingly, when, for example, the number of classifications that is the number of products or services classified in the second genre exceeds the threshold for the number of classifications, and it becomes difficult for the user to search the product or the service classified in the second genre, if, for example, the first genre is generated in the lower layer than the layer where the second genre belongs, it becomes easy for the user to search the product or the service.

Moreover, when, for example, the product or the service searched based on the first keyword is a seasonal product intensively purchased in a specific season like a fan, even if such a specific season comes earlier unusually, the first genre can be generated in an appropriate layer immediately after the specific season comes based on the number of searches of the searched product or service with reference to the first keyword, the change level in the number of searches, and the number of sales of the product or the service searched based on the first keyword.

There are a lot of users who are not familiar with how to specify the same-layer operator and the different-layer operator. Moreover, users who specify a search query including a second keyword before a predetermined time elapses after a search query including a first keyword is specified or before a predetermined number of web pages are browsed usually need not only a search result of products or the like explained by the first keyword but also a search result of products or the like explained by the second keyword.

Hence, according to the above-explained structure, when a search query including the second keyword is obtained before a predetermined time elapses after a search query including the first keyword is obtained or before a predetermined number of web pages are browsed, it is presumed that a search query is obtained which has the first keyword and the second keyword coupled with each other by a same-layer operator. Hence, the first genre can be generated in a further appropriate layer as a layer where the first genre is to be generated.

Moreover, according to this structure, when a search query including a first keyword and a search query including a second keyword and a refinement instruction are obtained, it is presumed that a search query having the first keyword and the second keyword coupled with each other not by the same-layer operator is obtained. Hence, even if there are a lot of users who are not familiar with the way of specifying the same-layer operator and the different-layer operator, the first genre can be generated in a further appropriate layer as a layer where the first genre is to be generated.

When a new genre is generated, the product or the service classified in the already-present attention genre is re-classified in a new genre or an already-present genre based on the keyword explaining the product or the service or the name of the product or the service, and a keyword representing a newly generated genre and a keyword representing the already-present genre. Since the product or the service is re-classified in an appropriate genre, searching of the product or the like based on a genre is facilitated.

First Modified Example

In the foregoing embodiment, the explanation was given of a case in which the presenting part 230 in FIG. 5 is realized by the CPU 200a in FIG. 3 that works together with the LAN card 200f, and transmits a web page to the seller terminal device 101 and the bidder terminal device 102. Moreover, the explanation was given of a case in which the transmitted web page is received by the seller terminal device 101 and the bidder terminal device 102, and the display of the seller terminal device 101 and the display of the bidder terminal device 102 display such a web page. The present invention is, however, not limited to this case, and for example, the presenting part 230 may be realized by the CPU 200a that works together with the LCD 200h in FIG. 2 to display the web page.

Second Modified Example

In the foregoing embodiment, the explanation was given of a case in which the generating part 265 in FIG. 5 generates a generated genre represented by the first keyword as a proximal upper genre of the attention genre represented by the second keyword (step S147) when the number of preceding times that the first keyword precedes the second keyword is larger than the number of following times (step S146: YES) in the step S146 in FIG. 26. Moreover, the generating part 265 generates a generated genre as a proximal lower genre of the attention genre (step S148) when the number of preceding times is smaller than the number of following times (step S146: NO).

In this modified example, the generating part 265 searches in the step S146 in FIG. 24 information indicating the number of searches (hereinafter, referred to as a first search number) associated with information indicating the same keyword as the first keyword and information indicating the number of searches (hereinafter, referred to as a second search number) of the product or the like searched based on the same keyword as the second keyword from the number-of-search table in FIG. 13. Next, the generating part 265 generates a generated genre represented by the first keyword as a proximal upper genre of the attention genre represented by the second keyword (step S147) when the first search number is larger than the second search number. Moreover, the generating part 265 generates a generated genre as a proximal lower genre of the attention genre (step S148) when the first search number is smaller than the second search number.

In general, a keyword representing an upper genre is often used for a search rather than a keyword representing a lower genre. This is because the number of products or the like searched based on the keyword representing the upper genre is larger than the number of products or the like searched based on the keyword representing the lower genre. Hence, according to those structures, the generated genre can be generated in a further appropriate layer as a layer where the generated genre represented by the first keyword is to be generated.

Third Modified Example

In the foregoing embodiment, the explanation was given of a case in which the generating part 265 in FIG. 5 obtains, from the sequence table illustrated in FIG. 12, the number of preceding times that the first keyword is used in a search query preceding to the second keyword, and the number of following times used followingly in the step S145 in FIG. 26. Moreover, the explanation was given of a case in which, in the step S146, when the number of preceding times of the first keyword is larger than the number of following times (step S146: YES), the generating part 265 generates a generated genre represented by the first keyword as a proximal upper genre of the attention genre represented by the second keyword (step S147). Moreover, the explanation was given of a case in which when the number of preceding times is smaller than the number of following times (step S146: NO), the generating part 265 generates a generated genre as a proximal lower genre of the attention genre (step S148).

In this modified example, the generating part 265 searches in the step S145 in FIG. 26 the ID of product or the like associated with information representing the same keyword as the first keyword from the keyword table of product or the like in FIG. 9, and sets the number of searched IDs of products or the like to be a first search result number. Moreover, the generating part 265 searches the ID of product or the like associated with information representing the same keyword as the second keyword, and sets the number of searched IDs of products or the like to be a second search result number. Subsequently, when the first search result number is larger than the second search result number, the generating part 265 generates a generated genre represented by the first keyword as a proximal upper genre of the attention genre represented by the second keyword (step S147). Moreover, when the first search result number is smaller than the second search result number, the generating part 265 generates a generated genre as a proximal lower genre of the attention genre (step S148).

In general, the number of products or the like searched based on a keyword representing the upper genre is larger than the number of products or the like searched based on a keyword representing the lower genre. Hence, according to the above-explained structure, a genre can be generated in a further appropriate layer as a layer where the genre is to be generated.

Fourth Modified Example

In the foregoing embodiment, the explanation was given of a case in which when multiple keywords are contained in a search query (step S18 in FIG. 10: NO), the genre generation device 200 updates the number of searches stored in the number-of-search table in FIG. 13 through the calculation process on execution (step S93 in FIG. 20). Hence, the explanation was given of a case in which the genre generation device 200 applies the number of uses of the keyword for searching together with another keyword in a search query to the above-explained formulae (4) to (6), thereby calculating the different-layer series co-occurrence level, the different-layer parallel co-occurrence level, and the different-layer attention co-occurrence level.

In this modified example, the genre generation device 200 updates the number of searches of a keyword stored in the number-of-search table in FIG. 13 only when the number of keywords contained in a search query is one. Hence, the genre generation device 200 applies the number of searches solely used in a search query for searching to the above-explained formulae (4) to (6), thereby calculating the different-layer series co-occurrence level, the different-layer parallel co-occurrence level, and the different-layer attention co-occurrence level.

Fifth Modified Example

In this modified example, the genre generation device 200 updates the number of searches stored in the number-of-search table in FIG. 13 only when keywords contained in a search query are coupled with each other by a different-layer operator. Hence, the genre generation device 200 applies the number of uses of the keyword for searching in a search query together with another keyword and a different-layer operator to the above-explained formulae (4) to (6), thereby calculating the different-layer series co-occurrence level, the different-layer parallel co-occurrence level, and the different-layer attention co-occurrence level.

Sixth Modified Example

In the foregoing embodiment, the explanation was given of a case in which the genre generation device 200 calculates the different-layer series co-occurrence level for all series genres through the different-layer attention co-occurrence level calculating process in FIG. 25, and calculates an average value of all calculated different-layer series co-occurrence levels of the series genres.

In this modified example, the genre generation device 200 calculates the different-layer series co-occurrence level only for series genres belonging to a different layer by a number of layers smaller than a predetermined number of layers from the attention genre, and calculates an average value of the calculated different-layer series co-occurrence levels of the series genres.

Seventh Modified Example

In the foregoing embodiment, the explanation was given of a case in which the genre generation device 200 calculates the different-layer parallel co-occurrence level for all parallel genres through the different-layer attention co-occurrence level calculating process in FIG. 25, and calculates an average value of all calculated different-layer parallel co-occurrence levels of the parallel genres.

In this modified example, the genre generation device 200 calculates the different-layer parallel co-occurrence level only for a predetermined number of parallel genres, and calculates an average value of the calculated different-layer parallel co-occurrence levels of the parallel genres.

Eighth Modified Example

In the foregoing embodiment, the explanation was given of a case in which the genre generation device 200 calculates an arithmetic average value of multiple different-layer series co-occurrence levels calculated for multiple series genres in the step S133 of the different-layer attention co-occurrence level calculating process in FIG. 25.

In this modified example, the genre generation device 200 calculates a weighted average value of multiple different-layer series co-occurrence levels respectively calculated for multiple series genres. In particular, the genre generation device 200 may calculate a weighted average in such a way that a series genre belonging to a layer farther from the layer where the attention genre belongs has a different-layer series co-occurrence level with a lighter weighting. Moreover, the present invention is not limited to this case, and the genre generation device 200 may calculate a weighted average in such a way that a series genre belonging to a layer farther from the layer where the attention genre belongs has a different-layer co-occurrence level with a heavier weighting.

Ninth Modified Example

In this modified example, the explanation was given of a case in which the genre generation device 200 calculates the different-layer series co-occurrence level, the different-layer parallel co-occurrence level, and the different-layer attention co-occurrence level using the respective formulae (4) to (6). However, the genre generation device 200 may calculate the different-layer series co-occurrence level, the different-layer parallel co-occurrence level, and the different-layer attention co-occurrence level using the following respective formulae (9) to (11).

[Formula 4]

$$\text{Different-layer series co-occurrence level} = \frac{\text{number of obtainments of different-layer query}}{\text{number of searches of series keyword} \times \text{number of searches of attention keyword}} \quad (9)$$

[Formula 5]

$$\text{Different-layer parallel co-occurrence level} = \frac{\text{number of obtainments of different-layer query}}{\text{number of searches of parallel keyword} \times \text{number of searches of attention keyword}} \quad (10)$$

[Formula 6]

$$\text{Different-layer attention co-occurrence level} = \frac{\text{number of obtainments of different-layer query}}{\text{number of searches of first keyword} \times \text{number of searches of second keyword}} \quad (11)$$

Moreover, the genre generation device 200 may calculate a different-layer series co-occurrence level, a different-layer parallel co-occurrence level, and a different-layer attention co-occurrence level that are non-dimensional barometers using the following respective formulae (12) to (14).

[Formula 7]

$$\text{Different-layer series co-occurrence level} = \frac{(\text{number of obtainments of different-layer query})^2}{\text{number of searches of series keyword} \times \text{number of searches of attention keyword}} \quad (12)$$

[Formula 8]

$$\text{Different-layer parallel co-occurrence level} = \frac{(\text{number of obtainments of different-layer query})^2}{\text{number of searches of parallel keyword} \times \text{number of searches of attention keyword}} \quad (13)$$

[Formula 9]

$$\text{Different-layer attention co-occurrence level} = \frac{(\text{number of obtainments of different-layer query})^2}{\text{number of searches of first keyword} \times \text{number of searches of second keyword}} \quad (14)$$

10th Modified Example

In the foregoing embodiment, the explanation was given of a case in which when determining that the different-layer series disparity is smaller than the different-layer parallel disparity, and that the different-layer series disparity is smaller than the predetermined disparity threshold, the genre generation device 200 generates a generated genre as the series genre of the attention genre. Conversely, the explanation was also given of a case in which when determining that the different-layer series disparity is smaller than the different-layer parallel disparity and that the different-layer series disparity is equal to or larger than the predetermined disparity threshold, the genre generation device 200 generates no generated genre.

In this modified example, like the foregoing embodiment, when determining that the different-layer series disparity is smaller than the different-layer parallel disparity and that the different-layer series disparity is smaller than the predetermined disparity threshold, the genre generation device 200 generates a generated genre as a series genre of the attention genre. Conversely, when determining that the different-layer series disparity is smaller than the different-layer parallel disparity and that the different-layer series disparity is equal to or larger than the predetermined disparity threshold, the genre generation device 200 generates a generated genre as the parallel genre of the attention genre.

11th Modified Example

In the foregoing embodiment, the explanation was given of a case in which the genre generation device 200 calculates an average value of the different-layer series co-occurrence levels, and sets the calculated average value of the different-layer series co-occurrence levels as a threshold to be compared with the different-layer attention co-occurrence level (hereinafter, referred to a level threshold). The level threshold is also a threshold to determine whether or not the generated genre is to be generated as the series genre of the attention genre. Moreover, the explanation was given of a case in which the genre generation device 200 determines whether or not the different-layer series disparity that is a disparity between the calculated average value of the different-layer series co-occurrence levels and the different-layer attention co-occurrence level is smaller than the different-layer parallel disparity. Subsequently, the explanation was given of a case in which when determining that the different-layer series difference is smaller than the different-layer parallel disparity, and that the different-layer series disparity is smaller than the predetermined disparity threshold, the genre generation device 200 generates a generated genre as the series genre of the attention genre.

In this modified example, the genre generation device 200 does not calculate an average value of the different-layer series co-occurrence levels as the level threshold, but takes a value input by the user of the genre generation device 200 through the keyboard illustrated in FIG. 3 as the level threshold.

12th Modified Example

In the foregoing embodiment, the explanation was given of a case in which the genre generation device 200 determines whether to set the generated genre as the series genre of the attention genre or the parallel genre thereof, and whether or not to generate the generated genre using only a level of co-occurrence of the different-layer operator and multiple keywords.

In this modified example, the genre generation device 200 determines whether to set the generated genre as the series genre of the attention genre or the parallel genre thereof, and whether or not to generate the generated genre using not only the level of co-occurrence of the different-layer operator and multiple keywords but also a level of co-occurrence of the same-layer operator and the multiple keywords. An explanation will be mainly given of a difference between the foregoing embodiment and this modified example, and the explanation for the common features will be omitted below.

Figure 32:
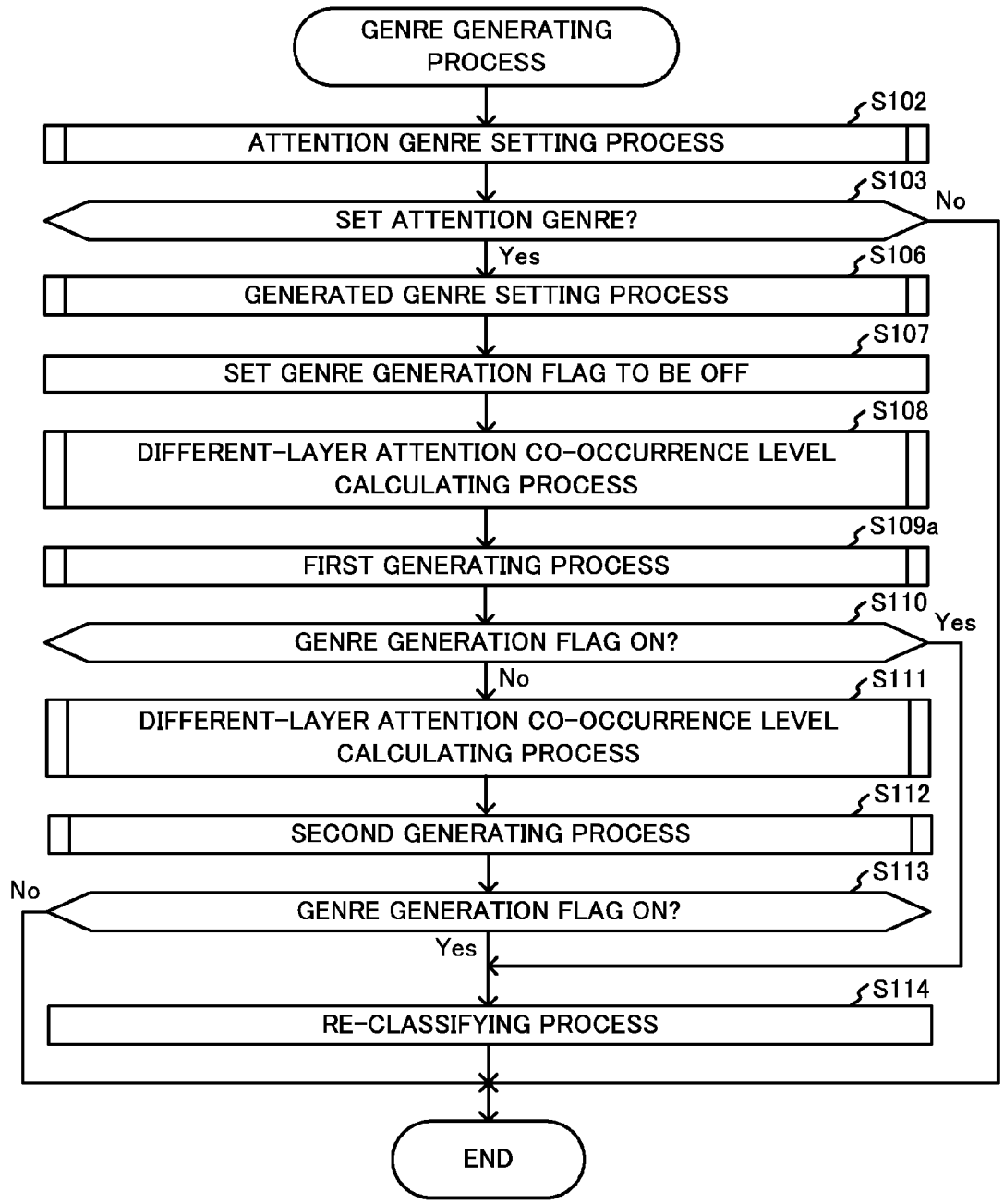
FIG. 32 is a flowchart illustrating an example genre generating process executed by a genre generation device of a 12th modified example.
Figure 33:
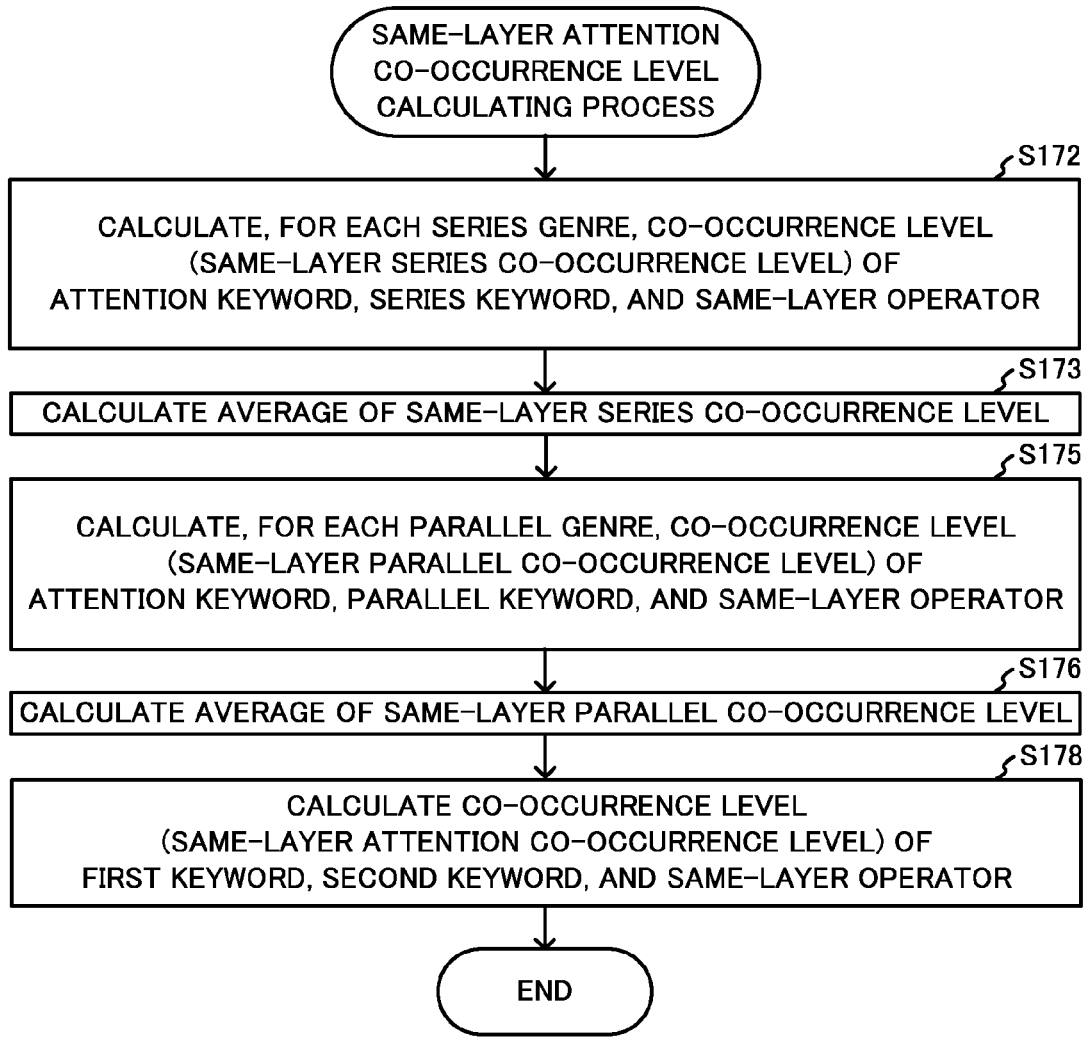
FIG. 33 is a flowchart illustrating an example same-layer attention co-occurrence level calculating process executed by the genre generation device of the 12th modified example.

In this modified example, the genre generation device 200 executes a genre generating process illustrated in FIG. 32.

The genre generation device 200 of this modified example executes the processes in the steps S102, 103, and from S106 to S108 explained in the foregoing embodiment.

Next, the genre generation device 200 executes a first generating process (step S109a). The first generating process is the same as the generating process illustrated in FIG. 26.

That is, when determining that the different-layer series disparity is equal to or larger than the disparity threshold (refer to step S144: NO), and determining that the different-layer parallel disparity is equal to or greater than the disparity threshold (refer to step S150: NO), the genre generation device 200 does not generate a genre.

After the execution of the step S109a, the genre generation device 200 determines whether or not the genre generation flag is "ON" (that is, whether or not a genre is generated) (step S110). At this time, when determining that the genre generation flag is "OFF" (that is, no genre is generated) (step S110: NO), the genre generation device 200 executes a same-layer attention co-occurrence level calculating process illustrated in FIG. 31 (step S111).

When the same-layer attention co-occurrence level calculating process in FIG. 31 starts, the genre generation device 200 calculates, for each series genre searched in the step S131 in FIG. 25, a same-layer series co-occurrence level using the following formula (15) (step S172).

[Formula 10]

$$\text{Same-layer series co-occurrence level} = \frac{\text{number of obtainments of same-layer query}}{\text{number of searches of series keyword} + \text{number of searches of attention keyword}} \quad (15)$$

The same-layer series co-occurrence level is a barometer indicating how frequently the attention keyword and the series keyword are coupled with each other by the same-layer operator and co-occurring in a search query.

After the step S172, the genre generation device 200 calculates an arithmetic average of the calculated multiple same-layer series co-occurrence levels (step S173).

Next, the genre generation device 200 calculates a same-layer parallel co-occurrence level for each parallel genre searched in the step S134 in FIG. 25 using the following formula (16) (step S175).

[Formula 11]

$$\text{Same-layer parallel co-occurrence level} = \frac{\text{number of obtainments of same-layer query}}{\text{number of searches of parallel keyword} + \text{number of searches of attention keyword}} \quad (16)$$

The same-layer parallel co-occurrence level is a barometer indicating how frequently the attention keyword and the parallel keyword are coupled with each other using the same-layer operator and co-occurring in a search query.

After the step S175, the genre generation device 200 calculates an arithmetic average of the calculated multiple same-layer parallel co-occurrence levels (step S176).

Subsequently, the genre generation device 200 calculates a same-layer attention co-occurrence level of the first keyword (that is, the keyword representing the generated genre) set in the step S137 in FIG. 25 and the second keyword (that is, the keyword representing the attention genre) using the following formula (17) (step S178).

[Formula 12]

$$\text{Same-layer attention co-occurrence level} = \frac{\text{number of obtainments of same-layer query}}{\text{number of searches of first keyword} + \text{number of searches of second keyword}} \quad (17)$$

The same-layer attention co-occurrence level is a barometer indicating how frequently the first keyword and the second keyword representing the attention genre are coupled with each other by the same-layer operator and co-occurring in a search query.

After the step S178, the genre generation device 200 terminates the execution of the same-layer attention co-occurrence level calculating process.

After the execution of the step S111 in FIG. 32, the genre generation device 200 executes a second generating process illustrated in FIG. 34 (step S112). The second generating process is a process of executing the generating process in FIG. 26 using not the different-layer series co-occurrence level, the different-layer parallel co-occurrence level, and the different-layer attention co-occurrence level but the same-layer series co-occurrence level, the same-layer parallel co-occurrence level, and the same-layer attention co-occurrence level, and thus the explanation of the second generating process will be omitted.

After the execution of the step S112, the genre generation device 200 determines whether or not the genre generation flag is "ON" (step S113). At this time, when determining that the genre generation flag is "OFF" (step S113: NO), the genre generation device 200 terminates the execution of the genre generating process.

When determining in the step S110 or the step S113 that the genre generation flag is "ON" (step S110: YES, or step S113: YES), the genre generation device 200 executes the re-classifying process explained in the above embodiment, and then terminates the execution of the genre generating process.

13th Modified Example

In the foregoing embodiment and first to 11th modified examples thereof, the explanation was given of a case in which the genre generation device 200 determines which one of the different-layer series disparity which is an absolute value of a difference between the average value of the different-layer series co-occurrence levels and the different-layer attention co-occurrence level, and, the different-layer parallel disparity which is an absolute value of a difference between the average value of the different-layer parallel co-occurrence levels and the different-layer attention co-occurrence level is smaller. Next, the explanation was also given of a case in which when determining that the different-layer series disparity is smaller than the different-layer parallel disparity and that the different-layer series disparity is smaller than the predetermined disparity threshold, the genre generation device 200 generates a generated genre as the series genre of the attention genre. Conversely, the explanation was further given of a case in which when determining that the different-layer series disparity is equal to or larger than the different-layer parallel disparity and that the different-layer parallel disparity is smaller than the predetermined disparity threshold, the genre generation device 200 generates a generated genre as the parallel genre of the attention genre.

In this modified example, the genre generation device 200 determines which one of the same-layer series disparity that is an absolute value of a difference between the average value of the same-layer series co-occurrence levels and the same-layer attention co-occurrence level, and, the same-layer parallel disparity that is an absolute value of a difference between the average value of the same-layer parallel co-occurrence level and the same-layer attention co-occurrence level is smaller. Next, when determining that the same-layer series disparity is smaller than the same-layer parallel disparity and that the same-layer series disparity is smaller than the predetermined disparity threshold, the genre generation device 200 generates a generated genre as the series genre of the attention genre. Conversely, when determining that the same-layer series disparity is equal to or greater than the same-layer parallel disparity and that the same-layer parallel disparity is smaller than the predetermined disparity threshold, the genre generation device 200 generates a generated genre as the parallel genre of the attention genre.

14th Modified Example

In the foregoing embodiment and the 12th modified example thereof, the explanation was given of a case in which when determining that the different-layer series disparity is smaller than the different-layer parallel disparity and that the different-layer series disparity is smaller than the predetermined disparity threshold, the genre generation device 200 generates a generated genre as the series genre of the attention genre. Conversely, the explanation was also given of a case in which when determining that the different-layer series disparity is equal to or greater than the different-layer parallel disparity and that the different-layer parallel disparity is smaller than the predetermined disparity threshold, the genre generation device 200 generates a generated genre as the parallel genre of the attention genre.

Moreover, the explanation was given of a case in which when determining that the different-layer series disparity is smaller than the different-layer parallel disparity and that the different-layer series disparity is equal to or greater than the predetermined disparity threshold, or, when determining that the different-layer series disparity is equal to or greater than the different-layer parallel disparity and that the different-layer parallel disparity is equal to or greater than the predetermined disparity threshold, the genre generation device 200 executes the following process. Such a process is to determine which one of the same-layer series disparity that is an absolute value of a difference between the average value of the same-layer series co-occurrence levels and the same-layer attention co-occurrence level, and, the same-layer parallel disparity that is an absolute value of a difference between the average value of the same-layer parallel co-occurrences level and the same-layer attention co-occurrence level is smaller.

Next, the explanation was given of a case in which when determining that the same-layer series disparity is smaller than the same-layer parallel disparity and that the same-layer series disparity is smaller than the predetermined disparity threshold, the genre generation device 200 generates a generated genre as the series genre of the attention genre. Conversely, the explanation was further given of a case in which when determining that the same-layer series disparity is equal to or larger than the same-layer parallel disparity and that the same-layer parallel disparity is smaller than the predetermined disparity threshold, the genre generation device 200 generates a generated genre as the parallel genre of the attention genre.

In this modified example, when determining that the same-layer series disparity is smaller than the same-layer parallel disparity and that the same-layer series disparity is smaller than the predetermined disparity threshold, the genre generation device 200 generates a generated genre as the series genre of the attention genre. Conversely, when determining that the same-layer series disparity is equal to or greater than the same-layer parallel disparity and that the same-layer parallel disparity is smaller than the predetermined disparity threshold, the genre generation device 200 generates a generated genre as the parallel genre of the attention genre.

Moreover, when determining that the same-layer series disparity is smaller than the same-layer parallel disparity and that the same-layer series disparity is equal to or greater than the predetermined disparity threshold, or, when determining that the same-layer series disparity is equal to or greater than the same-layer parallel disparity and that the same-layer parallel disparity is equal to or greater than the predetermined disparity threshold, the genre generation device 200 determines which one of the different-layer series disparity and the different-layer parallel disparity is smaller. Next, when determining that the different-layer series disparity is smaller than the different-layer parallel disparity and that the different-layer series disparity is smaller than the predetermined disparity threshold, the genre generation device 200 generates a generated genre as the series genre of the attention genre. Conversely, when determining that the different-layer series disparity is equal to or greater than the different-layer parallel disparity and that the different-layer parallel disparity is smaller than the predetermined disparity threshold, the genre generation device 200 generates a generated genre as the parallel genre of the attention genre.

15th Modified Example

In the foregoing embodiment and first to 14th modified examples thereof, the explanation was given of a case in which the genre generation device 200 calculates the different-layer series co-occurrence level that is a barometer indicating how frequently the attention keyword representing the attention genre and the series keyword representing the series genre of the attention genre are coupled with each other by a different-layer operator and co-occurring in a search query. Moreover, in the foregoing embodiment and first to 14th modified examples thereof, the explanation was given of a case in which the genre generation device 200 calculates the different-layer parallel co-occurrence level that is a barometer indicating how frequently the attention keyword representing the attention genre and the parallel keyword representing the parallel genre of the attention genre are coupled with each other by a different-layer operator and co-occurring in a search query.

In this modified example, however, the different-layer series co-occurrence level calculated by the genre generation device 200 is not limited to a barometer indicating how frequently the attention keyword representing the attention genre and the series keyword representing the series genre of the attention genre are coupled with each other by a different-layer operator and co-occurring in a search query. Moreover, in this modified example, the different-layer parallel co-occurrence level calculated by the genre generation device 200 is not limited to a barometer indicating how frequently the attention keyword representing the attention genre and the parallel keyword representing the parallel genre of the attention genre are coupled with each other by a different-layer query and co-occurring in a search query.

More specifically, the genre generation device 200 specifies any genre belonging to a genre hierarchy where the attention genre belongs (that is, an attention genre or a genre different therefrom), and sets the genre specified as a specified genre. Next, the genre generation device 200 calculates a different-layer series co-occurrence level that is a barometer indicating how frequently a specified keyword representing the specified genre and the series keyword representing the series genre of the specified genre are coupled with each other by a different-layer operator and co-occurring in a search query. Moreover, the genre generation device 200 calculates a different-layer parallel co-occurrence level that is a barometer indicating how frequently the specified keyword representing the specified genre and the parallel keyword representing the parallel genre of the specified genre are coupled with each other by a different-layer operator and co-occurring in a search query.

Furthermore, in the 12th and 14th modified examples of the foregoing embodiment, the explanation was given of a case in which the genre generation device 200 calculates the same-layer series co-occurrence level that is a barometer indicating how frequently the attention keyword representing the attention genre and the series keyword representing the series genre of the attention genre are coupled with each other by a same-layer operator and co-occurring in a search query. Moreover, in the 12th and 14th modified examples of the foregoing embodiment, the explanation was given of a case in which the genre generation device 200 calculates the same-layer parallel co-occurrence level that is a barometer indicating how frequently the attention keyword representing the attention genre and the parallel keyword representing the parallel genre of the attention genre are coupled with each other by a same-layer operator and co-occurring in a search query.

In this modified example, however, the same-layer series co-occurrence level calculated by the genre generation device 200 is not limited to a barometer indicating how frequently the attention keyword representing the attention genre and the series keyword representing the series genre of the attention genre are coupled with each other by a same-layer operator and co-occurring in a search query. Moreover, in this modified example, the same-layer parallel co-occurrence level calculated by the genre generation device 200 is not limited to a barometer indicating how frequently the attention keyword representing the attention genre and the parallel keyword representing the parallel genre of the attention genre are coupled with each other by a same-layer operator and co-occurring in a search query.

More specifically, the genre generation device 200 calculates a same-layer series co-occurrence level that is a barometer indicating how frequently the specified keyword representing the specified genre and the series keyword representing the series genre of the specified genre are coupled with each other by a same-layer operator and co-occurring in a search query. Moreover, the genre generation device 200 calculates a same-layer parallel co-occurrence level that is a barometer indicating how frequently the specified keyword representing the specified genre and the parallel keyword representing the parallel genre of the specified genre are coupled with each other by a same-layer operator and co-occurring in a search query.

16th Modified Example

In the foregoing embodiment and first to 11th and 13th modified examples thereof, the explanation was given of a case in which the genre generation device 200 calculates the different-layer series co-occurrence level that is a barometer indicating how frequently the attention keyword representing the attention genre and the series keyword representing the series genre of the attention genre are coupled with each other by a different-layer operator and co-occurring in a search query Moreover, the explanation was given of a case in which the series genre of the attention genre is a genre which is among genres present on a path from the top genre to the lowermost genre through the attention genre and which is not the top genre and the attention genre. Also, the explanation was given of a case in which the genre generation device 200 calculates respective different-layer series co-occurrence levels for some of or all of multiple series genres present on the path, and calculates the average value of the calculated multiple different-layer series co-occurrence levels. Furthermore, the explanation was given of a case in which the genre generation device 200 calculates the different-layer attention co-occurrence level that is a barometer indicating how frequently the first keyword representing the generated genre and the second keyword representing the attention genre are coupled with each other by a different-layer operator and co-occurring in a search query. Still further, the explanation was given of a case in which the genre generation device 200 determines whether to generate the generated genre as the series genre of the attention genre or as the parallel genre thereof based on the average value of the different-layer series co-occurrence levels and the different-layer attention co-occurrence level.

In this modified example, the genre generation device 200 calculates, instead of the different-layer series co-occurrence level, a barometer (hereinafter, referred to as a first different-layer co-occurrence level) indicating how frequently the attention keyword representing the attention keyword and a keyword (hereinafter, referred to as a different-layer keyword) representing a genre (hereinafter, referred to as a different-layer genre) belonging to a different layer from the layer where the attention genre belongs are coupled with each other by a different-layer operator and co-occurring in a search query. Moreover, the genre generation device 200 calculates the first different-layer co-occurrence levels for some of or all of multiple different-layer genres of the attention genre, and calculates the average value of the calculated multiple first different-layer co-occurrence levels. Subsequently, the genre generation device 200 determines whether to generate the generated genre as the series genre of the attention genre or as the parallel genre thereof based on the average value of the first different-layer co-occurrence levels and the different-layer attention co-occurrence level.

In the foregoing embodiment and first to 11th and 13th modified examples thereof, the explanation was given of a case in which the genre generation device 200 calculates the different-layer parallel co-occurrence level that is a barometer indicating how frequently the attention keyword representing the attention genre and the parallel keyword representing the parallel genre of the attention genre are coupled with each other by a different-layer operator and co-occurring in a search query. Moreover, the explanation was given of a case in which the parallel genre of the attention genre is a genre which is a proximal lower genre of the proximal upper genre of the attention genre, and is not the attention genre. The explanation was also given of a case in which the genre generation device 200 calculates respective different-layer parallel co-occurrence levels for some of or all of multiple parallel genres, and calculates the average value of the calculated multiple different-layer parallel co-occurrence levels. The explanation was further given of a case in which the genre generation device 200 determines whether to generate the generated genre as the series genre of the attention genre or as the parallel genre thereof based on the average value of the different-layer parallel co-occurrence levels, the average value of the different-layer series co-occurrence levels, and the different-layer attention co-occurrence level.

In this modified example, the genre generation device 200 calculates, instead of the different-layer parallel co-occurrence level, a barometer (hereinafter, referred to as a first same-layer co-occurrence level) indicating how frequently the attention keyword representing the attention keyword and a keyword (hereinafter, referred to as a same-layer keyword) representing a genre (hereinafter, referred to as a same-layer genre) belonging to the same layer as the layer where the attention genre belongs are coupled with each other by a different-layer operator and co-occurring in a search query. Moreover, the genre generation device 200 calculates the first same-layer co-occurrence levels for some of or all of multiple same-layer genres of the attention genre, and calculates the average value of the calculated multiple first same-layer co-occurrence levels. Subsequently, the genre generation device 200 determines whether to generate the generated genre as the series genre of the attention genre or as the parallel genre thereof based on the average value of the first same-layer co-occurrence levels, the average value of the first different-layer co-occurrence level and the different-layer attention co-occurrence level.

In the 12th and 14th modified examples of the foregoing embodiment, the explanation was given of a case in which the genre generation device 200 may be undeterminable as to whether to generate the generated genre as the series genre of the attention genre or as the parallel genre thereof based on the average value of the different-layer series co-occurrence levels, the average value of the different-layer parallel co-occurrence levels, and the different-layer attention co-occurrence level. Moreover, the explanation was given of a case in which when it is undeterminable, the genre generation device 200 calculates the average value of the same-layer series co-occurrence levels with respect to multiple series genres of the attention genre, and calculates the average value of the same-layer parallel co-occurrence level with respect to multiple parallel genres of the attention genre. In this case, furthermore, the explanation was given of a case in which the genre generation device 200 determines whether to generate the generated genre as the series genre of the attention genre or as the parallel genre thereof based on the average value of the same-layer series co-occurrence levels, the average value of the same-layer parallel co-occurrence levels, and the same-layer attention co-occurrence level.

In this modified example, the genre generation device 200 calculates, instead of the same-layer series co-occurrence level, a barometer (hereinafter, referred to as a second different-layer co-occurrence level) indicating how frequently the attention keyword and the different-layer keyword are coupled with each other by a same-layer operator and co-occurring in a search query. Moreover, the genre generation device 200 calculates, instead of the same-layer parallel co-occurrence level, a barometer (hereinafter, referred to as a second same-layer co-occurrence level) indicating how frequently the attention keyword and the same-layer keyword are coupled with each other by a same-layer operator and co-occurring in a search query. Furthermore, the genre generation device 200 determines whether to generate the generated genre as the series genre of the attention genre or as the parallel genre thereof based on the average value of the second different-layer co-occurrence levels, the average value of the second same-layer co-occurrence levels, and the same-layer attention co-occurrence level.

17th Modified Example

In the 16th modified example of the foregoing embodiment, the explanation was given of a case in which the genre generation device 200 calculates the first different-layer co-occurrence level that is a barometer indicating how frequently the attention keyword representing the attention genre and the different-layer keyword representing the different-layer genre of the attention genre are coupled with each other by a different-layer operator and co-occurring in a search query. Moreover, in the 16th modified example of the foregoing embodiment, the explanation was given of a case in which the genre generation device 200 calculates the first same-layer co-occurrence level that is a barometer indicating how frequently the attention keyword representing the attention genre and the same-layer keyword representing the same-layer genre of the attention genre are coupled with each other by a different-layer operator and co-occurring in a search query.

In this modified example, however, the first different-layer co-occurrence level calculated by the genre generation device 200 is not limited to a barometer indicating how frequently the attention keyword representing the attention genre and the different-layer keyword representing the different-layer genre of the attention genre are coupled with each other by a different-layer operator and co-occurring in a search query. Moreover, in this modified example, the first same-layer co-occurrence level calculated by the genre generation device 200 is not limited to a barometer indicating how frequently the attention keyword representing the attention genre and the same-layer keyword representing the same-layer genre of the attention genre are coupled with each other by a different-layer operator and co-occurring in a search query.

More specifically, the genre generation device 200 specifies any genre belonging to the genre hierarchy where the attention genre belongs (that is, the attention genre or a genre different therefrom), and sets the genre specified as a specified genre. Next, the genre generation device 200 calculates a first different-layer co-occurrence level that is a barometer indicating how frequently a specified keyword representing the specified genre and the different-layer keyword representing the different-layer genre of the specified genre are coupled with each other by a different-layer operator and co-occurring in a search query. Moreover, the genre generation device 200 calculates a first same-layer co-occurrence level that is a barometer indicating how frequently the specified keyword representing the specified genre and the same-layer keyword representing the same-layer genre of the specified genre are coupled with each other by a different-layer operator and co-occurring in a search query.

Moreover, in the 16th modified example of the foregoing embodiment, the explanation was given of a case in which the genre generation device 200 calculates the second different-layer co-occurrence level that is a barometer indicating how frequently the attention keyword representing the attention genre and the different-layer keyword representing the different-layer genre of the attention genre are coupled with each other by a same-layer operator and co-occurring in a search query. Furthermore, in the 16th modified example of the foregoing embodiment, the explanation was given of a case in which the genre generation device 200 calculates the second same-layer co-occurrence level that is a barometer indicating how frequently the attention keyword representing the attention genre and the same-layer keyword representing the same-layer genre of the attention genre are coupled with each other by a same-layer operator and co-occurring in a search query.

In this modified example, however, the second different-layer co-occurrence level calculated by the genre generation device 200 is not limited to a barometer indicating how frequently the attention keyword representing the attention genre and the different-layer keyword representing the different-layer genre of the attention genre are coupled with each other by a same-layer operator and co-occurring in a search query. Moreover, in this modified example, the second same-layer co-occurrence level calculated by the genre generation device 200 is not limited to a barometer indicating how frequently the attention keyword representing the attention genre and the same-layer keyword representing the same-layer genre of the attention genre are coupled with each other by a same-layer operator and co-occurring in a search query.

More specifically, the genre generation device 200 calculates a second different-layer co-occurrence level that is a barometer how frequently the specified keyword representing the specified genre and the different-layer keyword representing the different-layer genre of the specified genre are coupled with each other by a same-layer operator and co-occurring in a search query. Moreover, the genre generation device 200 calculates a second same-layer co-occurrence level that is a barometer indicating how frequently the specified keyword representing the specified genre and the same-layer keyword representing the same-layer genre of the specified genre are coupled with each other by a same-layer genre and co-occurring in a search query.

18th Modified Example

In the foregoing embodiment, the explanation was given of a case in which the genre generation device 200 determines which one of the same-layer series co-occurrence level of the second keyword representing the attention keyword and the keyword representing the series genre of the attention genre, and the same-layer parallel co-occurrence level of the keyword representing the parallel genre of the attention genre is the same-layer attention co-occurrence level of the first keyword representing the generated genre and the second keyword close to. Moreover, the explanation was given of a case in which when determining that the same-layer attention co-occurrence level is closer to the same-layer parallel co-occurrence level rather than the series co-occurrence level, the genre generation device 200 generates the generated genre as the parallel genre of the attention genre. Conversely, the explanation was also given of a case in which when determining that the same-layer attention co-occurrence level is closer to the series co-occurrence level rather than the same-layer parallel co-occurrence level, the genre generation device 200 generates the generated genre as the series genre of the attention genre.

In this embodiment, the genre generation device 200 determines whether or not the attention genre is a genre "others" based on the name of the attention genre, and when determining that the attention genre is "others", the genre generation device does not calculate all of the same-layer attention co-occurrence level, the same-layer parallel co-occurrence level, and the series co-occurrence level, but generates the generated genre as the parallel genre of the attention genre.

When a user attempts to classify a product or the like to be placed on an auction into any of genres belonging to a given layer, but determines that there is no appropriate genre where such a product or the like is classified, the user often classifies the product into the genre "others" belonging to that layer. Hence, according to this structure, the genre where the product or the like classified into the genre "others" is classified is generated in the same layer as the layer where the genre "others" belongs, and thus a new genre can be generated in an appropriate layer.

The foregoing embodiment and the first to 18th modified examples thereof can be combined with each other. The present invention can be provided as not only a genre generation device 200 including a structure for realizing the function of any of the foregoing embodiment and the first to 18th modified examples thereof, but also a system constructed by multiple devices and including a structure for realizing the function of the foregoing embodiment as a whole system.

The foregoing embodiment and the multiple modified examples can be combined with each other.

It is needless to say that the present invention can provide a genre generation device 200 including in advance a structure for realizing the function of any of the foregoing embodiment and the first to 18th modified examples thereof, and a conventional genre generation device can be caused to function as the genre generation device 200 of the embodiment by applying a program. That is, a genre generation program for realizing each function and structure of the genre generation device 200 exemplified in any of the foregoing embodiment and the first to 18th modified examples thereof is applied in a manner executable by a computer (for example, a CPU) controlling the conventional genre generation device, thereby allowing the conventional genre generation device to function as the genre generation device 200 of the embodiment.

How to distribute such a program is optional, and for example, the program can be distributed in a manner stored in a recording medium, such as a memory card, a CD-ROM, or a DVD-ROM, or can be distributed through a communication medium like the Internet. Moreover, the genre generation method of the present invention can be carried out using the genre generation device 200 of the foregoing embodiment.

A preferred embodiment of the present invention was explained above, but the present invention is not limited to any specific embodiment, and can be changed and modified in various forms within the scope and spirit of the present invention set forth in appended claims. Moreover, the foregoing embodiment is to explain the present invention, and is not to limit the scope and spirit of the present invention. That is, the scope and spirit of the present invention is indicated by not the embodiment but the appended claims. Various modification carried out within the range of the claims and the range of the equivalent thereto is also included in the scope and spirit of the present invention.

This application claims the benefit based on Japanese Patent Application No. 2011-161999 filed on Jul. 25, 2011.

The whole specification, claims, and drawings of Japanese Patent Application No. 2011-161999 are herein incorporated in this specification by reference.

INDUSTRIAL APPLICABILITY

The present invention is applicable to a genre generation device that generates a genre where a product or the like is classified, a genre generation program, a computer-readable recording medium having stored therein the genre generation program, and a genre generation method.

REFERENCE SIGNS LIST

10 Communication network
101 Seller terminal device
102 Bidder terminal device
200 Genre generation device
200a CPU
200b ROM
200c RAM
200d Hard disk
200e Media controller
200f LAN card
200g Video card
200h LCD
200i Keyboard
200j Speaker
200k Touch pad
210 Information memory
220 Obtaining part
225 Classifying part
230 Presenting part
235 Calculating part
240 Searching part
245 Bidding part
250 Successful bidding part
260 Changing part
265 Generating part
269 Re-classifying part
270 Deleting part

The invention claimed is:

1. A genre generation device comprising:
at least one memory configured to store program code;
at least one processor configured to read said program code and operate as instructed by said program code, said program code including:
obtaining code configured to cause at least one of said at least one processor to obtain a search query for searching at least one product or at least one service;
generating code configured to cause at least one of said at least one processor to generate a first genre where the at least one product or the at least one service is classified; and
calculating code configured to cause at least one of said at least one processor to calculate a level of co-occurrence of a first keyword and a second keyword being connected to each other via an operator in the obtained search query, the first keyword representing the first genre, the second keyword representing a second genre that is an existing genre in a genre hierarchy table comprising a plurality of genres, and a plurality of layers, the genre hierarchy table being stored in an information memory, and the operator representing a user indication whether the first genre and the second genre belong to different layers in the genre hierarchy table, wherein when a disparity between the calculated level of co-occurrence of the first keyword and the second keyword, and, a level threshold that is a threshold for a level based on at least the operator is smaller than a disparity threshold that is a threshold for a disparity, the generating code causes at least one of said at least one processor to generate, in the genre hierarchy table, the first genre as a different-layer genre belonging to a different layer from a layer where the second genre represented by the second keyword belongs.

2. The genre generation device according to claim 1, wherein:

the calculating code further causes at least one of said at least one processor to calculate a different-layer co-occurrence level of a specified keyword and a different-layer keyword in the obtained search query, the specified keyword representing a specified genre that is any of genres belonging to the genre hierarchy table, and the different-layer keyword representing a different-layer genre belonging to a different layer from a layer where the specified genre belongs; and the generating code causes at least one of said at least one processor to set the calculated different-layer co-occurrence level as the level threshold.

3. The genre generation device according to claim 2, wherein:

the calculating code further causes at least one of said at least one processor to calculate a same-layer co-occurrence level of the specified keyword representing the specified genre and a same-layer keyword in the obtained search query, the same-layer keyword representing a same-layer genre belonging to a same layer as the layer where the specified genre belongs; and the generating code causes at least one of said at least one processor to:

(a) generate the first genre as a different-layer genre of the second genre represented by the second keyword in the genre hierarchy table when a different-layer disparity that is a disparity between the co-occurrence level of the first keyword and the second keyword, and, the different-layer co-occurrence level is smaller than a same-layer disparity that is a disparity between the co-occurrence level of the first keyword and the second keyword, and, the same-layer co-occurrence level, and the different-layer disparity is smaller than the disparity threshold; and (b) generate the first genre as a same-layer genre of the second genre represented by the second keyword in the genre hierarchy table when the different-layer disparity is equal to or greater than the same-layer disparity and the same-layer co-occurrence level is smaller than the disparity threshold.

4. The genre generation device according to claim 3, wherein:

the different-layer co-occurrence level includes a series co-occurrence level of a co-occurrence of the specified keyword and a series keyword in the obtained search query, the series keyword representing a series genre that is present on a path from a top of the genre hierarchy table through the specified genre, and belongs to an upper or lower layer of the layer where the specified genre belongs;

the same-layer co-occurrence level includes a parallel co-occurrence level of a co-occurrence of the specified keyword and a parallel keyword in the obtained search query, the parallel keyword representing a parallel genre present at a proximal lower layer of a proximal upper genre of the specified genre;

the different-layer disparity includes a series disparity that is a disparity between the co-occurrence level of the first keyword and the second keyword, and, the series co-occurrence level;

the same-layer disparity includes a parallel disparity that is a difference between the co-occurrence level of the first keyword and the second keyword, and, the parallel co-occurrence level; and the generating code causes at least one of said at least one processor to:

(a) generate the first genre represented by the first keyword as a series genre of the second genre when the series disparity is smaller than the parallel disparity and the series disparity is smaller than the disparity threshold; and (b) generate the first genre as a parallel genre of the second genre when the series disparity is equal to or larger than the parallel disparity and the parallel disparity is smaller than the disparity threshold.

5. The genre generation device according to claim 3, wherein the specified genre is the second genre.

6. The genre generation device according to claim 1, further comprising:

re-classifying code that causes at least one of said at least one processor to re-classify, when the generating code generates the first genre, at least one product or at least one service classified in the second genre into the first genre or the second genre based on at least one keyword for explaining the at least one product or the at least one service classified in the second genre generated prior to the first genre or at least one name of the at least one product or the at least one service, the first keyword representing the first genre, and the second keyword representing the second genre.

7. The genre generation device according to claim 6, wherein:

the calculating code further causes at least one of said at least one processor to calculate a number of obtainments of a preceding query that is a number of times at which a search query having the first keyword coupled with the second keyword without a same-layer operator in a manner preceding to the second keyword is obtained, and a number of obtainments of a following search query that is a number of times at which a search query having the first keyword coupled with the second keyword without the same-layer operator in a manner following to the second keyword is obtained; and when the first genre is to be generated in a different layer from the layer where the second genre belongs, the generating code causes at least one of said at least one processor to:

(c) generate the first genre in an upper layer of the second genre when the number of obtainments of the preceding query is larger than the number of obtainments of the following query; and (d) generate the first genre in a lower layer of the second genre when the number of obtainments of the preceding query is smaller than the number of obtainments of the following query.

8. The genre generation device according to claim 6, wherein:

the calculating code further causes at least one of said at least one processor to calculate a first search number that is a number of searches of at least one product or at least one service searched based on the first keyword and a second search number that is a number of searches of at least one product or at least one service based on the second keyword; and when generating the first genre and the second genre in different layers, the generating code causes at least one of said at least one processor to:

(c) generate the first genre in an upper layer of the second genre when the first search number is larger than the second search number; and (d) generate the first genre in a lower layer of the second genre when the first search number is smaller than the second search number.

9. The genre generation device according to claim 6, wherein:

the calculating code further causes at least one of said at least one processor to calculate a first search result number that is a number of at least one product or at least one service searched based on the first keyword, and a second search result number that is a number of the products or the services searched based on the second keyword; and when generating the first genre and the second genre in different layers, the generating code causes at least one of said at least one processor to:

(c) generate the first genre in an upper layer of the second genre when the first search result number is larger than the second search result number; and (d) generate the first genre in a lower layer of the second genre when the first search result number is smaller than the second search result number.

10. The genre generation device according to claim 6, wherein:

the second genre belongs to a layer where a third genre and a fourth genre belong, the third genre and the fourth genre belonging to a same layer; and when a search query having the first keyword and the second keyword following to the first keyword coupled with each other by a NOT operator is obtained, the calculating code causes at least one of said at least one processor to presume that a search query having a coupled word and the first keyword further coupled with an AND operator is obtained, the coupled word having a third keyword representing the third genre and a fourth keyword representing the fourth genre coupled with an OR operator that is the same-layer operator.

11. The genre generation device according to claim 10, further comprising:

deleting code that causes at least one of said at least one processor to annex the second genre to the third genre belonging to a same layer as the layer where the second genre belongs to delete the second genre when a new product or service is not classified in the second genre within a predetermined time period.

12. The genre generation device according to claim 11, wherein:

the obtaining code further causes at least one of said at least one processor to obtain a search query including the first keyword, and a search query including the second keyword; and the calculating code causes at least one of said at least one processor to presume that a search query having the first keyword and the second keyword coupled with each other by the same-layer operator is obtained when the search query including the second keyword is obtained before a predetermined time elapses or before a predetermined number of web pages are browsed after the search query including the first keyword is obtained.

13. The genre generation device according to claim 12, wherein:

the obtaining code further causes at least one of said at least one processor to obtain a search query including the second keyword and a refinement instruction for instructing, based on the products or the services searched based on the second keyword, a refinement of the products or the services searched based on the first keyword after the search query including the first keyword is obtained; and the calculating code causes at least one of said at least one processor to presume that a search query having the first keyword and the second keyword coupled with each other without the same-layer operator is obtained when the search query including the first keyword, and the search query including the second keyword and the refinement instruction are obtained.

14. The genre generation device according to claim 1, wherein:

the generating code causes at least one of said at least one processor to generate the first genre in a same layer as the layer where the second genre belongs or a different layer from the layer where the second genre belongs when any of a number of classifications that is a number of at least one product or at least one service classified in the second genre, a number of sales of the at least one product or the at least one service classified in the second genre, a number of searches of at least one product or at least one service based on the second keyword, and a change level in the number of searches per a unit time exceeds respective predetermined thresholds.

15. A non-transitory computer-readable recording medium having stored therein a genre generation program that allows a computer to:

obtain a search query for searching at least one product or at least one service;

generate a first genre where the at least one product or the at least one service is classified; and calculate a level of co-occurrence of a first keyword and a second keyword being connected to each other via an operator in the obtained search query, the first keyword representing the first genre, the second keyword representing a second genre that is an existing genre in a genre hierarchy table constructed by a plurality of genres, and a plurality of layers, and the operator representing a user indication whether the first genre and the second genre belong to different layers in the genre hierarchy table, wherein when a disparity between the calculated level of co-occurrence of the first keyword and the second keyword, and, a level threshold that is a threshold for a level based on at least the operator is smaller than a disparity threshold that is a threshold for a disparity, the generating part generates, in the genre hierarchy table, the first genre as a different-layer genre belonging to a different layer from a layer where the second genre represented by the second keyword belongs.

16. A genre generation method executed by a genre generation device comprising an obtaining part, a generating part, and a calculating part, this genre generation method comprising:

obtaining a search query for searching at least one product or at least one service;

generating a first genre where the at least one product or the at least one service is classified; and calculating a level of co-occurrence of a first keyword and a second keyword being connected to each other via an operator in the obtained search query, the first keyword representing the first genre, the second keyword representing a second genre that is an existing genre in a genre hierarchy table constructed by a plurality of genres, and a plurality of layers, and the operator representing a user indication whether the first genre and the second genre belong to different layers in the genre hierarchy table, wherein when a disparity between the calculated level of co-occurrence of the first keyword and the second keyword, and, a level threshold that is a threshold for a level based on at least the operator is smaller than a disparity threshold that is a threshold for a disparity, generating the first genre in the genre hierarchy table as a different-layer genre belonging to a different layer from a layer where the second genre represented by the second keyword belongs.

\* \* \* \* \*